(12) United States Patent
Rojeski

(10) Patent No.: US 10,978,702 B2
(45) Date of Patent: *Apr. 13, 2021

(54) ENERGY STORAGE DEVICES

(71) Applicant: CF TRAVERSE LLC, San Francisco, CA (US)

(72) Inventor: Ronald A. Rojeski, Campbell, CA (US)

(73) Assignee: CF TRAVERSE LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,833

(22) Filed: Apr. 8, 2020

(65) Prior Publication Data

US 2020/0343545 A1    Oct. 29, 2020

Related U.S. Application Data

(63) Continuation of application No. 15/946,102, filed on Apr. 5, 2018, now Pat. No. 10,665,858, which is a
(Continued)

(51) Int. Cl.
*H01M 4/38* (2006.01)
*H01G 11/50* (2013.01)
(Continued)

(52) U.S. Cl.
CPC ............ *H01M 4/386* (2013.01); *H01G 11/24* (2013.01); *H01G 11/28* (2013.01); *H01G 11/30* (2013.01);
(Continued)

(58) Field of Classification Search
None
See application file for complete search history.

(56) References Cited

U.S. PATENT DOCUMENTS 3,775,216 A    11/1973   Frentrop
4,329,403 A     5/1982   Baker
(Continued)

FOREIGN PATENT DOCUMENTS

DE    112007000185 T5    12/2008
EP         2037516        12/2011
(Continued)

OTHER PUBLICATIONS

KR10-2013-7020275 Examiner's Rejection pp. 1-3.
(Continued)

*Primary Examiner* — Daniel S Gatewood
(74) *Attorney, Agent, or Firm* — Merchant & Gould P.C.

(57) ABSTRACT

A novel hybrid lithium-ion anode material based on coaxially coated Si shells on vertically aligned carbon nanofiber (CNF) arrays. The unique cup-stacking graphitic microstructure makes the bare vertically aligned CNF array an effective $Li^+$ intercalation medium. Highly reversible $Li^+$ intercalation and extraction were observed at high power rates. More importantly, the highly conductive and mechanically stable CNF core optionally supports a coaxially coated amorphous Si shell which has much higher theoretical specific capacity by forming fully lithiated alloy. Addition of surface effect dominant sites in close proximity to the intercalation medium results in a hybrid device that includes advantages of both batteries and capacitors.

10 Claims, 26 Drawing Sheets

Related U.S. Application Data continuation of application No. 14/262,497, filed on Apr. 25, 2014, now Pat. No. 9,979,017, which is a continuation of application No. 13/868,957, filed on Apr. 23, 2013, now abandoned, which is a continuation of application No. 13/779,409, filed on Feb. 27, 2013, now Pat. No. 9,349,544, which is a continuation-in-part of application No. 13/725,969, filed on Dec. 21, 2012, now Pat. No. 9,412,998, which is a continuation-in-part of application No. 12/904,113, filed on Oct. 13, 2010, now Pat. No. 8,481,214, which is a continuation-in-part of application No. 12/392,525, filed on Feb. 25, 2009, now Pat. No. 8,420,258.

(60) Provisional application No. 61/752,437, filed on Jan. 14, 2013, provisional application No. 61/677,317, filed on Jul. 30, 2012, provisional application No. 61/667,876, filed on Jul. 3, 2012, provisional application No. 61/615,179, filed on Mar. 23, 2012, provisional application No. 61/603,833, filed on Feb. 27, 2012, provisional application No. 61/578,545, filed on Dec. 21, 2011, provisional application No. 61/254,090, filed on Oct. 22, 2009, provisional application No. 61/130,679, filed on Jun. 2, 2008, provisional application No. 61/067,018, filed on Feb. 25, 2008.

(51) Int. Cl.
| | | |
|---|---|---|
| *H01G 11/30* | (2013.01) | |
| *H01G 11/24* | (2013.01) | |
| *H01M 10/0525* | (2010.01) | |
| *H01M 4/70* | (2006.01) | |
| *H01M 4/139* | (2010.01) | |
| *H01M 4/134* | (2010.01) | |
| *H01M 4/133* | (2010.01) | |
| *H01M 4/131* | (2010.01) | |
| *H01M 4/62* | (2006.01) | |
| *H01G 11/28* | (2013.01) | |
| *H01M 4/1393* | (2010.01) | |
| *H01M 4/36* | (2006.01) | |
| *H01M 4/1395* | (2010.01) | |
| *H01G 11/38* | (2013.01) | |
| *H01M 4/587* | (2010.01) | |
| *H01G 11/36* | (2013.01) | |
| *H01G 11/46* | (2013.01) | |
| *B82Y 40/00* | (2011.01) | |
| *B82Y 30/00* | (2011.01) | |
| *H01M 4/02* | (2006.01) | |

(52) U.S. Cl.
CPC .............. *H01G 11/36* (2013.01); *H01G 11/38* (2013.01); *H01G 11/50* (2013.01); *H01M 4/131* (2013.01); *H01M 4/133* (2013.01); *H01M 4/134* (2013.01); *H01M 4/139* (2013.01); *H01M 4/1393* (2013.01); *H01M 4/1395* (2013.01); *H01M 4/366* (2013.01); *H01M 4/587* (2013.01); *H01M 4/62* (2013.01); *H01M 4/622* (2013.01); *H01M 4/623* (2013.01); *H01M 4/624* (2013.01); *H01M 4/625* (2013.01); *H01M 4/70* (2013.01); *H01M 10/0525* (2013.01); *B82Y 30/00* (2013.01); *B82Y 40/00* (2013.01); *H01G 11/46* (2013.01); *H01M 2004/021* (2013.01); *H01M 2004/027* (2013.01); *Y02E 60/13* (2013.01); *Y10S 977/734* (2013.01)

(56) References Cited

U.S. PATENT DOCUMENTS

| | | |
|---|---|---|
| 5,674,642 A | 10/1997 | Le et al. |
| 5,795,672 A | 8/1998 | Dearnaley |
| 6,194,099 B1 | 2/2001 | Gernov et al. |
| 6,815,121 B2 | 11/2004 | Desgupta et al. |
| 6,863,942 B2 | 3/2005 | Ren et al. |
| 6,875,536 B2 | 4/2005 | Ovshinsky |
| 7,094,499 B1 | 8/2006 | Hung |
| 7,147,966 B2 | 12/2006 | Ren et al. |
| 7,189,476 B1 | 3/2007 | Macklin et al. |
| 7,402,829 B2 | 7/2008 | Green |
| 7,442,284 B2 | 10/2008 | Ren et al. |
| 7,745,047 B2 | 6/2010 | Zhamu et al. |
| 7,854,991 B2 | 12/2010 | Hata et al. |
| 7,938,996 B2 | 5/2011 | Baughman et al. |
| 8,053,113 B2 | 11/2011 | Oh et al. |
| 8,119,288 B2 | 2/2012 | Zhamu et al. |
| 8,236,452 B2 | 8/2012 | Zhamu et al. |
| 8,241,793 B2 | 8/2012 | Zhamu et al. |
| 8,257,866 B2 | 9/2012 | Loveness |
| 8,329,293 B2 | 12/2012 | Noguchi et al. |
| 8,389,157 B2 | 3/2013 | Frank et al. |
| 8,426,052 B2 | 4/2013 | Kozinsky et al. |
| 8,450,012 B2 | 5/2013 | Cui et al. |
| 8,481,214 B2 | 7/2013 | Rojeski |
| 8,492,029 B2 | 7/2013 | Liu et al. |
| 8,551,657 B2 | 10/2013 | Yoshida et al. |
| 8,556,996 B2 | 10/2013 | Loveness et al. |
| 8,669,009 B2 | 3/2014 | Yamakaji |
| 8,890,211 B1 | 11/2014 | Rojeski |
| 9,362,549 B2 | 6/2016 | Rojeski |
| 9,412,998 B2 | 8/2016 | Rojeski |
| 9,431,181 B2 | 8/2016 | Rojeski |
| 9,705,136 B2 | 7/2017 | Rojeski |
| 9,917,300 B2 | 3/2018 | Rojeski |
| 9,941,709 B2 | 4/2018 | Rojeski |
| 2002/0018935 A1 | 2/2002 | Okada |
| 2003/0044686 A1 | 3/2003 | Bushong et al. |
| 2003/0215711 A1 | 11/2003 | Kramata et al. |
| 2004/0141908 A1 | 7/2004 | Hara et al. |
| 2004/0234844 A1 | 11/2004 | Morris et al. |
| 2004/0258984 A1 | 12/2004 | Ariel et al. |
| 2005/0064291 A1 | 3/2005 | Sato |
| 2005/0130043 A1 | 6/2005 | Gao et al. |
| 2005/0230270 A1 | 10/2005 | Ren et al. |
| 2005/0287440 A1 | 12/2005 | Chang et al. |
| 2006/0002842 A1 | 1/2006 | Yoon |
| 2006/0003226 A1 | 1/2006 | Sawa et al. |
| 2006/0029857 A1 | 2/2006 | Cherepy et al. |
| 2006/0046144 A1 | 3/2006 | Obrovac |
| 2006/0057433 A1 | 3/2006 | Ando et al. |
| 2006/0147797 A1 | 7/2006 | Wu |
| 2006/0165988 A1 | 7/2006 | Chiang et al. |
| 2007/0148549 A1 | 6/2007 | Kobayashi et al. |
| 2007/0167101 A1 | 7/2007 | Naruse et al. |
| 2007/0190422 A1 | 8/2007 | Morris |
| 2007/0202403 A1 | 8/2007 | Oh et al. |
| 2007/0212538 A1 | 9/2007 | Niu |
| 2008/0013258 A1 | 1/2008 | Viswanathan et al. |
| 2008/0020193 A1 | 1/2008 | Jang et al. |
| 2008/0020282 A1 | 1/2008 | Kim et al. |
| 2008/0096110 A1 | 4/2008 | Bito et al. |
| 2008/0299455 A1 | 4/2008 | Shiozaki et al. |
| 2008/0160409 A1 | 7/2008 | Ishida et al. |
| 2008/0193840 A1 | 8/2008 | Shirane |
| 2008/0220329 A1 | 9/2008 | Kojima et al. |
| 2008/0261116 A1 | 10/2008 | Burton et al. |
| 2008/0311472 A1 | 12/2008 | Yamaguchi |
| 2009/0004566 A1 | 1/2009 | Shirane et al. |
| 2009/0042102 A1 | 2/2009 | Cui et al. |
| 2009/0053608 A1 | 2/2009 | Choi et al. |
| 2009/0068553 A1 | 3/2009 | Firsich |
| 2009/0162750 A1 | 6/2009 | Kawakami et al. |
| 2009/0169996 A1 | 7/2009 | Zhamu |
| 2009/0186276 A1 | 7/2009 | Zhamu |
| 2009/0208834 A1 | 8/2009 | Ramasubramanian et al. |

(56) References Cited

U.S. PATENT DOCUMENTS

| | | |
|---|---|---|
| 2009/0214944 A1 | 8/2009 | Rojeski |
| 2009/0305135 A1 | 12/2009 | Sri et al. |
| 2010/0055572 A1 | 3/2010 | Park et al. |
| 2010/0136431 A1 | 6/2010 | Lee et al. |
| 2010/0159305 A1 | 6/2010 | Yan |
| 2010/0159331 A1 | 6/2010 | Lee et al. |
| 2010/0178417 A1 | 7/2010 | Connor et al. |
| 2010/0178531 A1 | 7/2010 | Amaratunga et al. |
| 2010/0015933 A1 | 8/2010 | Kerselaers |
| 2010/0203362 A1 | 8/2010 | Lam et al. |
| 2010/0216026 A1 | 8/2010 | Lopatin |
| 2010/0221596 A1 | 9/2010 | Huggins et al. |
| 2010/0258525 A1 | 10/2010 | Gorintin et al. |
| 2010/0297502 A1 | 11/2010 | Zhu et al. |
| 2011/0027655 A1 | 2/2011 | Rojeski |
| 2011/0070488 A1 | 3/2011 | West et al. |
| 2011/0076542 A1 | 3/2011 | Farmer |
| 2011/0104551 A1 | 5/2011 | Yang et al. |
| 2011/0104553 A1 | 5/2011 | Pol et al. |
| 2011/0143198 A1 | 6/2011 | Choi et al. |
| 2011/0165462 A1 | 7/2011 | Zhamu et al. |
| 2011/0165466 A1 | 7/2011 | Zhamu et al. |
| 2011/0229761 A1 | 9/2011 | Cui et al. |
| 2011/0281156 A1 | 11/2011 | Boren et al. |
| 2012/0107582 A1* | 5/2012 | Metz ................. H01M 4/92 428/209 |
| 2012/0107695 A1 | 5/2012 | Lee et al. |
| 2012/0115048 A1 | 5/2012 | Roev et al. |
| 2012/0115049 A1 | 5/2012 | Rinzler et al. |
| 2012/0229096 A1 | 9/2012 | Nazri |
| 2012/0250225 A1 | 10/2012 | Aria et al. |
| 2013/0143124 A1 | 6/2013 | Lee et al. |
| 2013/0171340 A1 | 7/2013 | Rojeski |
| 2013/0244107 A1 | 9/2013 | Rojeski |
| 2014/0234712 A1 | 8/2014 | Rojeski |
| 2015/0236342 A1 | 8/2015 | Rojeski |

FOREIGN PATENT DOCUMENTS

| | | |
|---|---|---|
| EP | 2 768 049 A1 | 8/2014 |
| EP | 3 633 770 A1 | 4/2020 |
| FR | 2895752 B1 | 7/2007 |
| JP | 2001210315 | 8/2001 |
| JP | 2002313319 | 10/2002 |
| JP | 2003123749 A | 4/2003 |
| JP | 2004319390 | 11/2004 |
| JP | 2004319390 A | 11/2004 |
| JP | 2006-190642 A | 7/2006 |
| JP | 2006179431 | 7/2006 |
| JP | 2009-535477 A | 10/2009 |
| JP | 2010103051 | 5/2010 |
| JP | 2010525549 | 7/2010 |
| JP | 2011-514631 A | 5/2011 |
| KR | 10-2003-0075132 A | 9/2003 |
| KR | 10-2010-0128282 A | 12/2010 |
| KR | 2011-125807 A | 11/2011 |
| KR | 2011-0125808 A | 11/2011 |
| KR | 10-2012-0046482 | 5/2012 |
| WO | 2007069389 | 6/2007 |
| WO | 2007071778 | 6/2007 |
| WO | 2007095013 | 8/2007 |
| WO | 2008033827 | 3/2008 |
| WO | 2009108731 | 9/2009 |
| WO | 2010100599 | 9/2010 |
| WO | 2010/129910 A2 | 11/2010 |
| WO | 2010129827 | 11/2010 |
| WO | 2010135446 | 11/2010 |
| WO | 2011/041468 A1 | 4/2011 |
| WO | 2011060017 | 5/2011 |
| WO | 2011068911 | 6/2011 |
| WO | 2011076475 | 6/2011 |
| WO | 2011152190 | 8/2011 |
| WO | 2011119614 | 9/2011 |
| WO | 2011149958 | 12/2011 |
| WO | 2012002136 | 1/2012 |
| WO | 2012054767 | 4/2012 |
| WO | 2012069245 | 5/2012 |
| WO | 2012084570 | 6/2012 |
| WO | 2012150012 | 11/2012 |
| WO | 2013096931 | 6/2013 |
| WO | 2013126372 | 8/2013 |
| WO | 2013130677 | 9/2013 |
| WO | 2014008433 | 1/2014 |

OTHER PUBLICATIONS

CN200980106188.5 Third Office Action Response, filed Mar. 17, 2014, pp. 1-10.
B. Liu et al., Nano Letters, 2012, 12, 3005-3011.
X. C. Tang et al., Electrochimica Acta, 2009, 54, 2329-2334.
A. Gohier et al., Advanced Materials, 2012, 24, 2592-2597.
L. F. Cui et al., Nano Letters, Received Dec. 1, 2008.
N. Liu et al., Nano Letters, Received Apr. 20, 2012.
Y. Yao et al., Nano Letters, 2011, 11, 2949-2954.
R. Chandrasekaran et al., J. Electromechanical Society, 2010, 157, A1139-A1151.
G. Hautier, C. C. Fischer, A. Jain, T. Mueller and G. Ceder, Chem. Mater.,2010, 22, 3762-3767.
G. Hautier, A. Jain, H. L. Chen, C. Moore, S. P. Ong and G. Ceder, J. Mater. Chem., 2011, 21, 17147-17153.
L. Zhang, K. Jin, L. Wang, Y. Zhang, X. Li and Y. Song, J. Alloy. Compd.,2015, 638, 298-304.
X. Wang, L. Sun, R. Agung Susantyoko, Y. Fan and Q. Zhang, Nano Energy,2014, 8, 71-77.
R. A. Susantyoko, X. Wang, Y. Fan, Q. Xiao, E. Fitzgerald, K. L. Pey and Q. Zhang, Thin Solid Films, 2014, 558, 356-364.
L. Sun, Y. Fan, X. Wang, R. Agung Susantyoko and Q. Zhang, Nanotechnology, 2014, 25, 255302.
R. A. Susantyoko, X. Wang, L. Sun, W. Sasangka, E. Fitzgerald and Q.Zhang, Nano Energy, 2015, 12, 521-527.
Y. W. Son, M. L. Cohen and S. G. Louie, Nature, 2006, 444, 347-349.
B. E. E. Systems, C. E.T. Systems, S. C. R. R. P. P. N. G. Vehicles, and D. E. P. Sciences, Review of the Research Program of the Partnership for a New Generation of Vehicle.
C. Huang, N. P. Young and P. S. Grant, J. Mater. Chem. A, 2014, 2, 1022-11028.
M. Chigane, M. Ishikawa and M. Izaki, J. Electrochem. Soc., 2001, 148, 096-0101.
M. Chigane and M. Ishikawa, J. Electrochem. Soc., 2000, 147, 2246-2251.
G. Rayner-Canham and T. Overton, Descriptive inorganic chemistry, Macmillan, 2003.
M. Pourbaix, Atlas of electrochemical equilibria in aqueous solutions, Pergamon Press, Oxford, 1974.
H. Zhang, G. Cao, Z. Wang, Y. Yang, Z. Shi and Z. Gu, Nano Lett., 2008,8, 2664-2668.
R. Amade, E. Jover, B. Caglar, T. Mutlu and E. Bertran, J. Power Sources, 2011, 196, 5779-5783.
S. W. Lee, J. Kim, S. Chen, P. T. Hammond and Y. Shao-Horn, ACS Nano, 2010, 4, 3889-3896.
S. L. Chou, J. Z. Wang, S. Y. Chew, H. K. Liu and S. X. Dou, Electrochem. Commun., 2008, 10, 1724-1727.
K. W. Nam, C. W. Lee, X. Q. Yang, B. W. Cho, W. S. Yoon and K. B. Kim, J. Power Sources, 2009, 188, 323-331.
J. Yan, Z. J. Fan, T. Wei, J. Cheng, B. Shao, K Wang, L. P. Song and M. L. Zhang, J. Power Sources, 2009, 194, 1202-1207.
S. B. Ma, K. Y. Ahn, E. S. Lee, K. H. Oh and K. B. Kim, Carbon, 2007, 45, 375-382.
Z. Fan, J. H. Chen, M. Y. Wang, K. Z. Cui, H. H. Zhou and W. Kuang, Diamond Relat. Mater., 2006, 15, 1478-1483.
P. Simon and Y. Gogotsi, Acc. Chem. Res., 2013, 46, 1094-1103.
M. Zhi, C. Xiang, J. Li, M. Li and N. Wu, Nanoscale, 2013, 5, 72-88.
K. Zhang, X. Han, Z. Hu, X. Zhang, Z. Tao and J. Chen, Chem. Soc. Rev., 2015, 44, 699-728.

(56) References Cited

OTHER PUBLICATIONS

F. Li, Y. Xing, M. Huang, K. L. Li, T. T. Yu, Y. X. Zhang and D. Losic, J. Mater. Chem. A, 2015, DOI: 10.1039/c5ta00634a, 10.1039/C1035TA00634A.

W. Chen, R. B. Rakhi, Q. X. Wang, M. N. Hedhili and H. N. Alshareef, Adv. Fund. Mater., 2014, 24, 3130-3143.

J.E. Weston and B. C.H. Steele, J. Appl. Electrochem., 1980, 10, 49-53.

Y. Yang,et al Metal Oxide Nanostructures, eds. J. Wu, J. Cao, W.Q. Han, A. Janotti and H.C. Kim, Springer New York, 2012, vol. 149, ch. 12, pp. 269-302.

R. Huggins, Advanced batteries: materials science aspects, Springer, 2008.

D. M. Adams, et al.Chem. B, 2003, 107, 6668-6697.

J. Desilvestro and O. Haas, J. Electrochem. Soc., 1990, 137, C5-C22.

Z. B. Lei, J. T. Zhang and X. S. Zhao, J. Mater. Chem., 2012, 22, 153-160.

D.R. Rolison, J. W. Long, J.C. Lytle, A. E. Fischer, C. P. Rhodes, T. M. McEvoy, M. E. Bourg and A. M. Lubers, Chem. Soc. Rev., 2009, 38, 226-252.

P. Simon and Y. Gogotsi, Nat. Mater., 2008, 7, 845-854.

C. C. Hu, K. H. Chang, M. C. Lin and Y. T. Wu, Nano Lett., 2006, 6, 2690-2695.

S. L. Zhang and N. Pan, Advanced Energy Materials, 2015, 5.

T. Aida, K. Yamada and M. Morita, Electrochem Solid St, 2006, 9, A534-A536.

Z. Weng, F. Li, D. W. Wang, L. Wen and H. M. Cheng, Angew. Chem. Int. Ed. Engl., 2013, 52, 3722-3725.

H. Zhang and P. V. Braun, Nano Lett., 2012, 12, 2778-2783.

H. Lindstrom, S. Sodergren, A. Solbrand, H. Rensmo, J. Hjelm, A. Hagfeldt and S. E. Lindquist, J. Phys. Chem. B, 1997, 101, 7717-7722.

Yan, et al., "Preparation and electrochemical properties of composites of carbon nanotubes loaded with Ag and TiO2 nanoparticle for use as anode material in lithium-ion batteries", Electrochimica Acta, vol. 53, No. 22, Sep. 20, 2008, pp. 6351-6355.

Huang, et al., "Electrochemical investigation of TiO2/carbon nanotubes nanocomposite as anode materials for ithium-ion batteries", Materials Letters, vol. 61, No. 1, Jan. 1, 2007, pp. 296-299.

Su, et al., "Advanced titania nanostructures and composites for lithium ion battery", Journal of Materials Science, vol. 17, No. 6, Sep. 29, 2011, pp. 2519-2534.

Extended European Search Report, Application No. 13755702.1, dated Oct. 13, 2015.

Japanese Office Action, Application No. 2014-209155, dated Dec. 1, 2015 and translation.

Singapore Written Opinion, Application No. 11201405271X, dated Oct. 26, 2015.

Singapore Search Report and Written Opinion, Application No. 11201405271X, dated Apr. 20, 2015.

Non-Final Office Action, U.S. Appl. No. 13/779,472, dated Sep. 15, 2015.

Non-Final Office Action, U.S. Appl. No. 13/779,522, dated Oct. 15, 2015.

Non-Final Office Action, U.S. Appl. No. 13/779,571, dated Dec. 3, 2015.

Idota, et al., "Tin-based amorphous oxide: a high-capacity lithium-ion-storage material", Science, vol. 276, May 30, 1997, pp. 1395-1397.

Final Rejection, U.S. Appl. No. 13/725,969, dated Oct. 21, 2015.

Ogasawara et al.,"Rechageable Li2O2 electrode for lithium batteries", Oct. 2005, J. Am. Chem. Soc., 128, 2006, 1390-1393.

Debart et al., "Alpha-MnO2 nanowires: a catalyst for the 02 electrode in rechargeable lithium batteries", May 2008, I Agew. Chem. Int. Ed., 47, 2008, 4521.

Lee et al., "Anomalous growth and characterization of carbon-coated nickel silicide nanowires", Chemical Physics Letters 384 (2004) p. 215-218.

Non Final Office Action, U.S. Appl. No. 14/262,528, dated Apr. 28, 2016.

Non Final Office Action, U.S. Appl. No. 14/176,137, dated May 9, 2016.

Translation of Chinese search report for Chinese Patent Application Ser. No. 2013800205490, dated Feb. 17, 2016.

"Silicon Nanotubes Outperform Carbon Nanotubes for Hydrogen Storage", Apr. 20, 2008.

U.S. Appl. No. 13/039,031, Ghryn E. Loveness, Information Disclosure Statement, Jul. 5, 2012.

U.S. Appl. No. 13/039,031, Ghryn E. Loveness, Response to Restriction Requirement, dated Mar. 21, 2012.

U.S. Appl. No. 13/039,031, Ghrym E. Loveness, Information Disclosure Statement, Mar. 21, 2012.

U.S. Appl. No. 13/039,031, Ghrym E. Loveness, Non-Final Office Action, dated Feb. 21, 2012.

U.S. Appl. No. 13/039,031, Ghrym E. Loveness, Notice of Allowance and Fees Due, dated Jul. 26, 2012.

U.S. Appl. No. 13/039,031, Ghrym E. Loveness, Preliminary Amendment, dated Nov. 29, 2011.

U.S. Appl. No. 13/039,031, Loveness, et al., Information Disclosure Statement, Nov. 22, 2011.

U.S. Appl. No. 13/039,031, Loveness, Issue Notification, dated Aug. 15, 2012.

U.S. Appl. No. 13/069,212, Yi Cui, Non-Final Office Action, dated Apr. 15, 2013.

U.S. Appl. No. 13/277,821, Zuqin Liu, et al., Response to Restriction Requirement, dated Nov. 5, 2012.

U.S. Appl. No. 13/277,821, Zuquin, Liu, Non-Final Office Action, dated Feb. 25, 2013.

Berger, Michale, "Using nanotechnology to improve Li-ion battery performance", Nanowerk Spotlight (www.nanowerk.com), Apr. 7, 2008.

Bergeron, Louis, Nanoparticle electrode for batteries could make large-scale power storage on the energy grid feasible, say Stanford researchers.

Bourzac, Katherine, "Doubling Lithium-Ion Battery Storage", Technology Review, pp. 1-2, Sep. 17, 2010.

Chan, Candace K., et al., "High-performance lithium battery anodes using silicon nanowires", Nature Nanotechnology, 3, 31-36, Dec. 16, 2007.

Chen, L.H., et al., "Control of carbon nanotube morphology by change of applied bias field during growth", Applied Physics Letters, vol. 85, No. 22, Nov. 29, 2004.

CN200980106188.5, Second Office Action, dated Apr. 22, 2013, pp. 1-9.

Cui, Li-Feng, et al., Crystalline-Amorphous Core-Shell Silicon Nanowires . . . : Nano Letters, Jan. 14, 2009.

Cui, Yi, et al., "Nanowire Lithium-Ion Batteries as Electrochemical Energy Storage for Electric Vehicles", Jun. 1, 2009.

DE112009000443.1 First Office Action, dated Jan. 14, 2014, 5 pgs.

Eom, J. Y., et al., "Electrochemical Insertion of Lithium into Multiwalled Carbon Nanotube/Silicon Composites Produced by Ballmilling", J. of the Electrochemical Soc., 2006.

Hossain, Sohrab, et al., "Carbon Fiber Composite—A High Capacity Anode for Lithium-ion Batteries", LiTech, LLC, Oct. 7-12, 2007.

International Preliminary Report on Patentability, PCT/US2009/035195, Rojeski, Ronald Anthony, dated Sep. 10, 2010.

International Search Report and Written Opinion, PCT/US2009/035195, Rojeski, Ronald Anthony, dated May 5, 2009.

International Search Report and Written Opinion, PCT/US2013/049382, Rojeski, dated Oct. 8, 2013.

International Search Report and Written Opinion, PCT/US2014/011556, Rojeski, dated Jan. 12, 2015.

JP2010-546867 Non-Final Office Action, dated Jul. 30, 2013.

Kim, Nyung-Hoon, et al., "Electrochemical characteristics of Si/Mo multilayer anode for Li-ion batteries", Rev. Mex. F'is. S 53(1) (2007) 17-20.

KR10-2010-7018725, Preliminary Rejection, dated May 30, 2013, pp. 1-3.

Liangbing, Hu, et al., "Thin, Flexible Secondary Li-Ion Paper Batteries", Department of Materials Science and Engineering, Stanford University, Stanford, California 94305, pp. A-F.

(56) References Cited

OTHER PUBLICATIONS

Lu, Chenguang, et al., "Controlling the Diameter of Carbon Nanotubes in Chemical Vapor Deposition Method by Carbon Feeding", J. Phys. Chem. B 2006, 110, 20254-20257.
S. Ohara, J. Suzuki, K. Sekine and T. Takamura, J. Power Sources, 2004, 136, 303-306.
J. P. Maranchi, A. F. Hepp, A.G. Evans, N. T. Nuhfer and P. N. Kumta, J. Electrochem. Soc., 2006, 153, A1246-A1253.
J.P. Maranchi, A. F. Hepp and P. N. Kumta, Electrochem. Solid St, 2003, 6, A198-A201.
T. S. Arthur, D. J. Bates, N. Cirigliano, D. C. Johnson, P. Malati, J. M. Mosby, E. Perre, M. T. Rawls, A. L. Prieto and B. Dunn, MRS Bull., 2011, 36, 523-531.
J. W. Long, B. Dunn, D.R. Rolison and H. S. White, Chem. Rev., 2004, 104, 4463-4492.
J.M. Tarascon and M. Armand, Nature, 2001, 414, 359-367.
J. Molenda and J. Marzec, Funct. Mater. Lett., 2008, 01, 91-95.
J. H. Ryu, J. W. Kim, Y. E. Sung and S. M. Oh, Electrochem Solid St, 2004, 7, A306-A309.
U. Kasavajjula, C. S. Wang and A. J. Appleby, J. Power Sources, 2007, 163, 1003-1039.
H. Chen, J. Xu, P. C. Chen, X. Fang, J. Qiu, Y. Fu and C. Zhou, ACS Nano, 2011, 5, 8383-8390.
L. F. Cui, Y. Yang, C. M. Hsu and Y. Cui, Nano Lett., 2009, 9, 3370-3374.
P. C. Chen, J. Xu, H. T. Chen and C. W. Zhou, Nano Research, 2011, 4, 290-296.
W. Wang, R. Epur and P. N. Kumta, Electrochem. Commun., 2011, 13, 429-432.
J. Qu, H. Q. Li, J. J. Henry, S. K. Martha, N. J. Dudney, H. B. Xu, M. F. Chi, M. J. Lance, S. M. Mahurin, T. M. Besrnann and S. Dai, J. Power Sources, 2012, 198, 312-317.
D. Choi, W. Wang and Z. Yang, Chapter 1, Material Challenges and Perspectives, CRC Press, 2011.
G. Hautier, A. Jain, S. P. Ong, B. Kang, C. Moore, R. Doe and G. Ceder, Chem. Mater., 2011, 23, 3495-3508.
S. Curtarolo, G. L. Hart, M. B. Nardelli, N. Mingo, S. Sanvito and 0. Levy, Nat. Mater., 2013, 12, 191-201.
M. S. Whittingham, Chem. Rev., 2004, 104, 4271-4301.
B. Wang, W. Al Abdulla, D. Wang and X. S. Zhao, Energ. Environ. Sci., 2015, 8, 869-875.
G. N. Zhu, Y. G. Wang and Y. Y. Xia, Energ. Environ. Sci., 2012, 5, 6652-6667.
X. H. Wang, X. W. Li, X. L. Sun, F. Li, Q. M. Liu, Q. Wang and D. Y. He, J. Mater. Chem., 2011, 21, 3571-3573.
F. Y. Cheng, H. B. Wang, Z. Q. Zhu, Y. Wang, T. R. Zhang, Z. L. Tao and J. Chen, Energ. Environ. Sci., 2011, 4, 3668-3675.
J. W. Fergus, J. Power Sources, 2010, 195, 939-954.
V. Augustyn, R Simon and B. Dunn, Energ. Environ. Sci., 2014, 7, 1597-1614.
J. Wang, J. Polleux, J. Lim and B. Dunn, J. Phys. Chem. C, 2007, 111, 14925-14931.
M. M. Thackeray, Handbook of Battery Materials, 1998, DOI: 10.1002/9783527611676.ch13, 293-321.
Z. G. Yang, D. Choi, S. Kerisit, K. M. Rosso, D. H. Wang, J. Zhang, G. Graff and J. Liu, J. Power Sources, 2009, 192, 588-598.
H. Helmholtz, Annalen der Physik and Chemie, 1853, 165, 211-233.
B. E. Conway, J. 0. Bockris and I. A. Ammar, Transactions of the Faraday Society, 1951, 47, 756-766.
M. Gouy, Journal de Physique Theorique et Appliquee, 1910, 9, 457-468.
D. L. Chapman, Philosophical Magazine Series 6, 1913, 25, 475-481.
0. Stern, Zeit. Elektrochem, 1924, 30, 508-516.
W. Lu, R. Hartman, L. T. Qu and L. M. Dai, J. Phys. Chem. Lett., 2011, 2, 655-660.
L. L. Zhang, R. Zhou and X. S. Zhao, J. Mater. Chem., 2010, 20, 5983-5992.
M. Lu, F. Seguin and E. Frackowiak, Supercapacitors: Materials, Systems and Applications, John Wiley & Sons, 2013.
G. Wang, L. Zhang and J. Zhang, Chem. Soc. Rev., 2012, 41, 797-828.
C. C. Yu, L. X. Zhang, J. L. Shi, J. J. Zhao, J. H. Gao and D.S. Yan, Adv. Funct. Mater., 2008, 18, 1544-1554.
V. Subramanian, H. Zhu, R. Vajtai, P. M. Ajayan and B. Wei, J. Mater. Chem. B, 2005, 109, 20207-20214.
S. C. Pang, M.A. Anderson and T. W. Chapman, J. Electrochem. Soc., 2000, 147, 444-450.
J. N. Broughton and M. J. Brett, Electrochim. Acta, 2004, 49, 4439-4446.
B. Djurfors, J. N. Broughton, M. J. Brett and D. G. Ivey, J. Power Sources, 2006, 156, 741-747.
C. C. Hu and C. C. Wang, J. Electrochem. Soc., 2003, 150, A1079-A1084.
L. Z. Wang, Y. Omomo, N. Sakai, K Fukuda, I. Nakai, Y. Ebina, K. Takada, M. Watanabe and T. Sasaki, Chem. Mater., 2003, 15, 2873-2878.
M. Toupin, T. Brousse and D. Belanger, Chem. Mater., 2004, 16, 3184-3190.
Y. T. Wu and C. C. Hu, J. Electrochem. Soc., 2004, 151, A2060-A2066.
V. Subramanian, H. W. Zhu and B. Q. Wei, Pure Appl. Chem., 2008, 80, 2327-2343.
Z. F. Ren, Z. P.Huang, J. W. Xu, J. H. Wang, P. Bush, M. P. Siegal and P. N. Provencio, Science, 1998, 282, 1105-1107.
B. A. Cruden, A. M. Cassell, Q. Ye and M. Meyyappan, J. Appl. Phys., 2003, 94, 4070-4078.
A. V. Melechko, V. I. Merkulov, T. E. McKnight, M.A. Guillorn, K. L. Klein, D. H. Lowndes and M. L. Simpson, J. Appl. Phys., 2005, 97.
J. Li and G. P. Pandey, Annu. Rev. Phys. Chem., 2015, 66, null.
Office Action issued in related Japanese Patent Application No. 2019-182169, dated Dec. 17, 2019.
Notice of Preliminary Rejection issued in related Korean Patent Application No. 10-2019-7028127, dated Oct. 28, 2019.
Combined Search and Examination Report issued in related GB Patent Application No. 1916681.8, dated Dec. 20, 2019.
E. C. Landis, K. L. Klein, A. Liao, E. Pop, D. K. Hensley, A. V. Melechko and R. J. Hamers, Chem. Mater., 2010, 22, 2357-2366.
Q. Ngo, T. Yamada, M. Suzuki, Y. Ominami, A. M. Cassell, J. Li, M. Meyyappan and C. Y. Yang, IEEE T. Nanotechnol., 2007, 6, 688-695.
M. Meyyappan, L. Delzeit, A. Cassell and D. Hash, Plasma Sources Sci T, 2003, 12, 205-216.
R. A. Susantyoko, X. Wang, L. Sun, K. L. Pey, E. Fitzgerald and Q. Zhang, Carbon, 2014, 77, 551-559.
R. A. Susantyoko, X. H. Wang, Q. Z. Xiao, E. Fitzgerald and Q. Zhang, Carbon, 2014, 68, 619-627.
X. Wang, R. A. Susantyoko, Y. Fan, L. Sun, Q. Xiao and Q. Zhang, Small, 2014, 10, 2826-2829, 2742.
Q. Z. Xiao, Y. Fan, X. H. Wang, R. A. Susantyoko and Q. Zhang, Energ. Environ. Sci., 2014, 7, 655-661.
G. A. Malek, E. Brown, S. A. Klankowski, J. Liu, A. J. Elliot, R. Lu, J. Li and J. Wu, ACS Appl. Mater. Inter., 2014, 6, 6865-6871.
Y. Zheng, Kansas State University, 2014.
J. W. Liu, J. Essner and J. Li, Chem. Mater., 2010, 22, 5022-5030.
L. Z. Swisher, L. U. Syed, A. M. Prior, F. R. Madiyar, K. R. Carlson, T. A. Nguyen, D. H. Hua and J. Li, J. Phys. Chem. C, 2013, 117, 4268-4277.
L. Z. Swisher, A. M. Prior, S. Shishido, T. A. Nguyen, D. H. Hua and J. Li, Biosens. Bioelectron., 2014, 56, 129-136.
Madiyar et al, in Advances in Applied Nanotechnology for Agriculture, American Chemical Society, 2013, vol. 1143, ch. 6, pp. 109-124.
F. R. Madiyar, L U. Syed, C. T. Culbertson and J. Li, Electrophoresis, 2013, 34, 1123-1130.
F. R. Madiyar, S. Shana, L. Z. Swisher, C. T. Culbertson, X. Huang and J. Li, Nanoscale, 2015, 7, 3726-3736.
G. Baysinger, ed., CRC Handbook of Chemistry and Physics, National Institute of Standards and Technology, 2015.
M. Ohring, Materials science of thin films, Academic press, 2001.
W. Wang and P. N. Kumta, ACS Nano, 2010, 4, 2233-2241.

(56) References Cited

OTHER PUBLICATIONS

Q. Ngo, A. M. Cassell, A. J. Austin, L. Jun, S. Krishnan, M. Meyyappan and C. Y. Yang, IEEE Electron Device Lett., 2006, 27, 221-224.
L. U. Syed, J. W. Liu, A. M. Prior, D. H. Hua and J. Li, Electroanal, 2011, 23, 1709-1717.
E. C. Landis and R. J. Hamers, J. Mater. Chem. C, 2008, 112, 16910-16918.
D. Aurbach, M. D. Levi, E. Levi and A. Schechter, J. Phys. Chem. B, 1997, 101, 2195-2206.
D. Aurbach, Y. Talyosef, B. Markovsky, E. Markevich, E. Zinigrad, L. Asraf, J. S. Gnanaraj and H.J. Kim, Electrochim. Acta, 2004, 50, 247-254.
G. K. Simon and T. Goswami, Metallurgical and Materials Transactions a—Physical Metallurgy and Materials Science, 2011, 42A, 231-238.
P. B. Balbuena et al., Lithium-ion Batteries: Solid-Electrolyte Interphase, Imperial College Press, River Edge, NJ, 2004.
D.R. Lide, ed., CRC Handbook of Chemistry and Physics, CRC Press, New York, 2004.
M. Winter et al., in Lithium Batteries: Science and Technology, eds. G.-A. Nazri and G. Pistoia, Kluwer Academic Publishers, Boston, 2004, ch. 5, pp. 144-194.
T. D. Nguyen-Vu, H. Chen, A. M. Cassell, R. Andrews, M. Meyyappan and J. Li, Small, 2006, 2, 89-94.
W. Wan, Q. Zhang, Y. Cui and E. Wang, J Phys Condens Matter, 2010, 22,415501.
J. R. Szczech and S. Jin, Energ. Environ. Sci., 2011, 4, 56-72.
V. Etacheri, R. Marom, R. Elazari, G. Salitra and D. Aurbach, Energ. Environ. Sci., 2011, 4, 3243-3262.
D. Aurbach, eds. W. Schalkwijk and B. Scrosati, Springer US, 2002, DOI: 10.1007/0-306-47508-1-2, pp. 7-77.
I. I. Abdulhalim, R. Beserman and R. Weil, Phys Rev B Condens Matter, 1989, 39, 1081-1091.
S. A. Klankowski, R. A. Rojeski, B. A Cruden, J. Liu, J. Wu and J. Li, "A high-performance lithium-ion battery anode based on the core-shell heterostructure of silicon-coated vertically aligned carbon nanofibers", J. Mater. Chem. A, 2013, 1, 1055-1064.
J. A. Thornton, J. Vac. Sci. Technol. A, 1986, 4, 3059.
R. Messier, A. P. Girl and R. A. Roy, J. Vac. Sci. Technol. A, 1984, 2, 500-503.
I. Petrov, P. B. Barra, L. Hultman and J.E. Greene, J. Vac. Sci. Technol. A, 2003, 21, S117-S128.
120 Y. Fan, Q. Zhang, Q. Z. Xiao, X. H. Wang and K. Huang, Carbon, 2013, 59, 264-269.
B. B. Li, D. P. Yu and S. L. Zhang, Phys. Rev. B, 1999, 59, 1645-1648.
H. Kim and J. Cho, Nano Lett., 2008, 8, 3688-3691.
L. Martin, H. Martinez, M. Ulldemolins, B. Pecquenard and F. Le Cras, Solid State Ionics, 2012, 215, 36-44.
L.B. Chen, K. Wang, X. H. Xie and J. Y. Xie, J. Power Sources, 2007, 174, 538-543.
J. R. MacDonald, in Superionic Conductors, eds. G. Mahan and W. Roth, Springer US, 1976, DOI: 10.1007/978-1-4615-8789-7_6, ch. 6, pp. 81-97.
R. Ruffo, S. S. Hong, C. K. Chan, R. A. Huggins and Y. Cui, J. Phys. Chem. C, 2009, 113, 11390-11398.
T. Zhang, H.R Zhang, L. C. Yang, B. Wang, Y. P. Wu and T. Takamur, Electrochim. Acta, 2008, 53, 5660-5664.
B. Markovsky, M. D. Levi and D. Aurbach, Electrochim. Acta, 1998, 43, 2287-2304.
N. Ding, J. Xu, Y. X. Yao, G. Wegner, X. Fang, C. H. Chen and I. Lieberwirth, Solid State Ionics, 2009, 180, 222-225.
S. I. Lee, U. H. Jung, Y. S. Kim, M. H. Kim, D. J. Ahn and H. S. Chun, Korean J. Chem. Eng., 2002, 19, 638-644.
Y. M. Lee, J. Y. Lee, H. T. Shim, J. K. Lee and J. K. Park, J. Electrochem. Soc., 2007, 154, A515-A519.
J. H. Cho and S. T. Picraux, Nano Lett., 2014, 14, 3088-3095.
MIT, "Nanoscientists Fired Up about Battery Alternative", Nanotechnology, Feb. 8, 2006.
Patel, "Nanowire Advance for Lithium Batteries", Technology Review, Aug. 14, 2009.
PCT/US2010/034106, Search Report, dated Feb. 7, 2011.
PCT/US2010/036235, Search Report, dated Jan. 28, 2011.
PCT/US2010/036237, Search Report, dated Feb. 1, 2011.
PCT/US2011/026816, Search Report, dated Oct. 18, 2011.
PCT/US2011/037767, Search Report, dated Jan. 16, 2012.
PCT/US2013/028108, International Search Report and Written Opinion, dated May 3, 2013.
Poizot, P., et al., Nano-sized Transition-metal oxides as negative-electrode materials for lithium-ion batteries, Nature, vol. 407:496-499, Sep. 28, 2000.
Redden, Chris, "Nanowire Formation in Anodic Alumina Templates", pp. 1-13, Shelby Hall Room 151, 12:45pm, Nov. 11, 2008.
Sharma, Kai Renganathan, "Control of Diameter during Cnt Synthesis in the Three Methods", 2007.
Shwartz, Mark, Stanford Scientists Create Novel Silicon Electrodes that Improve Lithium-ion Battery Performance.
Signorelli, Riccardo, et al., "Carbon Nanotube Enhanced Ultracapacitor", MIT Laboratory for Electromagnetic and Electronic Systems, Dec. 2005.
Tarascon, J. M., "Towards the Next Generation of Li-ion Batteries Based on Nanomaterials", Apr. 3, 2006.
Yao, Yagang, et al., "Temperature-mediated growth of single-walled carbon-nanotube intramolecular juncitons," Nature Materials, vol. 6, Apr. 2007.
Hu, et al., "Si Nanoparticle-Decorated Si Nanowire Networks for Li-Ion Battery Anodes", Chem. Commun. Sep. 10, 2010, vol. 47, pp. 367-369.
Search Report and Written Opinion, Singapore application No. 11201405271X, dated Mar. 11, 2015.
Lee et al, "Synthesis of Vertically Aligned Carbon Nanofiber Films by RF Magnetron Sputtering", Mat Res Soc Symp Proc. vol. 675, 1-5, 2001.
N. E. I. C. (NEIC), Greenhouse Gases, Climate Change, and Energy, http://www.eia.gov/oiaf/1605/ggccebro/chapter1.html, Accessed Mar. 12, 2015, 2015.
D. P. Tans, Trends in Atmospheric Carbon Dioxide, http://ww.esrl.noaa.gov/gmd/ccgg/trends/, Accessed Jan. 28, 2015, 2015.
A. Luntz, J. Phys. Chem. Lett., 2015, 6, 300-301.
S. Kann, M. Shiao, C. Honeyman, N. Litvak, J. Jones and L. Cooper, US solar market insight report: 2015 year-in-review-Executive summary, 2015.
D. R. Dunn, J. Barrick, A. Sweeney, N. Davis, S. Thapa, R. S. Hankey, S. Kaplan, P. Smith and P. Lindstrom, ed. U. E. I. Administration, 2015.
B. Dunn, H. Karnath and J. M. Tarascon, Science, 2011, 334, 928-935.
R. Hensley, J. Newman and M. Rogers, McKinsey Quarterly, 2012, 3, 5-50.
S. J. Gerssen-Gondelach and A. P. C. Faaij, J. Power Sources, 2012, 212, 111-129.
A. J. Bard and L. R. Faulkner, Electrochemical methods: fundamentals and applications, Wiley New York, 1980.
M. Winter and R. J. Brodd, Chem. Rev., 2004, 104, 4245-4270.
W. Lu and L Dai, Carbon nanotube supercapacitors, INTECH Open Access Publisher, 2010.
D. V. Ragone, Review of battery systems for electrically powered vehicles, SAE Technical Paper, 1968.
B. E. Conway, Electrochemical supercapacitors: scientific fundamentals and technological applications, Kluwer Academic/Plenum: New York, 1999.
Q. Ngo et al., Nano Letters, 2004, 4, 2403-2407.
M. Yoshio, R. J. Brodd and A. Kozawa, Lithium-Ion Batteries, Springer, 2009.
T. Christen and M. W. Carlen, J. Power Sources, 2000, 91, 210-216.
M. S. Whittingham, Science, 1976, 192, 1126-1127.
B. Kumar and J. Kumar, J. Electrochem. Soc., 2010, 157, A611.
D. Aurbach, E. Zinigrad, Y. Cohen and H. Teller, Solid State Ionics, 2002, 148, 405-416.
T. R. Jow, K. Xu, 0. Borodin and M. Ue, Electrolytes for lithium and lithium-ion batteries,Springer,2014.

(56) References Cited

OTHER PUBLICATIONS

A. S. Arico, P. Bruce, B. Scrosati, J. M. Tarascon and W. van Schalkwijk, Nat. Mater., 2005, 4, 366-377.

W. J. Zhang, J. Power Sources, 2011, 196, 13-24.

A. Magasinski, P. Dixon, B. Hertzberg, A. Kvit, J. Ayala and G. Yushin, Nat. Mater., 2010, 9, 353-358.

C. K. Chan, H. Peng, G. Liu, K. McIlwrath, X. F. Zhang, R. A. Huggins and Y. Cui, Nat. Nanotechnol., 2008, 3, 31-35.

M. H. Park, M. G. Kim, J. Joo, K. Kim, J. Kim, S. Ahn, Y. Cui and J. Cho, Nano Lett., 2009, 9, 3844-3847.

L. M. Sun, X. H. Wang, R. A. Susantyoko and Q. Zhang, Carbon, 2015, 82, 282-287.

C. K. Chan, X. F. Zhang and Y. Cui, Nano Lett., 2008, 8, 307-309.

L. P. Tan, Z. Y. Lu, H. T. Tan, J. X. Zhu, X. H. Rui, Q. Y. Yan and H. H. Hng, J. Power Sources, 2012, 206, 253-258.

T. Kennedy, E. Mullane, H. Geaney, M. Osiak, C. O'Dwyer and K. M. Ryan, Nano Lett, 2014, 14, 716-723.

B. A. Boukamp, G. C. Lesh and R. A. Huggins, J. Electrochem. Soc., 1981, 128, 725-729.

H. Kim, C.-Y. Chou, J. G. Ekerdt and G. S. Hwang, J. Phys. Chem. C, 2011, 115, 2514-2521.

M R. Zamfir, H. T. Nguyen, E. Mayen, Y. H. Lee and D. Pribat, J. Mater. Chem. A, 2013, 1, 9566-9586.

E. Radvanyi, K. Van Havenbergh, W. Porcher, S. Jouanneau, J. S. Bridel, S. Put and S. Franger, Electrochim. Acta, 2014, 137, 751-757.

S. A. Klankowski, G. P. Pandey, B. A. Cruden, J. W. Liu, J. Wu, R. A. Rojeski and J. Li, J. Power Sources, 2015, 276, 73-79.

K. Ozawa, Lithium Ion Rechargeable Batteries: Materials, Technology, and New Applications, John Wiley & Sons, 2012.

B. Markovsky, A. Rodkin, G. Salitra, Y. Talyosef, D. Aurbach and H.J. Kim, J. Electrochem. Soc., 2004, 151, A1068-A1076.

J. Wang, Y. K. Zhou, Y. Y. Hu, R. O'Hayre and Z. P. Shao, J. Phys. Chem. C, 2011, 115,2529-2536.

L. Kavan, J. Solid State Electrochem., 2014, 18, 2297-2306.

R. Van Noorden, Nature, 2014, 507, 26-28.

M. Armand and J. M. Tarascon, Nature, 2008, 451, 652-657.

P. Simon, Y. Gogotsi and B. Dunn, Science, 2014, 343, 1210-1211.

P. G. Bruce, B. Scrosati and J. M. Tarascon, Angew. Chem. Int. Ed. Engl., 2008, 47, 2930-2946.

M. Okubo, E. Hosono, J. Kim, M. Enomoto, N. Kojima, T. Kudo, H. Zhou and I. Honma, J. Am. Chem. Soc., 2007, 129, 7444-7452.

Lithium-ion battery, Wikipedia, http://en.wikipedia.org/wiki/Lithium-ion_battery, pp. 1-21.

Synthesis of Vertically Aligned Carbon Nanofiber Films by RF Magnetron Sputtering, Defense Technical Information Center Compilation Part Notice, ADP012146, Symposium Apr. 17-20, 2001, San Francisco, CA., pp. 1-5.

PCT/US2013/049382, Rojeski, Ronald A., et al., International Search Report and Written Opinion, dated Oct. 8, 2013, 15 pages.

Klankowski, S. A., et al., Nanostructured Hybrid Li-Ion Anode, J. Mater. Chem. A., 1/1055-1064, (2013), 11 pages.

Long, Jeffrey W., Three-Dimensional Battery Architectures, Chem. Rev., 104/4463-4492, (2004), 30 pages.

Zhu, Guan-Nan, Ti-based Compounds as Anode Materials for Li-ion Batteries, Energy Environ. Sci., 5, 6652-6667, (2012), 16 pages.

Horstmann, Birger, et al., Rate-dependent morphology of $Li_2O_2$ growth in $Li-O_2$ batteries, arXiv:1307.6621v1, [physics.chem-ph] (Jul. 25, 2013).

Christensen, Jake, et al., A Critical Review of Li/Air Batteries, Journal of The Electrochemical Society; 159(2) R1-R30, (2012).

JP2010-547867, Non-Final Office Action, dated Jul. 30, 2013, pp. 1-9.

PCT/US2013/028108, Search Report and Written Opinion, dated May 3, 2013, pp. 1-13.

Arthur, Timothy S., et al., Three-dimensional Electrodes and Battery Architectures, MRS Bulleting, 36/523-531, (Jul. 2011), 9 pages.

JP2010-236771 Office Action dated Jan. 21, 2014, pp. 1-10.

DE11 2009 000 443.1 First Office Action dated Jan. 14, 2014, pp. 1-5.

DE11 2009 000 443.1 Response to First Office Action dated Jun. 2, 2014, pp. 1-34.

CN200980106188.5 Third Office Action dated Jan. 3, 2014, pp. 1-15.

CN201010519800.6 First Office Action dated May 1, 2014, pp. 1-11.

Extended European Search Report issued in related European Patent Application No. 19207794.9, dated Mar. 9, 2020.

Extended European Search Report issued in related European Patent Application No. 19157669.3, dated Jul. 26, 2019.

\* cited by examiner

ENERGY STORAGE DEVICES

CROSS-REFERENCE TO RELATED APPLICATIONS

This application is a continuation of U.S. non-provisional patent application Ser. No. 15/946,102 filed Apr. 5, 2018 (now U.S. Pat. No. 10,665,858), which is a continuation of U.S. non-provisional patent application Ser. No. 14/262,497 filed Apr. 25, 2014 (now U.S. Pat. No. 9,979,017), which is continuation of U.S. non-provisional patent application Ser. No. 13/868,957 filed Apr. 23, 2013; a continuation of U.S. non-provisional patent application Ser. No. 13/779,409 filed Feb. 27, 2013; a continuation-in-part of U.S. non-provisional patent application Ser. No. 13/725,969 filed Dec. 21, 2012 (now U.S. Pat. No. 9,412,998), which claimed priority to U.S. provisional patent applications 61/578,545 filed Dec. 21, 2011, 61/603,833 filed Feb. 27, 2012 and 61/615,179 filed Mar. 23, 2012, and which in turn is a continuation-in-part of U.S. non-provisional patent application Ser. No. 12/392,525 filed Feb. 25, 2009 now U.S. Pat. No. 8,420,258; a continuation-in-part of U.S. non-provisional patent application Ser. No. 12/904,113 filed Oct. 13, 2010 which in turn claims benefit and priority to U.S. provisional patent application 61/254,090 filed Oct. 22, 2009; and claims benefit and priority to U.S. provisional patent applications: 61/667,876 filed Jul. 3, 2012, 61/677,317 filed Jul. 30, 2012, and 61/752,437 filed Jan. 14, 2013.

This application is related to U.S. non-provisional patent applications Ser. Nos. 13/779,571, 13/779,472 and 13/779,522 filed Feb. 27, 2013. The disclosures of all the above provisional and non-provisional patent applications are hereby incorporated herein by reference.

BACKGROUND

Field of the Invention

The invention is in the field of energy storage devices, including but not limited to batteries, capacitors and fuel cells.

Related Art

Rechargeable lithium ion batteries are key electrical energy storage devices for power supply in portable electronics, power tools, and future electric vehicles. Improving the specific energy capacity, charging/discharging speed, and cycling lifetime is critical for their broader applications.

In current commercial Li-ion batteries, graphite or other carbonaceous materials are used as the anodes which have a theoretical capacity limit at 372 mAh/g by forming fully intercalated $LiC_6$ compound. In contrast, silicon has a much higher theoretical specific capacity of 4,200 mAh/g by forming fully lithiated alloy $Li_{4.4}Si$. However, the large volume expansion of lithiated Si by up to 300% causes great structural stress that in the past inevitably lead to fractures and mechanical failure, which significantly limited the lifetime of Si anodes.

SUMMARY

In some embodiments, a power storage device includes a hybrid core-shell NW (nano-wire) architecture in a high-performance Li-ion anode by incorporating an array of vertically aligned carbon nanofibers (VACNFs) coaxially coated with a layer of amorphous silicon. The vertically aligned CNFs include multiwalled carbon nanotubes (MWCNTs), which are optionally grown on a Cu substrate using a DC-biased plasma chemical vapor deposition (PECVD) process. The carbon nanofibers (CNFs) grown by this method can have a unique interior morphology distinguishing them from the hollow structure of common MWCNTs and conventional solid carbon nanofibers. One of the distinguishing characteristics is that these CNFs optionally consist of a series of bamboo-like nodes across the mostly hollow central channel. This microstructure can be attributed to a stack of conical graphitic cups discussed further elsewhere herein. In larger length scale, these PECVD-grown CNFs are typically uniformly aligned normal to the substrate surface and are well separated from each other. They may be without any entanglement or with minimal entanglement, and thus form a brush-like structure referred to as a VACNF array. The diameter of individual CNFs can be selected to provide desired mechanical strength so that the VACNF array is robust and can retain its integrity through Si deposition and wet electrochemical tests.

Various embodiments of the invention include types of support filaments other than VACNFs. These support filaments can include, for example, nanowires, carbon sheets or other structures described herein. Other embodiments do not include any support filaments and use a binder instead.

Various embodiments of the invention include an energy storage system comprising a conductive substrate; a plurality of vertically aligned carbon nanofibers grown on the substrate, the carbon nanofibers including a plurality multi-walled carbon nanotubes; and an electrolyte including one or more charge carriers.

Various embodiments of the invention include an energy storage system comprising a conductive substrate; a plurality of vertically aligned carbon nanofibers grown on the substrate; and a layer of intercalation material disposed on the plurality of vertically aligned carbon nanofibers and configured to have a lithium ion storage capacity of between approximately 1,500 and 4,000 mAh per gram of intercalation material.

Various embodiments of the invention include an energy storage system comprising a conductive substrate; a plurality of vertically aligned carbon nanofibers grown on the substrate; and a layer of intercalation material disposed on the plurality of vertically aligned carbon nanofibers and configured such that an ion storage capacity of the intercalation material is approximately the same at charging rates of 1C and 3C.

Various embodiments of the invention include a method of producing an energy storage device, the method comprising providing a substrate; growing carbon nanofibers on the substrate, the carbon nonofibers having a stacked-cone structure; and applying intercalation material to the carbon nanofibers, the intercalation material being configured for intercalation of charge carriers.

Various embodiments of the invention include an energy storage system comprising: an electrolyte including one or more charge carriers; a conductive substrate; a plurality of vertically aligned support filaments attached to the substrate; intercalation material disposed on each of the support filaments and configured to reversibly adsorb members of the charge carriers within a bulk of the intercalation material; and a binder disposed on the intercalation material and including a plurality of nanoparticles, each of the nanoparticles being configured to provide surface effect dominant sites configured to adsorb members of the charge carriers via faradaic interactions on surfaces of the nanoparticles.

Various embodiments of the invention include an energy storage system comprising: an electrolyte including one or more charge carriers; a conductive substrate; a plurality of support filaments attached to the substrate; intercalation material disposed on each of the support filaments and configured to reversibly adsorb members of the charge carriers within a bulk of the intercalation material; and a binder disposed on the intercalation material and including a plurality of surface effect dominant sites configured to catalyze intercalation of the charge carriers into the intercalation material.

Various embodiments of the invention include an energy storage system comprising: an electrolyte including one or more charge carriers; a conductive substrate; intercalation material configured to reversibly adsorb members of the charge carriers within a bulk of the intercalation material; and a binder disposed on the intercalation material and including a plurality of nanoparticles, each of the nanoparticles being configured to provide surface effect dominant sites configured to donate electrons to members of the charge carriers via faradaic interactions on surfaces of the nanoparticles.

Various embodiments of the invention include an energy storage system comprising: a cathode; and an anode separated from the cathode by an electrolyte including one or more charge carriers, the anode comprising, an intercalation material configured to intercalate the charge carriers and to donate electrons to the charge carriers at a first reaction potential, a plurality of nanoparticles including surface effect dominant sites configured to donate electrons to the charge carriers at a second reaction potential, a absolute difference between the first reaction potential and the second reaction potential being less than 2.4V.

Various embodiments of the invention include a system comprising: means for establishing a potential gradient at an anode of a charge storage device, the anode including an electrolyte, a plurality of surface effect dominant sites, an intercalation material and a substrate; means for receiving a charge carrier of the electrolyte at one of the surface effect dominant sites; means for receiving an electron at the charge carrier from one of the surface effect dominant sites; and means for receiving a charge carrier at the intercalation material.

Various embodiments of the invention include a method of producing an energy storage device, the method comprising: providing a conductive substrate; growing support filaments on the substrate; applying intercalation material to the support nanofibers, the intercalation material being configured for intercalation of charge carriers; and applying a plurality of surface effect dominant sites in close proximity to the intercalation material.

Various embodiments of the invention include a method of producing an anode, the method comprising: providing a conductive substrate; mixing a binding material, surface effect dominant sites and intercalation material, the surface effect dominant sites being configured to accept electrons from charge carriers at a first reaction potential and the intercalation material being configured to accept the charge carriers or electrons from the charge carriers at a second reaction potential; and applying the binding material, surface effect dominant sites and intercalation material to the substrate.

Various embodiments of the invention include a method of producing an energy storage device, the method comprising: providing a conductive substrate; providing support filaments; applying intercalation material to the support filaments, the intercalation material being configured for intercalation of charge carriers; and adding surface effect dominant sites to the support filaments.

Various embodiments of the invention include a method of charging a charge storage device, the method comprising establishing a potential between a cathode and an anode of the charge storage device, the charge storage device including an electrolyte; receiving a first charge carrier of the electrolyte at a surface effect dominant site of the anode; transferring an electron of the anode to the first charge carrier; receiving a second charge carrier of the electrolyte at an intercalation material of the anode; and transferring an electron from the intercalation material to the second charge carrier.

Various embodiments of the invention include a method of charging a charge storage device, the method comprising: establishing a potential gradient at an anode of the charge storage device, the anode including an electrolyte, a plurality of nanoparticles having surface effect dominant sites, an intercalation material and a substrate; receiving a first charge carrier of the electrolyte at one of the surface effect dominant sites; transferring an electron to the first charge carrier from the one of the surface effect dominant sites; receiving a second charge carrier at the intercalation material of the anode; and transferring an electron from the intercalation material to the second charge carrier.

DETAILED DESCRIPTION

FIGS. A and 1B illustrate a CNF Array 100 comprising a plurality of CNF 110 grown on a conductive Substrate 105, according to various embodiments of the invention. In FIG. TA the CNF Array 100 is shown in the Li extracted (discharged) state and in FIG. 1B the CNF Array 100 is shown in the Li inserted (charged) state. The CNF 110 in these and other embodiments discussed herein are optionally vertically aligned. The CNF 110 are grown on a Substrate 105 of Cu using a DC-biased plasma chemical vapor deposition (PECVD) process. As discussed above, the CNFs 110 grown by this method can have a unique morphology that includes a stack of conical graphitic structures similar to stacked cups or cones or a spiral. This creates a very fine structure that facilitates lithium intercalation. This structure is referred to here as the "stacked-cone" structure elsewhere herein. In larger length scale, these CNFs 110 are typically uniformly aligned normal to the substrate surface and are well separated from each other. The diameter of individual CNFs can be selected to provide desired mechanical strength so that the CNF Array 100 is robust and can retain its integrity through Si deposition and wet electrochemical cycles. A seed layer is optionally employed for growing CNFs 110 on Substrate 105. In use the CNF Array 100 is placed in contact with an Electrolyte 125 including one or more charge carriers, such as a lithium ion. The CNFs 110 are configured such that some of Electrolyte 125 is disposed between CNFs 110 and/or can ready Substrate 105 via gaps between CNFs 110.

Figure 1A:
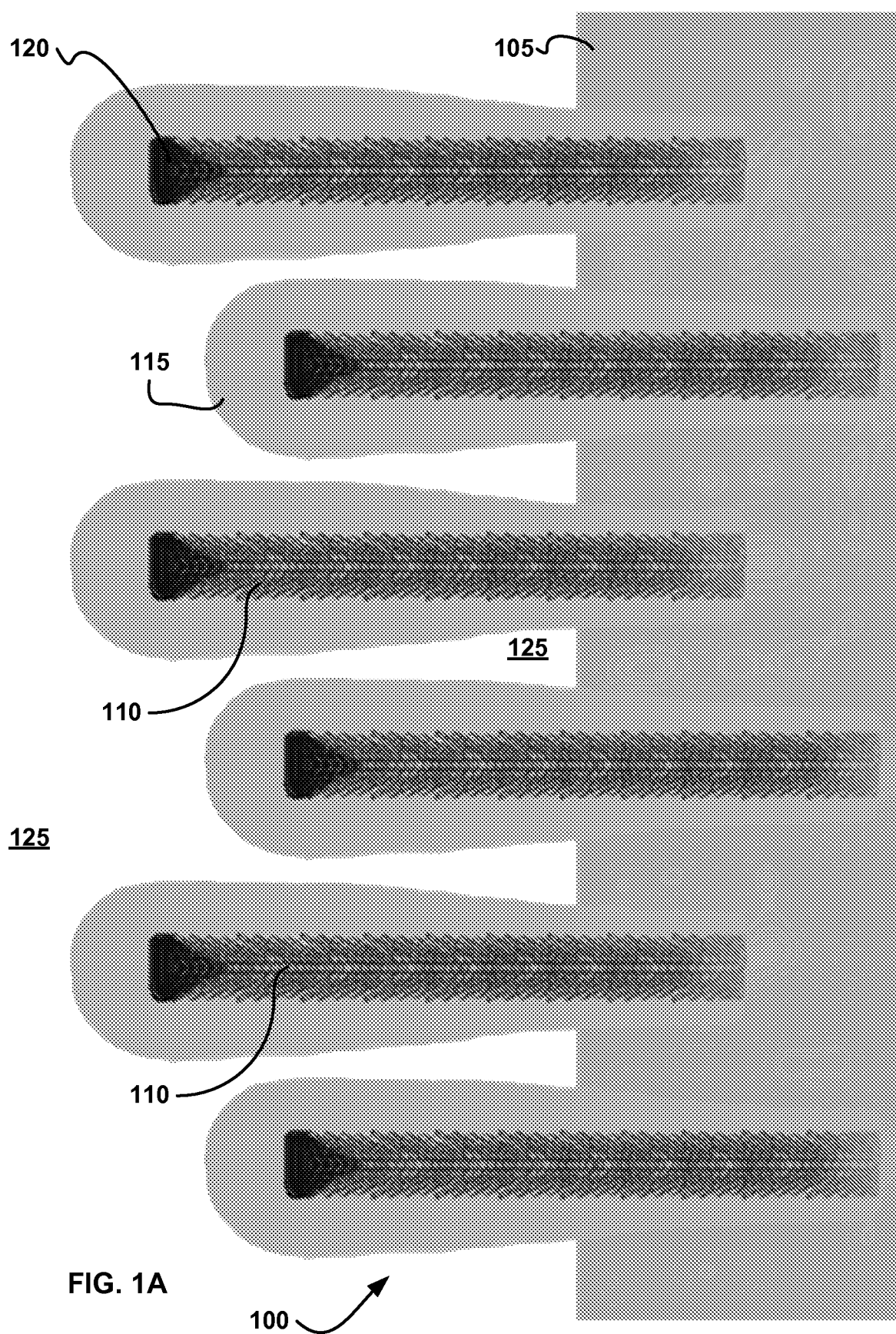
FIGS. 1A and 1B illustrate a CNF array comprising a plurality of CNF grown on a substrate, according to various embodiments of the invention.
Figure 1B:
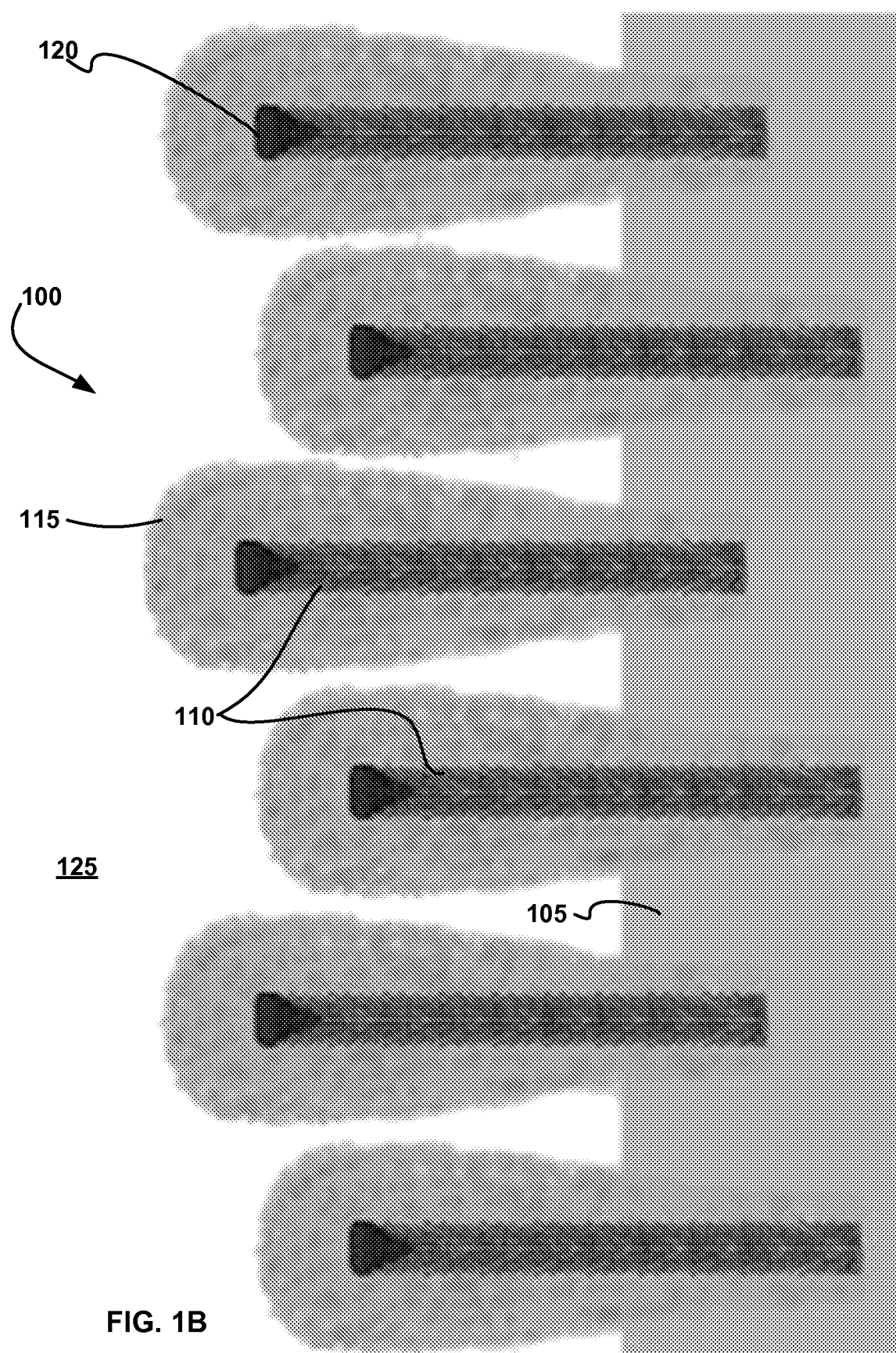

The diameter of individual CNFs 110 illustrated in FIGS. 1A and 1B are nominally between 100 and 200 nm, although diameters between 75 and 300 nm, or other ranges are possible. CNFs 110 are optionally tapered along their length. The CNFs 110 produced using the techniques discussed herein have excellent electrical conductivity ($\sigma=\sim2.5\times10^5$ S/m) along the axis and do form firm Ohmic contact with Substrate 105. The open space between the CNFs 110 enables a Silicon Layer 115 to be deposited onto each CNFs to form a gradually thinned coaxial shell with a mass at a Tip 120 of the CNF 110. This design enables the whole Silicon Layer 115 to be electrically connected through the CNF 110 and to remain fully active during charge-discharge cycling. The expansion that occurs on alloying of lithium with Silicon Layer 115 can be easily accommodated in the radial direction, e.g. perpendicular to the long dimension of the CNFs 110. The charge and discharge capacity and cycling stability of non-Si-coated CNFs 110 and Si-coated CNFs 110 can be compared. The addition of Silicon Layer 115 provided a remarkable $Li^+$ insertion (charge) capacity up to 3938 mAh/gsi at the C/2 rate and retained 1944 mAh/gsi after 110 cycles. This charge/discharge rate and the corresponding capacity are significantly higher than previous architectures using Si nanowires or hybrid Si—C nanostructures. FIGS. 1A and 1B are perspective views.

In various embodiments, from 0.01 up to 0.5, 1.0, 1.5, 2.5, 3.0, 4.0, 10, 20, 25 µm (or more) nominal Si thickness can be deposited onto 3 µm long CNFs 110 to form CNF Arrays 100 such as those illustrated in FIGS. 1A and 1B. Likewise, in various embodiments, from 0.01 up 0.5, 1.0, 1.5, 2.5, 3.0, 4.0, 10, 20, 25 µm (or more) nominal Si thickness can be deposited onto 10 µm long CNFs 110 to form CNF Arrays 100. In some embodiments, the nominal thickness of Si is between 0.01 µm and the mean distance between CNFs 110.

Using CNF Arrays 100, Li ion storage with up to ~4,000 mAh/g mass-specific capacity at C/2 rate is achieved. This capacity is significantly higher than those obtained with Si nanowires alone or other Si-nanostructured carbon hybrids at the same power rate. The improved performance is attributed to the fully activated Si shell due to effective charge collection by CNFs 110 and short $Li^+$ path length in this hybrid architecture. Good cycling stability has been demonstrated in over 110 cycles. In various embodiments the storage capacity of Li ion storage of CNF Arrays 100 is approximately 750, 1500, 2000, 2500, 3000, 3500 or 4000 mAh per gram of Si, or within any range between these values. As used herein, the term "nominal thickness" (of e.g., Si) is the amount of Si that would produce a flat layer of Si, of the said thickness, on Substrate 105. For example, a nominal thickness of Si of 1.0 µm is an amount of Si that would result in a 1.0 µm thick layer of Si if deposited directly on Substrate 105. Nominal thickness is reported because it can easily be measured by weight using methods know in the art. A nominal thickness of 1.0 µm will result in a smaller thickness of Si Layer 115 on CNFs 110 because the Si is distributed over the greater area of the CNFs 110 surfaces.

Figure 2A:
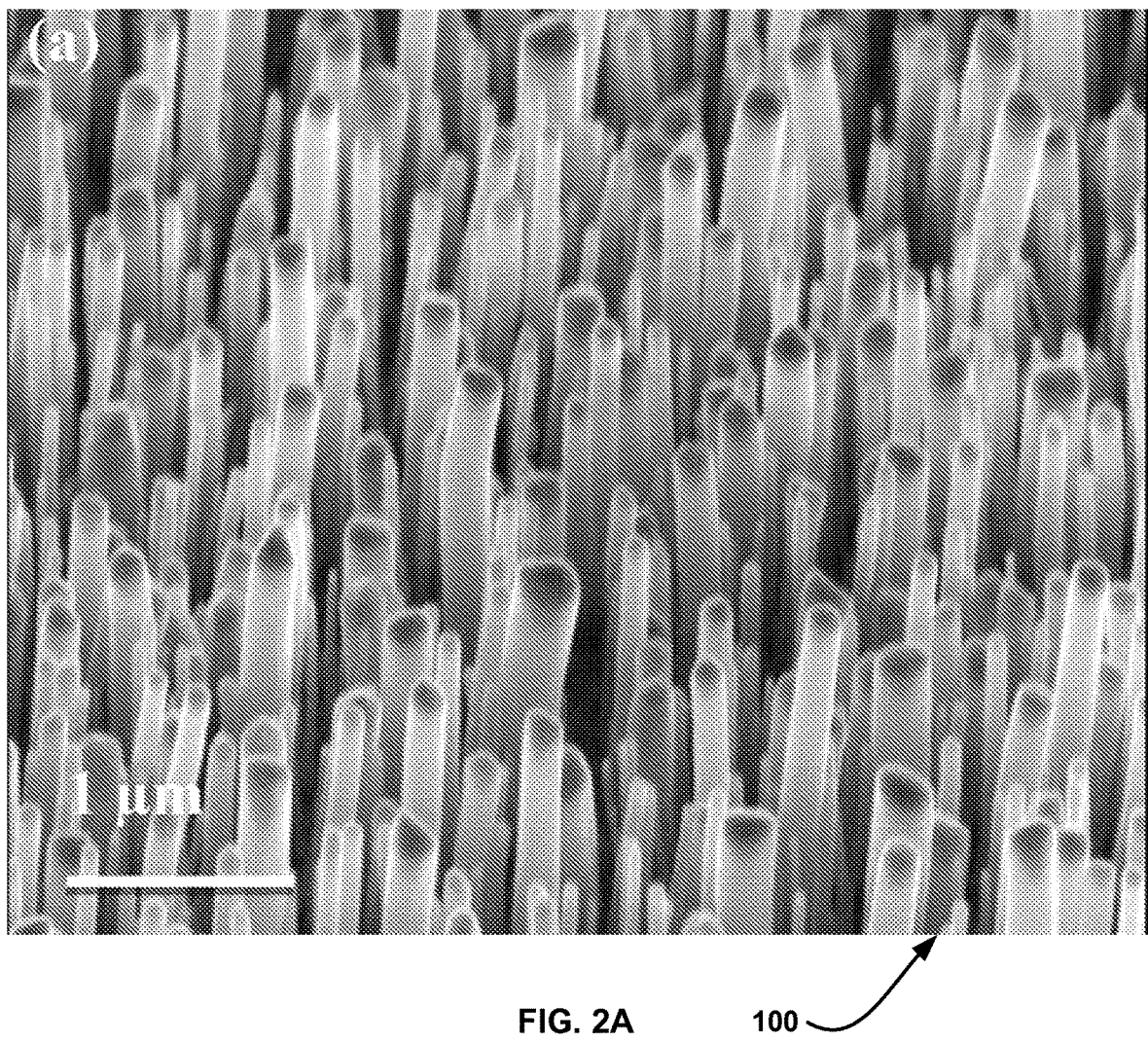
FIGS. 2A-2C illustrate a plurality of vertically aligned CNFs in different states, according to various embodiments of the invention.
Figure 2B:
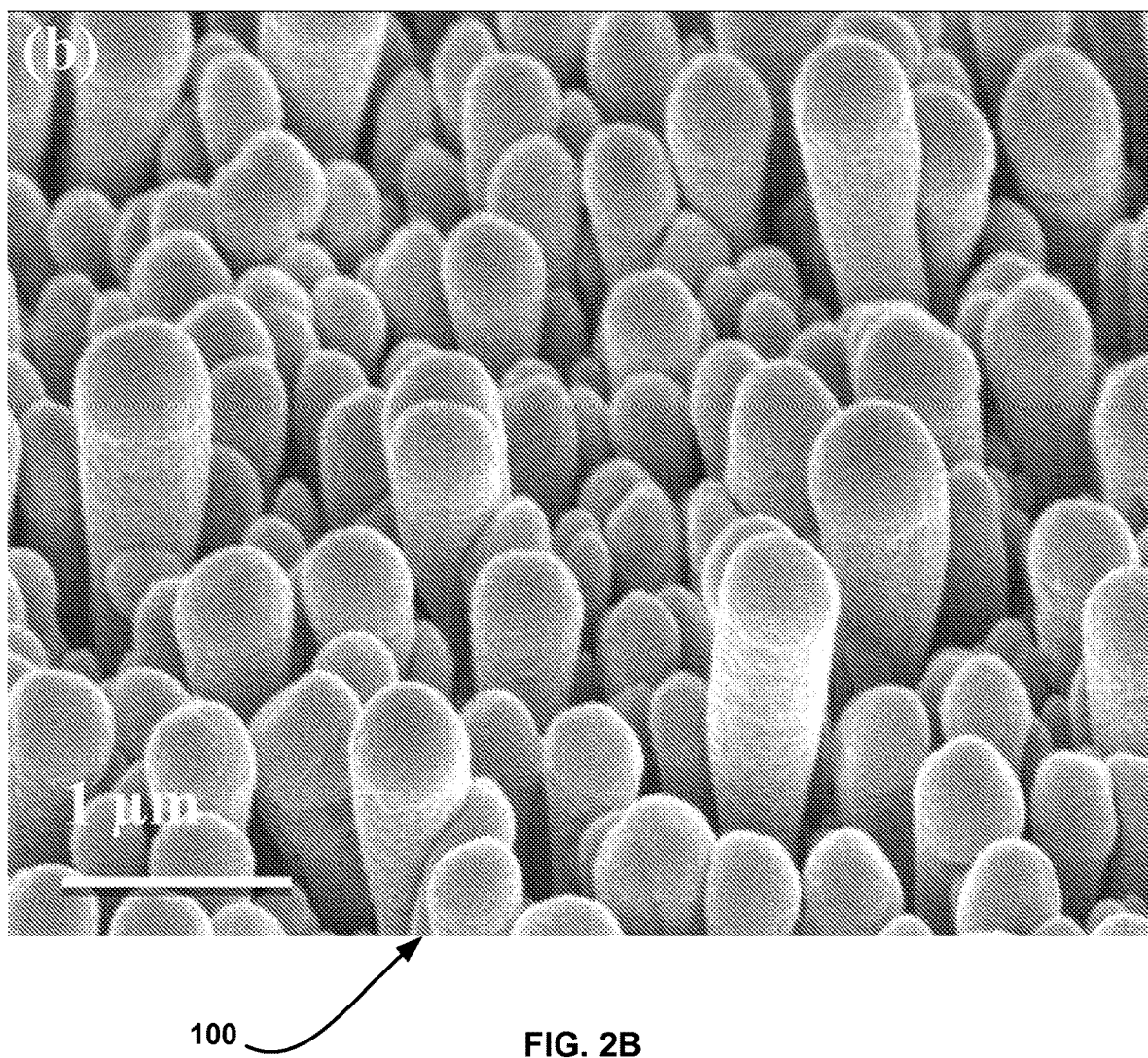
Figure 2C:

FIGS. 2A-2C illustrate CNF Array 100 having an average fiber length of approximately 3 µm, according to various embodiments of the invention. FIGS. 2A-2C are scanning electron microscopy (SEM) images. FIG. 2A shows a plurality of vertically aligned CNFs 110 without Silicon Layer 115. FIG. 2B shows a plurality of vertically aligned CNFs 110 including Silicon Layer 115. FIG. 2C shows a plurality of vertically aligned CNFs 110 in the extracted (discharged) state after experiencing 100 lithium charge-discharge cycles. The CNFs 110 are firmly attached to a Cu Substrate 105 with essentially uniform vertical alignment and a random distribution on the surface of the substrate. The samples used in this study have an average areal density of $1.11\times10^9$ CNFs/$cm^2$ (counted from top-view SEM images), corresponding to an average nearest-neighbor distance of ~330 nm. The average length of the CNFs 110 in FIG. 2 is ~3.0 μm with >90% of CNFs in the range of 2.5 to 3.5 μm in length. The diameter spreads from ~80 nm to 240 nm with an average of ~147 nm. An inverse teardrop shaped Ni catalyst at Tip 120 presents at the tip of each CNF 110 capping the hollow channel at the center of the CNF, which promoted the tip growth of CNF 110 during the PECVD process. The size of the Ni catalyst nanoparticles defined the diameter of each CNFs 110. Longer CNFs 110, up to 10 μm, were also employed in some studies to be discussed in later sections.

In various embodiments the average nearest neighbor distance can vary between 200-450 nm, 275-385 nm, 300-360 nm, or the like. Further, the average length of the CNFs 110 can be between approximately 2-20, 20-40, 40-60, 60-80, 80-100, 100-120, 120-250 (μm), or more. Standard carbon nanofibers as long as a millimeter long are known in the art. In various embodiments, the average diameter can vary between approximately 50-125, 100-200, 125-175 (nm), or other ranges.

An amorphous Si Layer 115 was deposited onto the CNF Array 100 by magnetron sputtering. The open structure of brush-like CNF Arrays 100 made it possible for Si to reach deep down into the array and produce conformal structures between the CNFs 110. As a result, it formed a thick Si coating at the CNF tip followed by a gradually thinned coaxial Si shell around the lower portion of the CNF, presenting an interesting tapered core-shell structure similar to a cotton swab. The amount of Si deposition is characterized by the nominal thickness of Si films on a flat surface using a quartz crystal microbalance (QCM) during sputtering. The $Li^+$ insertion/extraction capacities were normalized to the total Si mass derived from the nominal thickness. At 0.50 μm nominal thickness, the Si-coated CNFs 110 were well-separated from each other, forming an open core-shell CNF array structure (shown in FIG. 2B). This structure allowed electrolyte to freely accessing the entire surface of the Si Layer 115. In the embodiment illustrated the average tip diameter was ~457 nm in comparison with the ~147 nm average diameter of the CNFs 110 prior to application of the Si Layer 115. The average radial Si thickness at the Tip 120 was estimated to be ~155 nm. This was apparently much smaller than the 0.50 μm nominal Si thickness since most Si spread along the full length of CNFs. Other radial Si thicknesses in the range of 10-1000, 20-500, 50-250, 100-200 (nm) or different ranges are found in alternative embodiments. As discussed elsewhere herein, the stacked-cone of CNFs 110 provides additional fine structure to the Si Layer 115. The stacked-cone structure is optionally the result of a spiral growth pattern that produces the stacked-cone structure when viewed in cross-section.

Figure 3A:
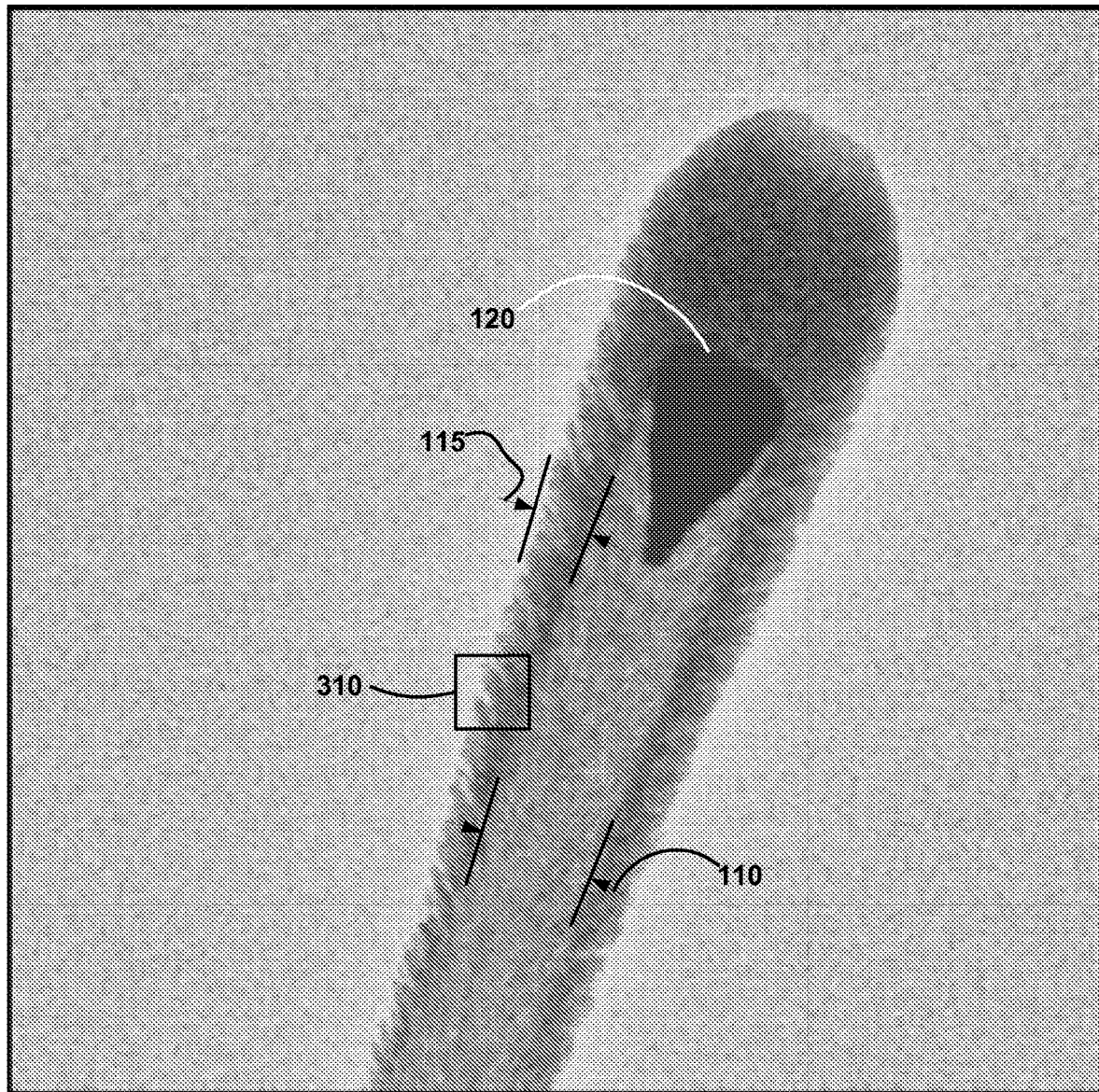
FIGS. 3A-3C illustrate details of a CNF, according to various embodiments of the invention.
Figure 3B:
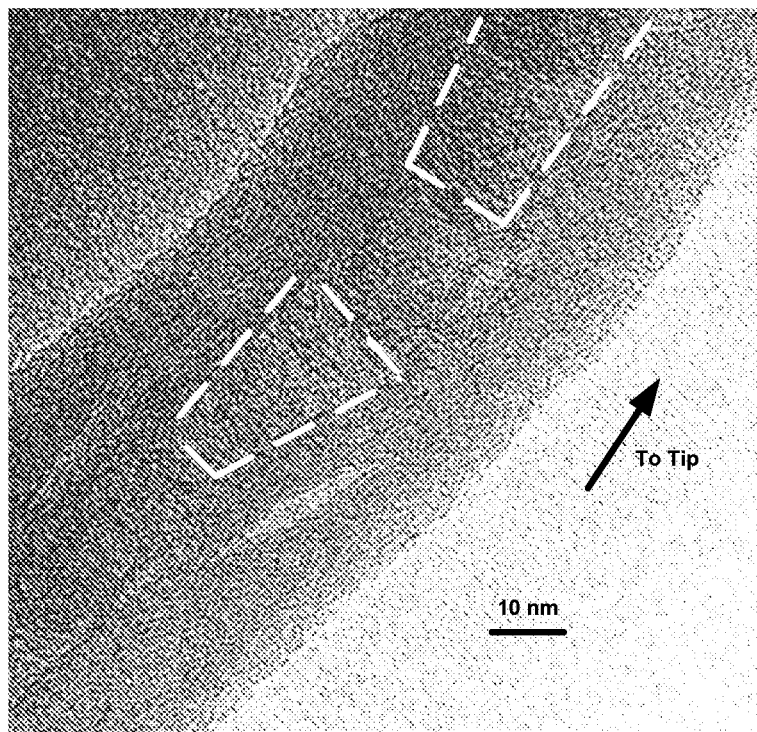
Figure 3C:
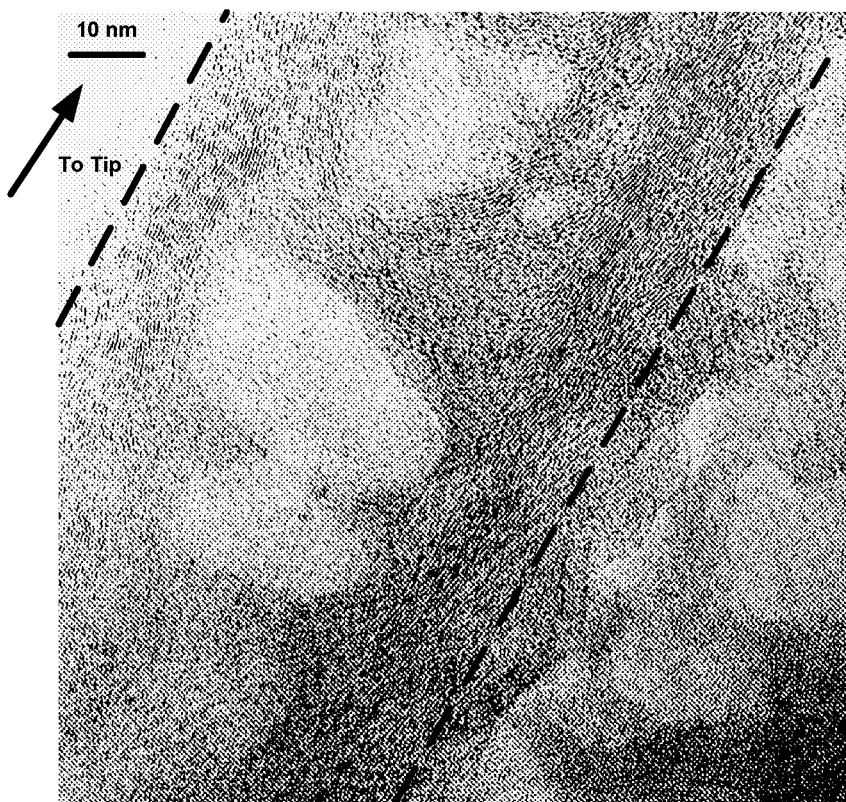

The transmission electron microscopy (TEM) images in FIGS. 3A-3C further illustrate the structural details of Si-coated CNFs 110. A Si Layer 115 of ~390 nm Si was produced directly above the Tip 120 of a ~210 nm diameter CNF 110. The largest portion of the cotton-swab-shaped Si Layer 115 was ~430 nm in diameter which appeared near the very end of the Tip 120. The coaxial Si Layer 115 around the CNF 110 showed a feather-like texture with modulated contrast, clearly different from the uniform Si deposits above the tip (see FIG. 3A). This is likely a result of the stacked-cone microstructure of the PECVD-grown CNFs 110. It is known from the literature that such CNFs 110 include unevenly stacked cup-like graphitic structures along the CNF 110 center axis. The use of such variations in the diameter of CNFs 110 was previously disclosed in commonly owned U.S. patent application Ser. No. 12/904,113 filed Oct. 13, 2010. The stacked-cone structure consists of more than ten cup-like graphitic layers that can be clearly seen in FIG. 3B as indicated by the dashed lines. The resolution and contrast of FIGS. 3B and 3C are limited since the electron beam needs to penetrate through hundreds of nanometer thick CNF or Si—CNF hybrid, but the structural characteristics are consistent with the high-resolution TEM studies using smaller CNFs in literature. This unique structure generated clusters of broken graphitic edges along the CNF sidewall which cause varied nucleation rates during Si deposition and thus modulate the density of the Si Layer 115 on the CNF 110 sidewall. The modulated density results in the ultra-high surface area Si structures indicated by a (100 nm square) Box 310 in FIG. 3A. The feather like Si structures of Si Layer 115 provide an excellent Li ion interface that results in very high Li capacity and also fast electron transfer to CNF 110. In FIG. 3A the dark area at Tip 120 is Nickel catalyst for growth of the CNFs. Other catalysts can also be used.

FIGS. 3B and 3C are images recorded before (3B) and after (3C) lithium intercalation/extraction cycles. The sample in 3C was in the delithiated (discharged) state when it was taken out of an electrochemical cell. The dashed lines in FIG. 3B are visual guidance of the stacked-cone graphic layers inside the CNFs 110. The long dashed lines in FIG. 3C represent the sidewall surface of the CNF 110.

Figure 4:
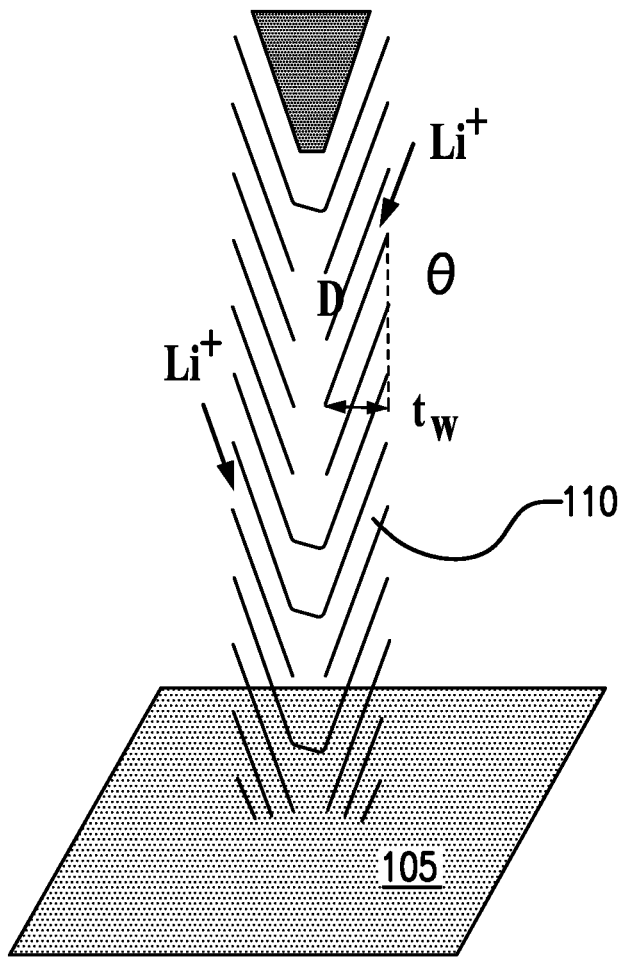
FIG. 4 illustrates a schematic of the stacked-cone structure of a CNF, according to various embodiments of the invention.

As discussed elsewhere herein, the stacked-cone structure of CNFs 110 is drastically different from commonly used carbon nanotubes (CNTs) or graphite. The stacked-cone structure results in improved $Li^+$ insertion, even without the addition of Si Layer 115, relative to standard carbon nanotubes or nanowires. For example, the stacked-cone graphitic structure of CNFs 110 allows $Li^+$ intercalation into the graphitic layers through the sidewall of CNFs 110 (rather than merely at the ends). The $Li^+$ transport path across the wall of each of CNFs 110 is very short (with D ~290 nm in some embodiments), quite different from the long path from the open ends in commonly used seamless carbon nanotubes (CNTs). FIG. 4 illustrates a schematic of the stacked-cone structure of CNFs 110. In this particular embodiment the average values of the parameters are: CNF radius $r_{CNF}$=74 nm, CNF wall thickness $t_w$=~50 nm, graphitic cone angle θ=10°, and the graphitic cone length $D=t_w/\sin θ$=290 nm.

Figure 5A:
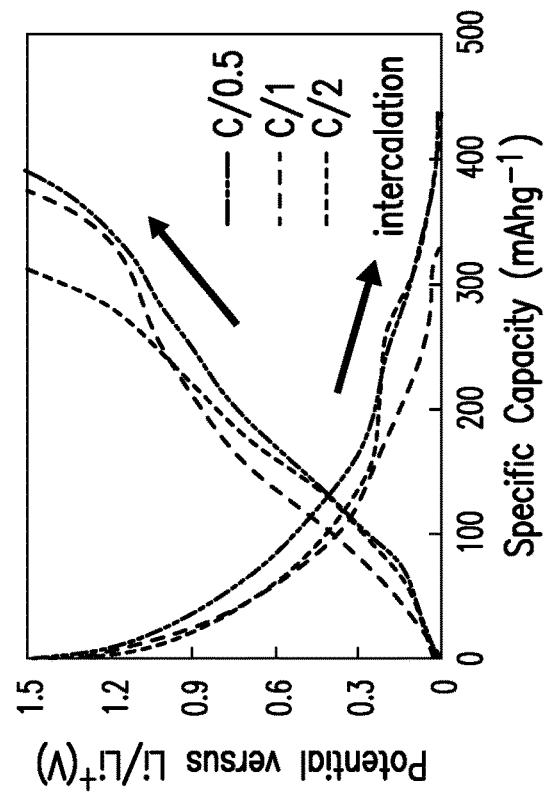
FIGS. 5A-5C illustrate an electrochemical characterization of ~3 μm long CNFs, according to various embodiments of the invention.
Figure 5B:
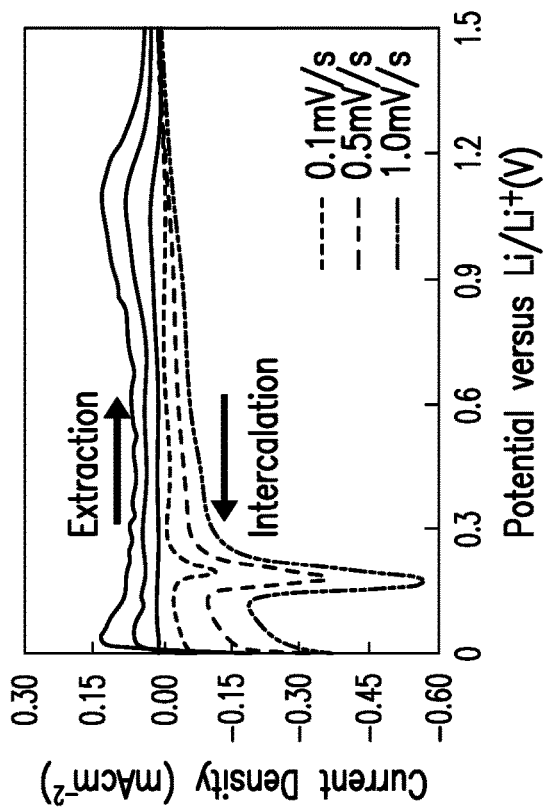
Figure 5C:
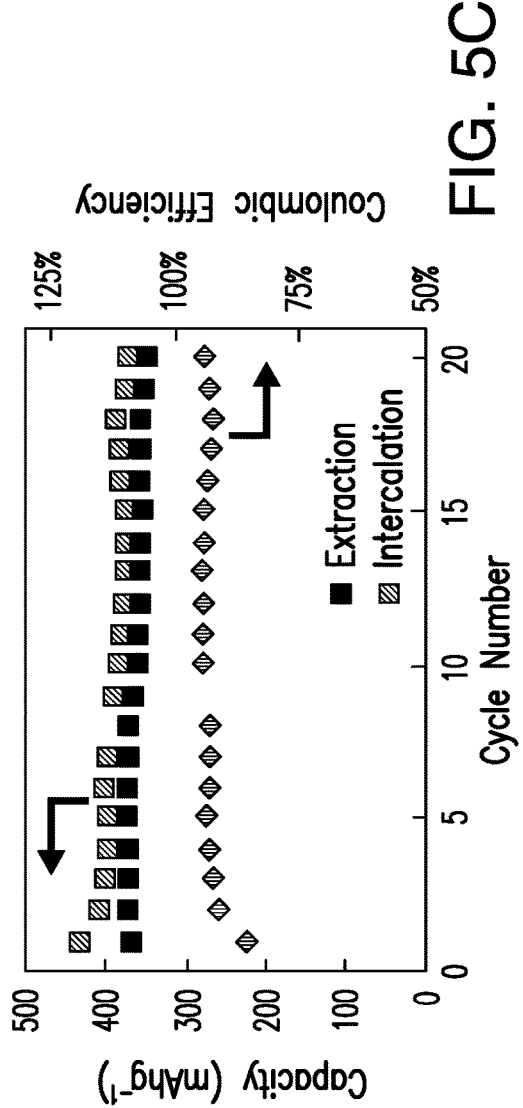

FIGS. 5A-5C illustrate an electrochemical characterization of ~3 μm long CNFs 110. This characterization illustrates the phenomenon described in relation to FIG. 4. FIG. 5A shows cyclic voltammograms (CV) from 1.5 V to 0.001 V versus a $Li/Li^+$ reference electrode at 0.1, 0.5 and 1.0 mV/s scan rates. A lithium disk was used as the counter electrode. Data were taken from the second cycle and normalized to the exposed geometric surface area. FIG. 5B shows the galvanostatic charge-discharge profiles at C/0.5, C1 and C/2 power rates, corresponding to current densities of 647, 323 and 162 mA/g (normalized to estimated carbon mass) or 71.0, 35.5 and 17.8 μA/cm2 (normalized to the geometric surface area), respectively. FIG. 5C shows intercalation and extraction capacities (to left vertical axis) and Coulombic efficiency (to right vertical axis) versus the cycle number at C/1 charge-discharge rate. (The C/1 discharge rate=1 hour, C/2 discharge rate=120 min, 2C=C/0.5=30 min, etc.)

A freshly assembled half-cell typically showed the open circuit potential (OCP) of the uncoated CNFs 110 anode was ~2.50 to 3.00 V vs. $Li/Li^+$ reference electrode. The CVs measured between 0.001 V and 1.50 V show that $Li^+$ intercalation starts as the electropotential is below 1.20 V. The first cycle from OCP to 0.001 V involved the formation of a necessary protective layer, i.e. the solid electrolyte interphase (SEI), by the decomposition of solvent, salts, and impurities and thus presented a large cathodic current. Subsequent CVs showed smaller but more stable currents. The cathodic current associated with Li$^+$ intercalation rose slowly as the electrode potential was swept to negative until a sharp cathodic peak appeared at 0.18 V. As the electrode potential was reversed to positive after reaching the low limit at 0.001 V, lithium extraction was observed in the whole range up to 1.50 V, indicated by the continuous anodic current and a broad peak at 1.06 V.

The CV features of CNF arrays 100 were somewhat different from those of staged intercalation into graphite and slow Li$^+$ diffusion into the hollow channel of CNTs. Li-ion insertion into CNFs 110 is likely through intercalation between graphitic layers from the sidewall due to its unique structure. The TEM image in FIG. 3C indicates that the graphitic stacks in the stacked-cones inside the CNF 110 are somewhat disrupted during Li$^+$ intercalation-extraction cycles, likely due to the large volume change that occurs on Li$^+$ intercalation. Some debris and nanoparticles are observed as white objects inside CNFs 110 as well as at the exterior surface.

The galvanostatic charge-discharge profiles in FIG. 5B showed that the Li$^+$ storage capacity decreased as the power rate was increased from C/2 to C/0.5 (C/0.5 is also referred to as "2C"). To make it easier to compare the rates (particularly for those higher than C/1), we use the fractional notation C/0.5 herein instead of "2C" that is more popularly used in the literature. The Li$^+$ intercalation and extraction capacities were normalized to the estimated mass of the CNFs 110 ($1.1\times10^4$ g/cm$^2$) that was calculated based on a hollow vertically aligned CNF structure with the following average parameters: length (3.0 µm), density ($1.1\times10^9$ CNFs per cm$^2$), outer diameter (147 nm), and hollow inner diameter (49 nm, ~⅓ of the outer diameter). The density of the solid graphitic wall of the CNFs 110 was assumed to be the same as graphite (2.2 g/cm$^3$). At the normal C/2 rate, the intercalation capacity was 430 mA h g-1 and the extraction capacity is 390 mA h g$^{-1}$, both of which are slightly higher than the theoretical value of 372 mA h g$^{-1}$ for graphite, which may be attributed to SEI formation and the irreversible Li$^+$ insertion into the hollow compartments inside the CNFs 110. The extraction capacities were found to be more than 90% of the intercalation values at all power rates and both the intercalation and extraction capacities decreased by ~9% as the power rate increased from C/2 to C/1 and by ~20% from C/1 to C/0.5, comparable to graphite anodes.

Upon charge-discharge cycling, the intercalation capacity was found to slightly drop from 410 mA h g$^{-1}$ to 370 mA h g$^{-1}$ after 20 cycles at the C/1 rate, while the extraction capacity was maintained between 375 and 355 mA h g$^{-1}$. The overall coulombic efficiency (i.e. the ratio of extraction capacity to intercalation capacity) was ~94%, except in the first two cycles due to SEI formation on the CNF 110 surface. The SEI film is known to form readily on carbonaceous anodes during the initial cycles which allows lithium ion diffusion but is electrically insulating, leading to an increase in series resistance. The TEM image (FIG. 3C) and SEM image (FIG. 6A) show that a non-uniform thin film was deposited on the CNF 110 surface during charge-discharge cycles. In some embodiments, the SEI serves as a sheath to increase the mechanical strength of the CNFs 110, preventing them from collapsing into microbundles by the cohesive capillary force of a solvent as observed in the study with other polymer coatings.

Figure 6A:
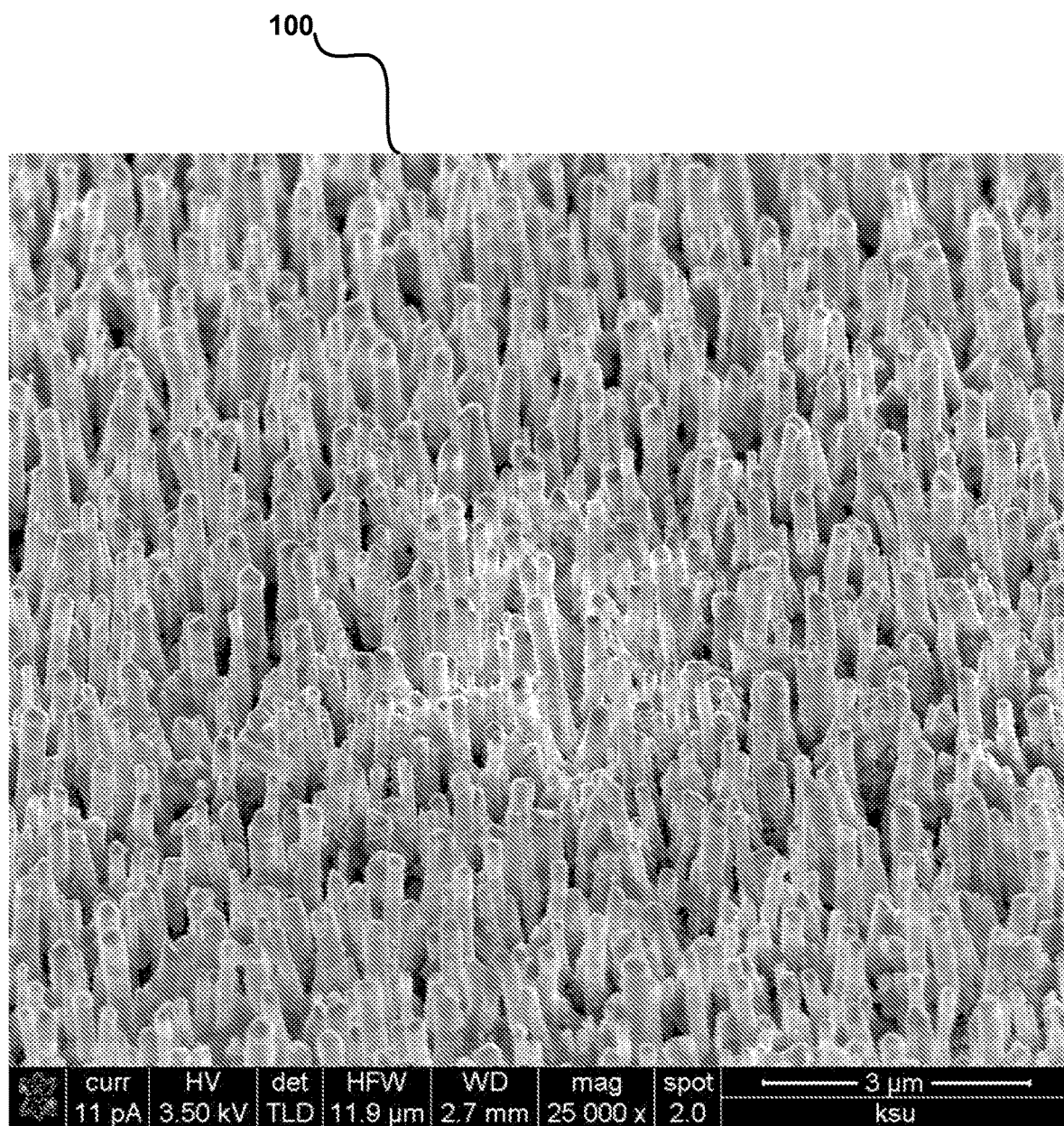
FIGS. 6A-6C illustrates scanning electron microscopy images of 3 μm long CNFs, according to various embodiments of the invention.
Figure 6B:
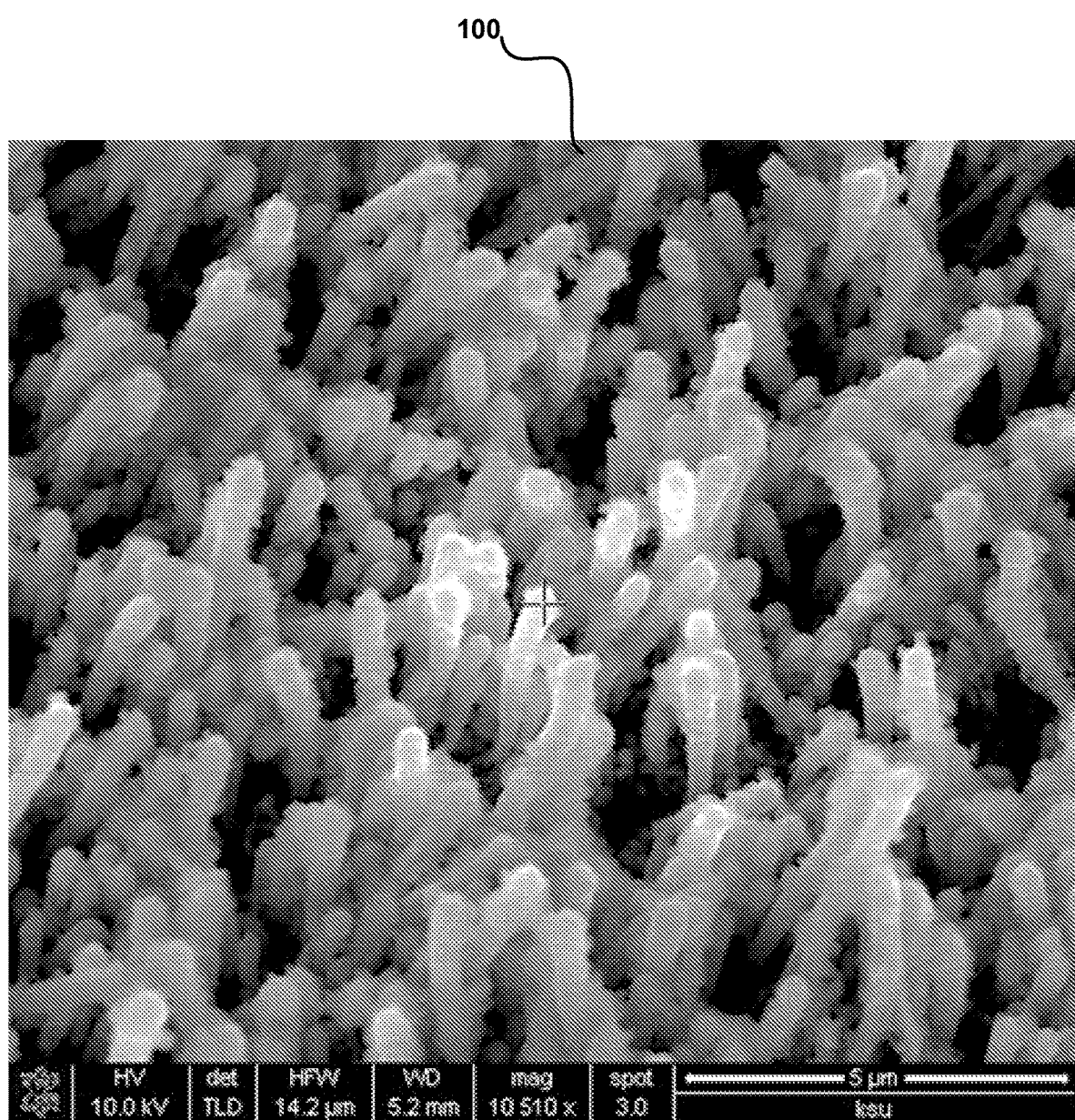
Figure 6C:
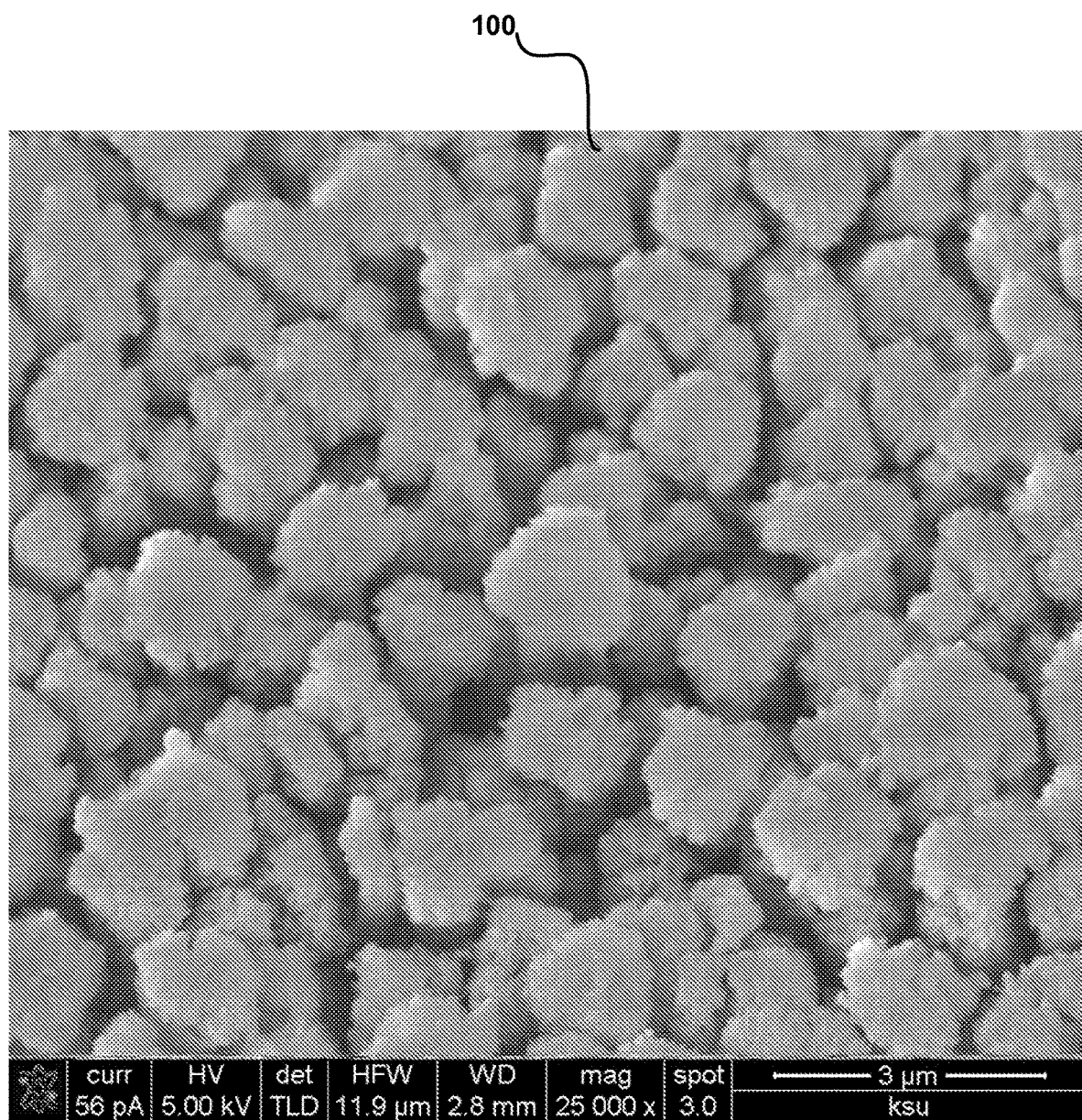

FIGS. 6A-6C illustrates scanning electron microscopy images of 3 µm long CNFs 110, according to various embodiments of the invention. FIG. 6A shows CNFs 110 in delithiated (discharged) state after intercalation/extraction cycles. FIG. 6B shows CNFs 110 including Si Layer 115 after 100 cycles in the delithiated state. FIG. 6C shows CNFs 110 including Si Layer 115 after 100 cycles in the lithiated state. These images are 45 degree perspective views.

Figure 7A:
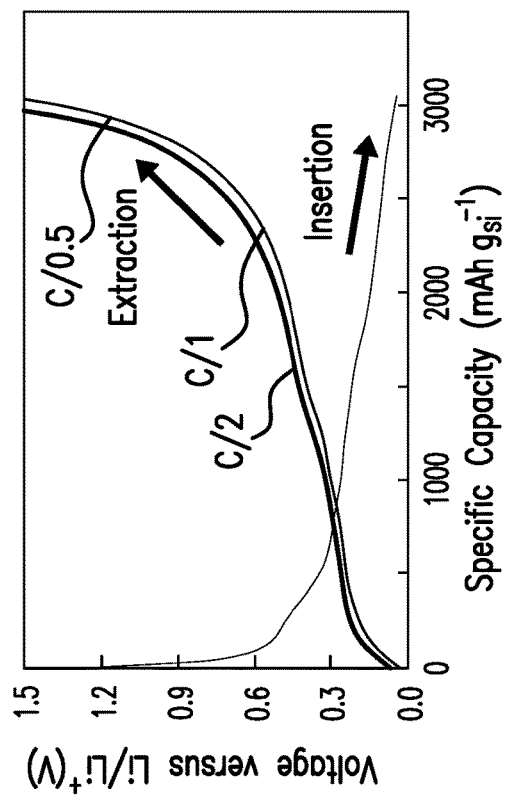
FIGS. 7A-7C illustrate results obtained using CNFs including a Si layer as Li-ion battery anodes, according to various embodiments of the invention.
Figure 7B:
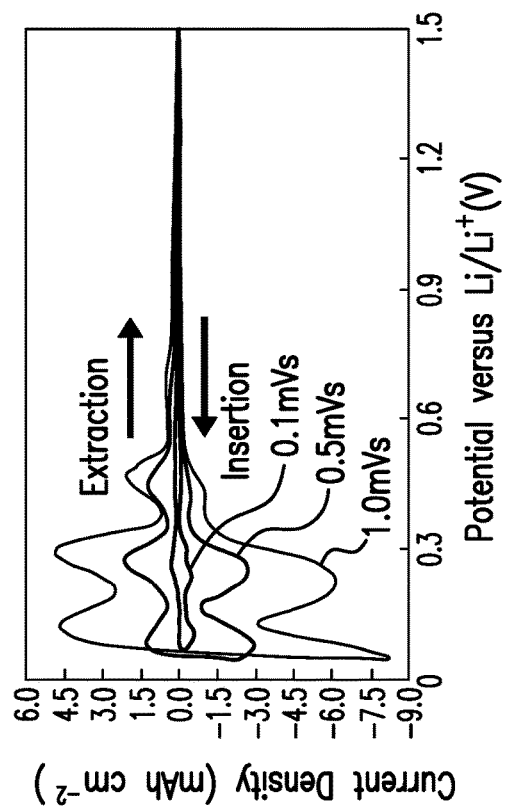
Figure 7C:
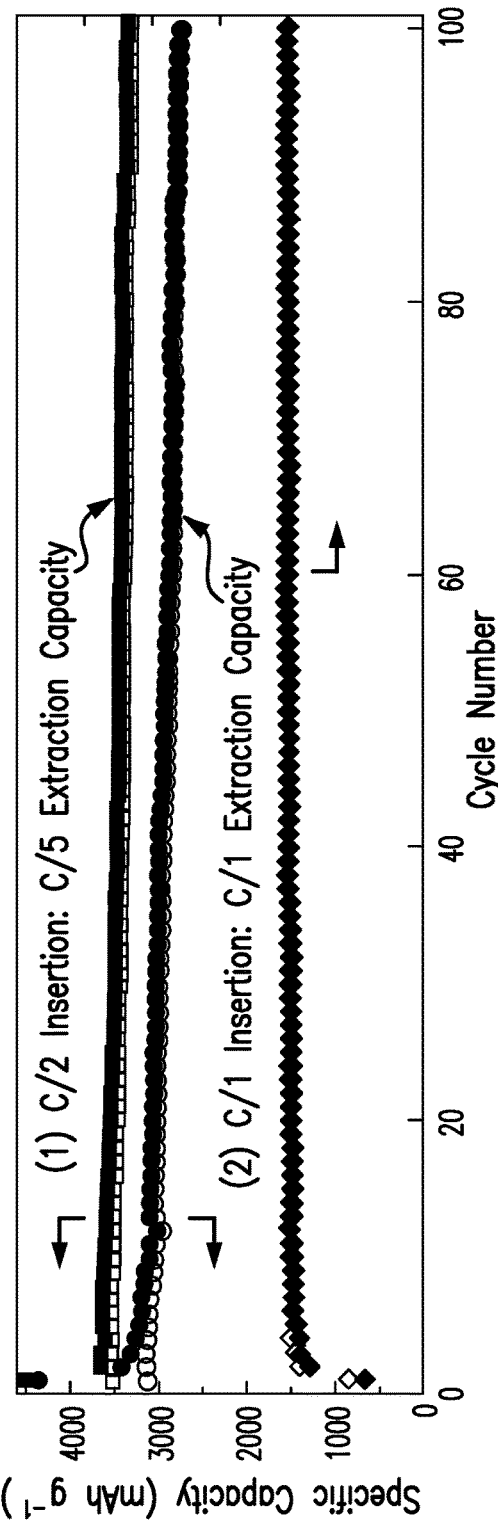

FIGS. 7A-7C illustrate results obtained using CNFs 110 including a Si Layer 115 as Li-ion battery anodes. These results were obtained using a nominal Si thickness of 0.50 µm. FIG. 7A shows cyclic voltammograms between 1.5 V and 0.05 V versus Li/Li$^+$ at 0.10, 0.50 and 1.0 mV s$^{-1}$ scan rates. The measurements were made after the sample going through 150 charge-discharge cycles and the data of the second cycle at each scan rate are shown. FIG. 7B shows galvanostatic charge-discharge profiles at C/0.5, C/1 and C/2 power rates with the sample at 120 cycles. All profiles were taken from the second cycle at each rate. FIG. 7C shows insertion and extraction capacities (to the left vertical axis) and coulombic efficiency (to the right vertical axis) of two CNF Arrays 100 (used as electrodes) versus the charge-discharge cycle number. The first CNF Array 100 was first conditioned with one cycle at the C/10 rate, one cycle at the C/5 rate, and two cycles at the C/2 rate. It was then tested at the C/2 insertion rate and C/5 extraction rate for the rest of the 96 cycles. The filled and open squares represent the insertion and extraction capacities, respectively. The second electrode was first conditioned with two cycles each at C/10, C/5, C/2, C/1, C/0.5 and C/0.2 rates. It was subsequently tested at the C/1 rate for the next 88 cycles. The columbic efficiencies of both electrodes are represented by filled (1st electrode) and open (2nd electrode) diamonds, which mostly overlap at 99%.

The CVs in FIG. 7A present very similar features to those of Si nano-wires. Compared to uncoated CNF Array 110, both the cathodic wave for Li$^+$ insertion and the anodic wave for Li$^+$ extraction shift to lower values (below ~0.5 and 0.7 V, respectively). The peak current density increases by 10 to 30 times after application of Si Layer 115 and is directly proportional to the scan rate. Clearly, alloy-forming Li$^+$ insertion into Si is much faster than intercalation into uncoated CNFs, which was limited by the slow diffusion of Li$^+$ between graphitic layers. The cathodic peak at ~0.28 V was not observed in previous studies on pure Si nanowires. The three anodic peaks representing the transformation of the Li—Si alloy into amorphous Si are similar to those with Si nanowires despite shifting to lower potentials by 100 to 200 mV.

The galvanostatic charge-discharge profiles of a CNF Array including Si Layer 115, shown in FIG. 7B included two remarkable features: (1) a high Li$^+$ insertion (charge) and extraction (discharge) capacity of ~3000 mA h (gsi)$^{-1}$ was obtained at the C/2 rate even after 120 cycles; and (2) the Li$^+$ capacity was nearly the same at the C/2, C/1, and C/0.5 power rates. In other words, the capacity of CNF Array 100 to operate as an electrode did not decline when charging rates were increased from C/2 to C/1 and C/0.5. Over these charging rates the capacity was nearly independent of charging rate, in various embodiments. The total Li$^+$ storage capacity of CNF Arrays 100 including Si Layer 115 was about 10 times greater than CNF Arrays 100 that lacked Si Layer 115. This occurred even though the low potential limit for the charging cycle was increased from 0.001 V to 0.050 V. As a result, the amount of Li$^+$ intercalation into the CNF core appears to have been negligible. The specific capacity was calculated by dividing only the mass of Si that was calculated from the measured nominal thickness and a bulk density of 2.33 g cm$^{-3}$. This method was chosen as an appropriate metric to compare the specific capacity of the Si Layer 115 to the theoretical value of bulk Si. For the 3.0 µm long CNFs 110 deposited with a Si Layer 115 of 0.456 µm nominal thickness, the real mass density of Si Layer 115 was ~$1.06 \times 10^{-4}$ g cm$^2$, comparable to that of CNFs 110 (~$1.1 \times 10^{-4}$ g cm$^{-2}$). The corresponding coulombic efficiency in FIG. 7B is greater than 99% at all three power rates, much higher than that of the CNFs 110 without Si Layer 115.

Figure 8:
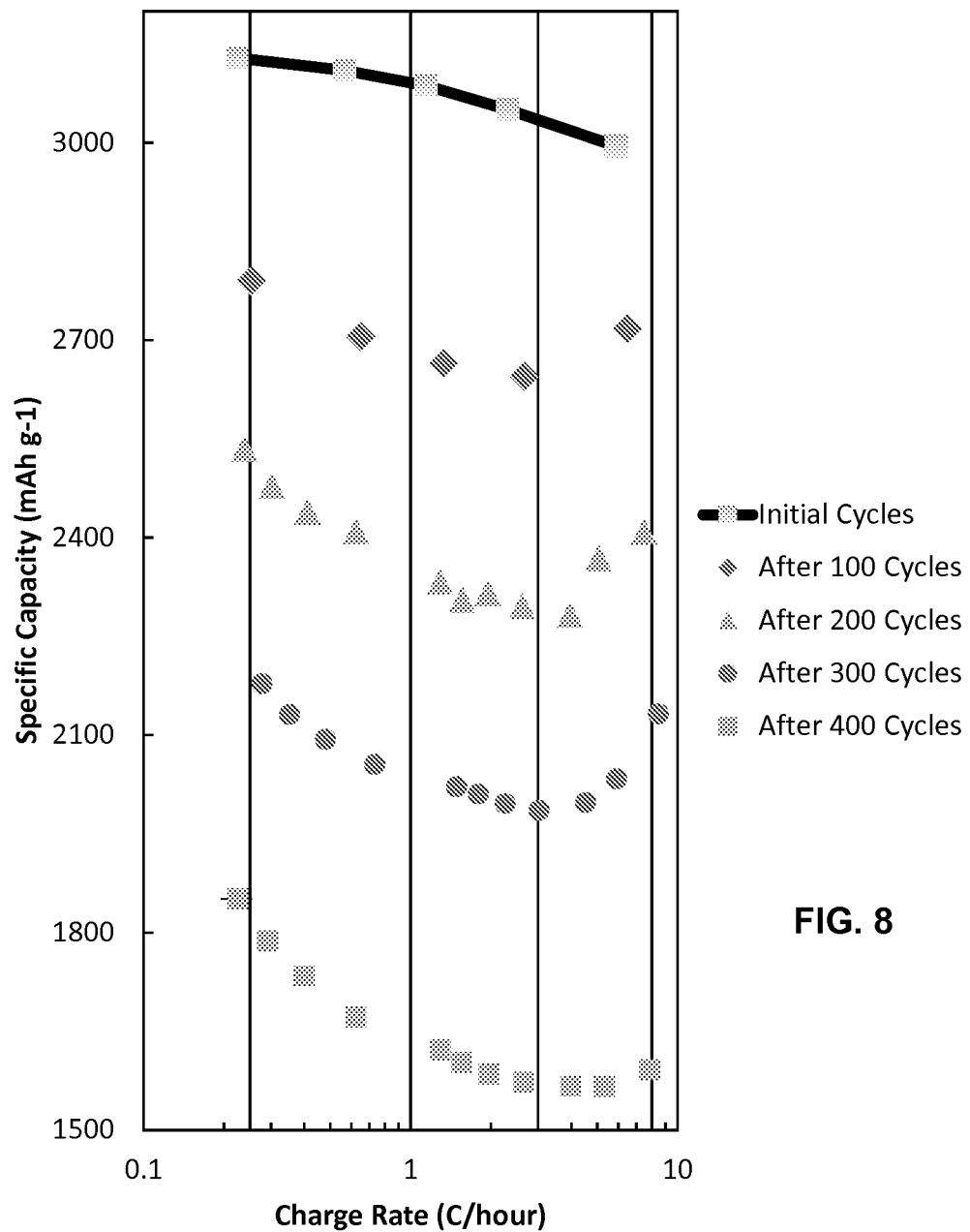
FIG. 8 illustrates how the capacity of a CNF array varies with charging rate, according to various embodiment of the invention.

FIG. 8 illustrates how the capacity of CNF Array 100 varies with charging rate, according to various embodiments of the invention. Data is shown for several numbers of cycles. FIG. 8 shows average specific discharge capacity for a group of cycles with identical current rates versus the charge rate (C-rate) required to achieve full capacity in set hours (C/h e.g., full Capacity/hours). Vertical Lines are focused on C/4, 1C, 3C and 8C. The CNF Array 100 was first conditioned with two cycles each at C/8, C/4, C/2, C/1, C/0.8, C/0.4, and C/0.16 rates symmetrically, and subsequently tested at a C/1 symmetric rate for the next 88 cycles. This was repeated from cycle 101 to cycle 200. Starting at cycle 201, the electrode was cycled for five cycles at each of C/4, C/3, C/2, C/1, C/0.75, C/0.66, C/0.50, C/0.33, C/0.25, C/0.20 and C/0.15 rates symmetrically and subsequently tested at a C/1 symmetric rate for the next 45 cycles. This was repeated from cycle 301 to cycle 400 and from cycle 401 to cycle 500. The change in capacity is small (<16%) while the C-rate is varied by 32 fold. The electrode after 100 cycles showed increased capacity when the C-rate is changed from 3C to 8C. Thus, faster charge rates resulted in improved capacity. High capacity (>2,700 mAh/g) was obtained at both high and lower rates (C/4 and 8C). Capacity at rates above 3C increase as C-rate increased. The drop in specific capacity with the number of cycles is due to known, correctable, factors.

Both the CVs and charge-discharge measurements indicated that the Li$^+$ insertion into Si Layer 115 was fast and highly reversible, which are features desired for high-performance Li-ion battery anodes. This was further demonstrated (See FIG. 7C) with two long cycling tests on two identical samples at different testing conditions: (1) slow asymmetric tests with the C/2 rate for insertion and the C/5 rate for extraction; and (2) the fast symmetric test at the C/1 rate for both insertion and extraction. Both sets of data showed >98% coulombic efficiency over the long cycling except for the initial conditioning cycles (4 cycles in the former and 12 cycles in the latter at varied low rates). In the slow asymmetric tests, the insertion capacity only dropped by 8.3% from 3643 mA h g$^{-1}$ at the 5th cycle to 3341 mA h g$^{-1}$ at the 100th cycle. Even at the C/1 charge-discharge rate, the insertion capacity only drops by 11% from 3096 mA h g$^{-1}$ at the 13$^{th}$ cycle to 2752 mA h g$^{-1}$ at the 100$^{th}$ cycle. The difference in the Li$^+$ capacity between these two sets of data was mostly attributable to the initial conditioning parameters and small sample-to-sample variations. This was indicated by the similar values of insertion-extraction capacity during the first few conditioning cycles in FIG. 7C at C/10 and C/5 rates. The faster rates (C/0.5 for 9$^{th}$ and 10$^{th}$ cycles and C/0.2 for 11$^{th}$ and 12$^{th}$ cycles in sample #2) were found to be harmful and caused an irreversible drop in the capacity. However, the electrode became stabilized after longer cycling. As shown in FIG. 7B, the charge-discharge profiles are almost identical at C/2, C/1, and C/0.5 rates, which were measured with sample #1 after going through 120 cycles. This is over a charging rate variation of four times.

The specific capacity of the Si Layer 115 in the range of 3000 to 3650 mA h g$^{-1}$ is consistent with the highest values of amorphous Si anodes summarized in literature. It is remarkable that the entire Si shell in the CNF Array 110 was active for Li$^+$ insertion and remained nearly 90% of the capacity over 120 cycles, which to our knowledge has not been achieved before except with flat ultrathin (<50 nm) Si films. The specific capacity disclosed herein is significantly higher than those reported using other nanostructured Si materials at similar power rates, including ~2500 mA h g$^{-1}$ at the C/2 rate and ~2200 mA h g$^{-1}$ at the C/1 rate with Si NWs, and ~800 mA h g$^{-1}$ at the C/1 rate with randomly oriented carbon nanofiber-Si core-shell NWs. Clearly, the coaxial core-shell NW structure on well-separated CNFs 110, such as included in various embodiments of the invention, provides an enhanced charge-discharge rate, nearly full Li$^+$ storage capacity of Si, and a long cycle life, relative to the prior art.

As shown in FIG. 7C, an anomalously high insertion capacity (~4500 mA h g$^{-1}$) was always observed in the initial cycles, which was 20-30% higher than the latter cycles. In contrast, the extraction values were relatively stable over all cycles. The extra insertion capacity can be attributed to the combination of three irreversible reactions: (1) the formation of a thin SEI (surface electrolyte interphase) layer (of tens of nanometers); (2) reactions of Li with SiO$_x$ presented on the Si surface (SiO$_x$+2xLi→Si+xLi$_2$O); and (3) the conversion of the starting crystalline Si coating with a higher theoretical capacity (~4200 mA h g$^{-1}$) into amorphous Si with lower capacity (<3800 mA h g$^{-1}$). The TEM image (FIG. 3C) and SEM image (FIG. 6B) showed that a non-uniform SEI can be deposited on the surface of Si Layer 115 after the charge-discharge cycles. This elastic SEI film can help secure Si Layer 115 on the CNF 110 surfaces as CNF Array 110 goes through the large volume expansion-contraction cycles that occur during the charge-discharge cycles. The dramatic difference between the SEM images in FIGS. 6B and 6C indicates the large expansion of Si Layer 115 in the lithiated (charged) state relative to the non-lithiated state. (Although some of the expansion may be due to oxidation of Li by air as the electrochemical cell was dissembled for imaging.) Note that the production of SEI during initial charge-discharge cycles causes the differences seen in Si Layer 115 between FIGS. 3A and 3B. In FIG. 3B the Si has interacted with electrolyte to produce SEI that fills the gaps between the feather-like structures. The interaction can include mixing, chemical reactions, charge coupling, encapsulation, and/or the like. The Si Layer 115, therefore, looks more uniform in FIG. 3B. However, the Si Layer 115 now comprises interleaved layers of Si (the feather-like structures) and SE. Each of these interleaved layers can be on the order of a few 10s of nanometers. The SEI layer can be an ion permeable material that is a product of interaction between the electrolyte and Si Layer 115 (or other electrode material).

Figure 9:
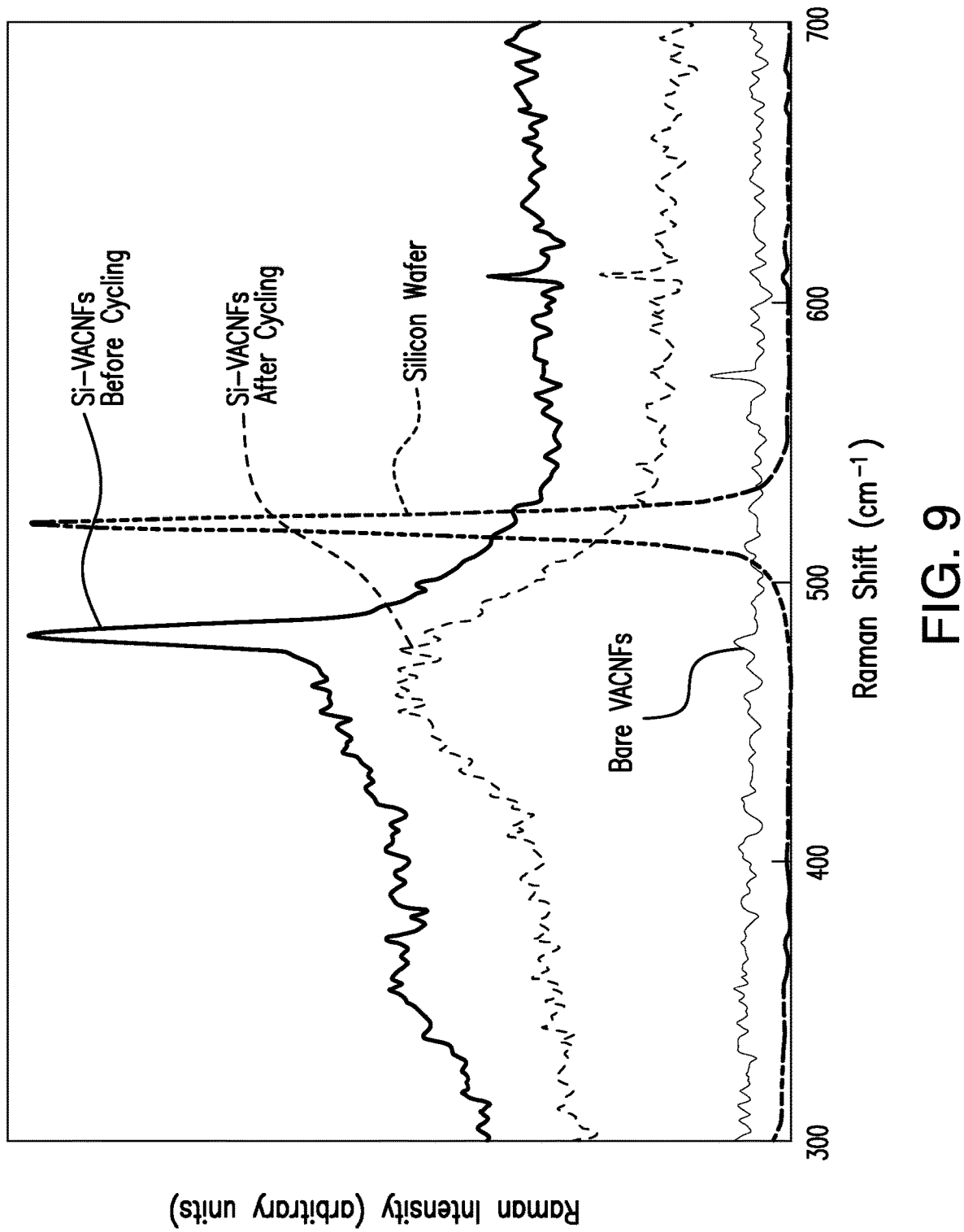
FIG. 9 illustrates Raman spectra of CNF arrays, according to various embodiments of the invention.

The crystalline and amorphous structure of the Si shell was revealed by Raman spectroscopy. As shown in FIG. 9, the pristine CNF Array 100 including Si Layer 115 showed multiple broad bands overlapped in the range of 350 to 550 cm$^{-1}$ corresponding to amorphous Si, and a much higher sharp band at 480 cm$^{-1}$ corresponding to nanocrystalline Si. After charge-discharge tests, the sharp peak disappeared while the broad bands merged into a single peak at 470 cm$^{-1}$. The bare CNFs 110 did not show any feature in this range. The crystalline Si peak downshifted by ~40 cm$^{-1}$ from that measured with a single-crystalline Si(100) wafer and by ~20 to 30 cm$^{-1}$ from other micro-crystalline Si materials. This shift was likely due to the much smaller crystal size and large disorders. The original Si Layer 115 likely consisted of nanocrystals embedded in an amorphous matrix associated with the feather-like TEM image in FIG. 3A. After initial cycles, the Si nanocrystals were converted into amorphous Si, consistent with the TEM images after the cycling test (see FIGS. 3B and 3C). However, the Si Layer 115 apparently did not slide along the CNF, in contrast to the large longitudinal expansion (by up to 100%) in pure Si NWs. Si Layer 115 was, thus, securely attached to CNFs 110 for over 120 cycles. The volume change of the Si shell during Li$^+$ insertion was dominated by radial expansion, while the CNF—Si interface remained intact.

Figure 10A:
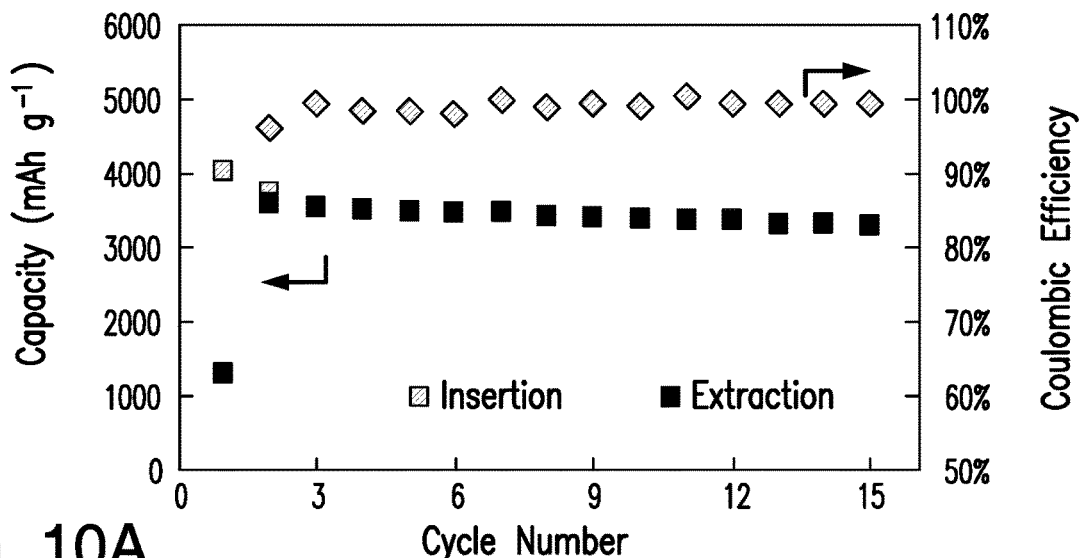
FIGS. 10A-10C shows the variation of $Li^+$ insertion-extraction capacities and the coulombic efficiency over 15 charge-discharge cycles, according to various embodiments of the invention.
Figure 10B:
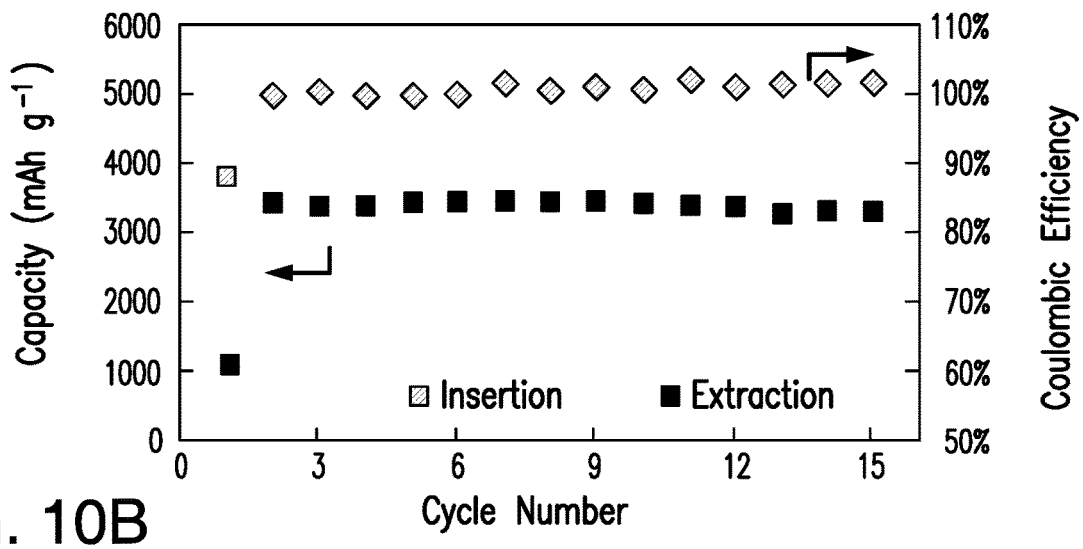
Figure 10C:
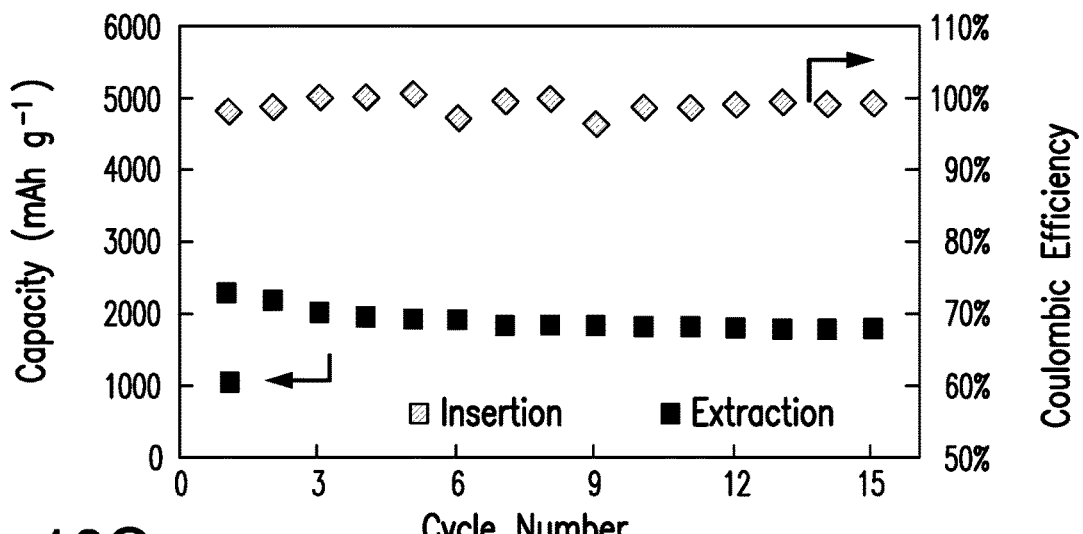

Various embodiments of the invention include CNFs 110 having different lengths and silicon shell thickness. One factor that can be controlled when CNFs 110 are generated is the open space between each CNF 110, e.g., the mean distance between CNFs 110 within CNF Array 100. This space allows Si Layer 115 to expand radially when charging and, thus in some embodiments provides stability. Because an optimum electrode structure depends on both the length of CNFs 110 and the thickness of Si Layer 115, it is sometimes desirable to use longer CNFs 110 and thicker Si Layers 115 in order to obtain higher total Li$^+$ storage capacity. Longer CNFs 110 do correlate with greater storage capacity. FIGS. 10A-10C shows the variation of Li$^+$ insertion-extraction capacities and the coulombic efficiency over 15 charge-discharge cycles with three 10 µm long CNF 110 samples deposited with Si Layer 115 at a nominal thickness of 0.50, 1.5 and 4.0 µm, respectively. After conditioning at the C/10 rate for the first cycle and the C/5 rate for the second cycle, asymmetric rates (C/2 for insertion and C/5 for extraction) were used in subsequent cycles similar to the measurements of sample #1 in FIG. 7C. This protocol provided nearly 100% coulombic efficiency and minimum degradation over the cycles. The nominal thickness was measured in situ with a quartz crystal microbalance during sputtering.

The specific capacities as high as 3597 mA h g$^{-1}$ and 3416 mA h g$^{-1}$ were obtained with 0.50 and 1.5 µm thick Si Layer 115, respectively, very similar to that with 0.50 µm thick Si Layer 115 on 3.0 µm long CNFs 110 (see FIG. 7C). The capacity remained nearly constant over 15 cycles. However, the electrode with 4.0 µm nominal Si thickness showed a significantly lower specific capacity at only 2221 mA h g$^{-1}$. This indicates that, with expansion, the Si Layers 115 from adjacent CNFs 110 began to contact into each other, limiting them from further expansion and limiting diffusion of Li between CNFs 110. As a result, only a fraction of the silicon coating was active in lithium insertion. The cycle stability was correspondingly worse than the samples with thinner Si Layers 115.

The same amount of Si (500 nm nominal thickness) on CNF Arrays 110 comprising 10 µm long CNFs 110 gave nearly the same amount of Li$^+$ storage capacity (3597 mA h g$^{-1}$, see FIG. 6) as that of 3 µm long CNFs 110 (3643 mA h g$^{-1}$, see FIG. 7C), even though the carbon mass is more than 3 times higher. This is very strong evidence that the contribution of CNFs 110 is negligible in calculating Li$^+$ storage. It is likely that very little Li$^+$ ions were intercalated into CNFs 110 in the Si-coated sample, this contributes to the stability of the structure during multiple charge-discharge cycles.

Figure 11D:
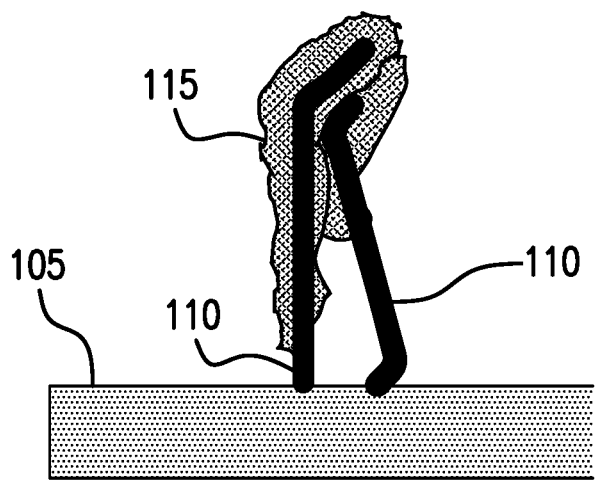
FIG. 11D shows a cross-section of a nanofiber/silicon complex including more than one CNF.
Figure 11A:
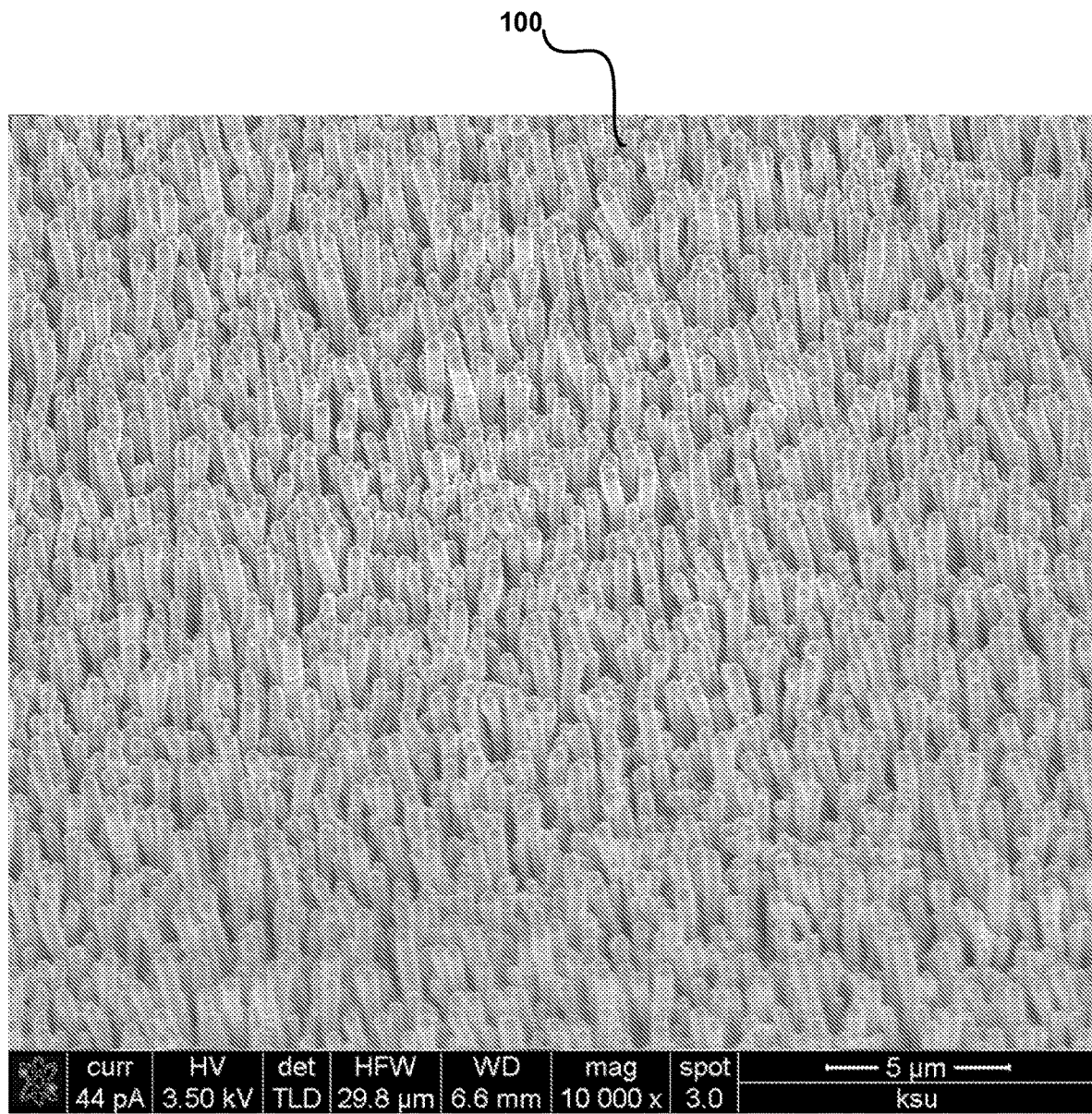
FIGS. 11A-11C show scanning electron microscopy images of freshly prepared CNF arrays, according to various embodiments of the invention.
Figure 11B:
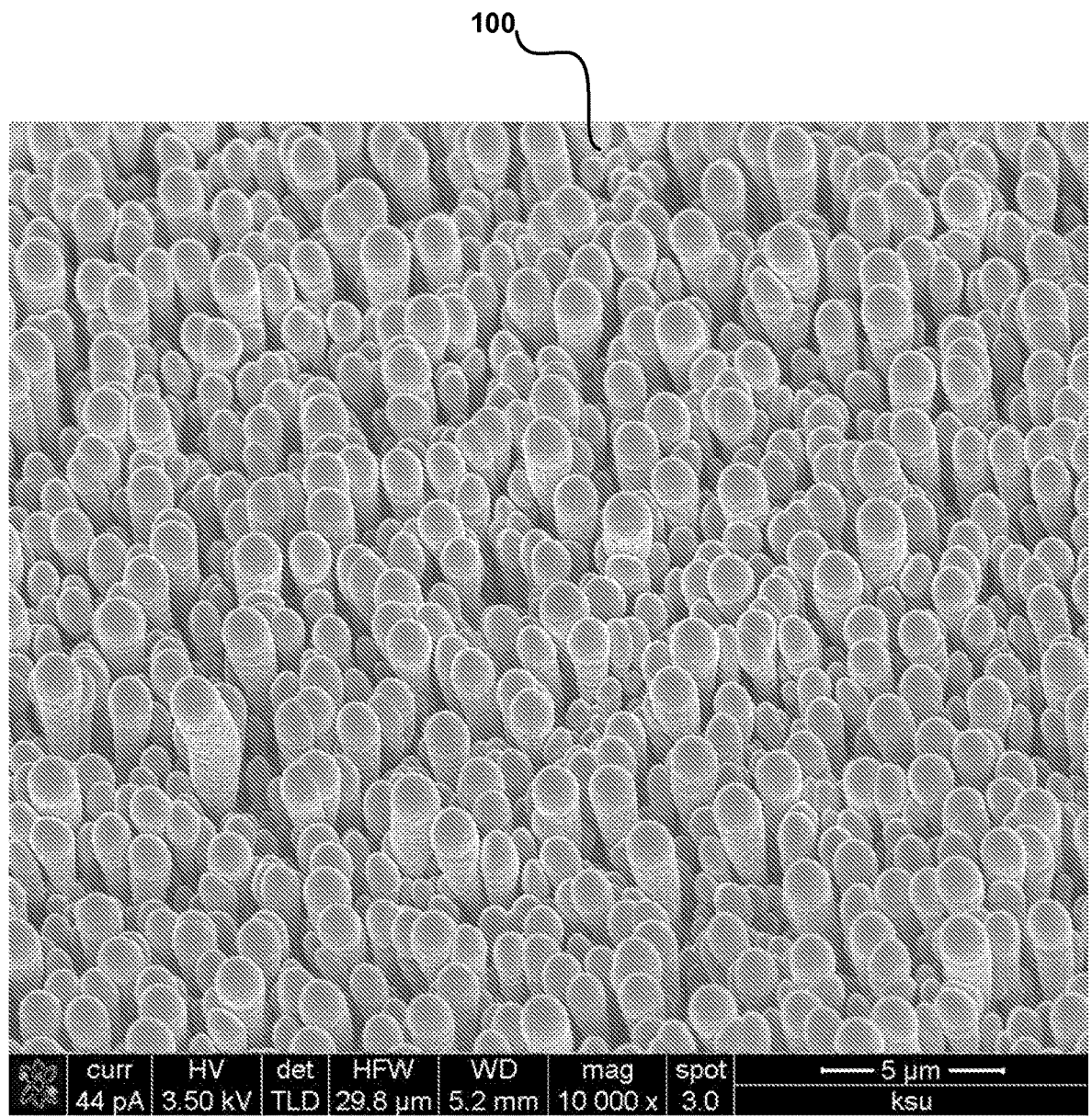
Figure 11C:
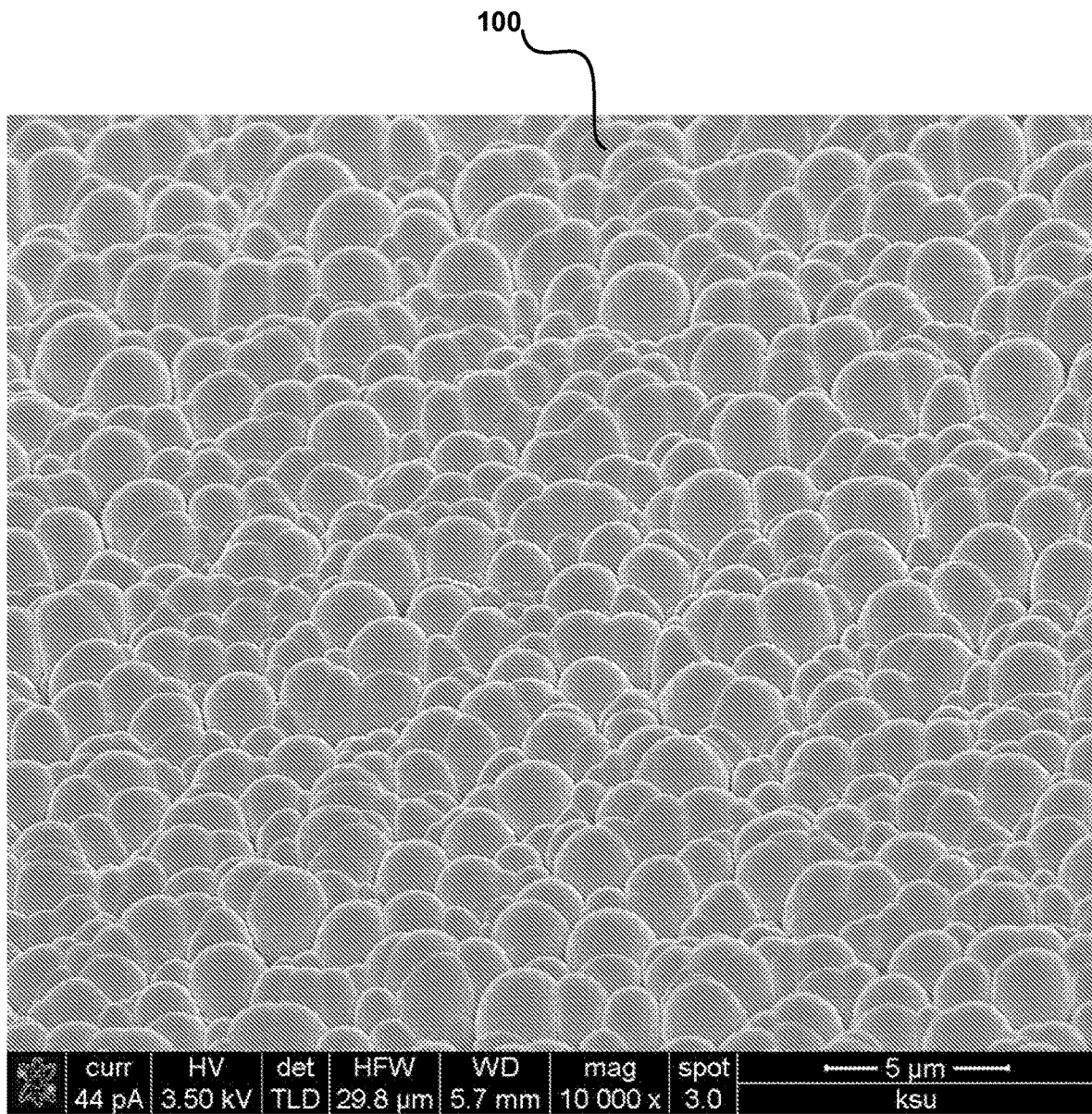

The variation of the specific Li$^+$ storage capacity in the three samples correlated well with their structures revealed by the SEM images illustrated in FIGS. 11A-11C. FIGS. 11A-11C show scanning electron microscopy images of freshly prepared CNF Arrays 100 (on ~10 µm long CNFs 110). The Si Layer 115 was generated using a nominal Si thickness of (a) 0.50 µm, (b) 1.5 µm, and (c) 4.0 µm, which were measured in-situ using a quartz crystal microbalance during deposition. All images are 45° perspective views. At 0.50 µm nominal Si thickness, the average tip diameter was found to be ~388 nm on the 10 µm long CNFs, much smaller than the ~457 nm average diameter on the 3.0 µm long CNFs 110. The Si Layer 115 was thinner but more uniformly spread along the 10 µm long CNFs 110.

Figure 12:
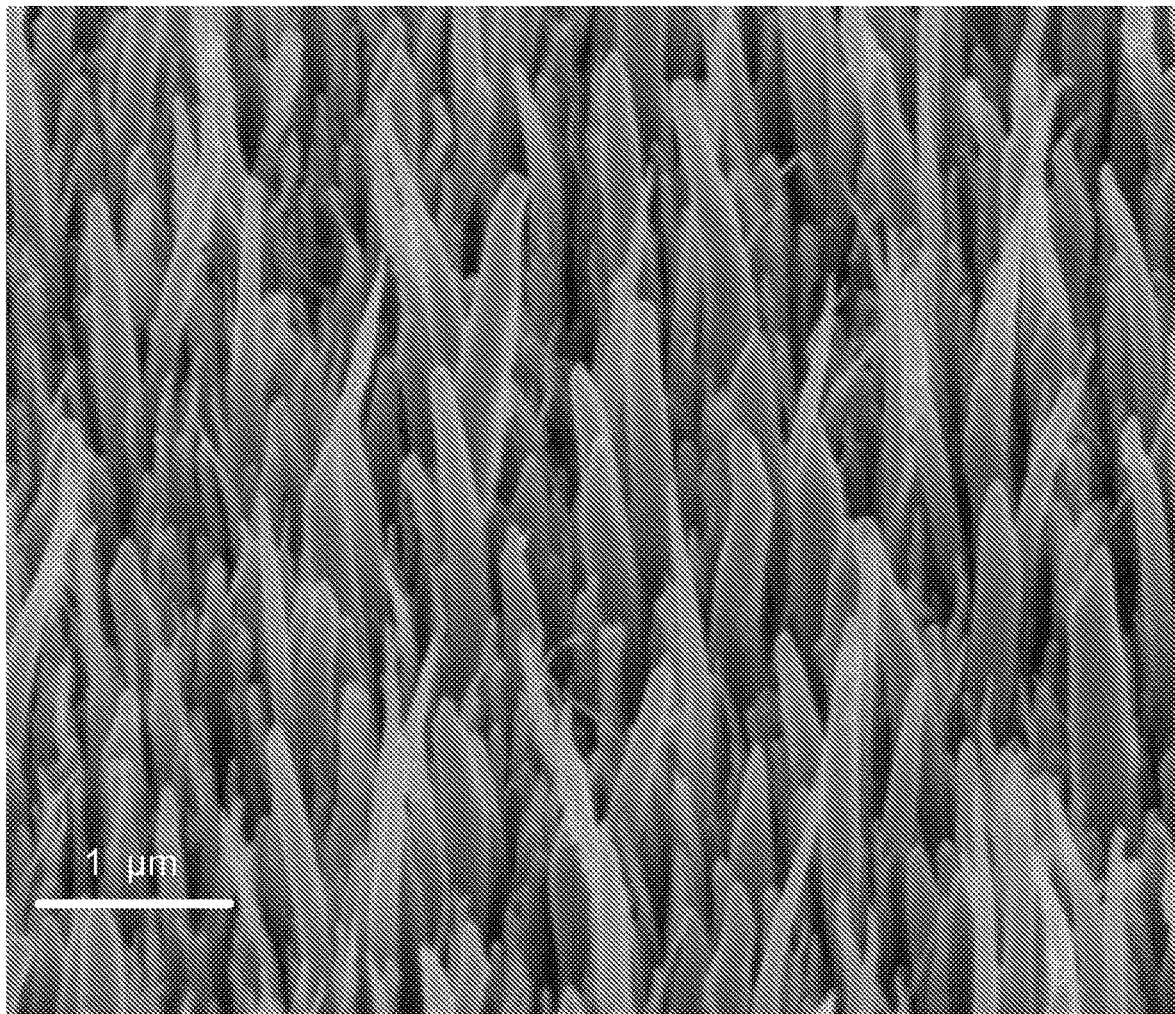
FIG. 12 illustrates a carbon nano-fiber array including fibers of 10 um in length, according to various embodiments of the invention.

It is noted that growing 10 µm CNFs 110 took 120 min, about six times as long as growing the 3 µm CNFs 110. Some nickel catalysts were slowly etched by NH$_3$ during the long PECVD process, resulting in continuous reduction in the Ni nanoparticle size and leading to the tapered Tip 120 (as shown in FIG. 12). The CNF 110 length variation also increased with long CNFs 110. These factors collectively reduced the shadow effects of the Tip 120. As a result, even at 1.5 µm nominal Si thickness, the CNFs 110 coated with Si Layer 115 are well separated from each other. The SEM image of 1.5 µm Si on 10 µm CNF Arrays 100 (FIG. 11B) is very similar to that of 0.50 µm Si on 3.0 µm CNF Arrays 110 (FIG. 2B). But as the nominal Si thickness was increased to 4.0 µm, the Si Layers 115 clearly merged with each other and filled up most of the space between the CNFs 110 (see FIG. 10C). This reduced the free space needed to accommodate the volumetric expansion of the Si Layer 1151. As a result, the specific Li$^+$ storage capacity significantly dropped.

FIGS. 11A and 11B each include roughly the same number of CNFs 110, however, in FIG. 11B has substantially fewer visible Tips 120. This is because Si Layer 115 can form a nanofiber/silicon complex that includes a single CNF 110 (a cross-section of which is shown in FIG. 1A). Or, Si Layer 115 can form a nanofiber/silicon complex that includes two, three or more CNF 110 under a single cover of silicon. This occurs when two or more CNFs 110 come together during the Si Layer 115 deposition process. A nanofiber/silicon complex is a structure that includes a continuous Si Layer 115 that envelops one or more CNF 110. A cross-section of a nanofiber/silicon complex that includes two CNF 110 is illustrated in FIG. 11D. In various embodiments at least 1%, 5% or 10% of nanofiber/silicon complexes include more than one CNF 110.

In various embodiments, instances of CNF Arrays 100 having 0.50 and 1.5 µm nominal Si thicknesses have comparable mass-specific capacities of 3208±343 and 3212±234 mA h g$^{-1}$, respectively. The samples with a 4.0 µm nominal Si thickness give much lower capacity at 2072±298 mA h g$^{-1}$. The thinner Si coatings are fully activated and provide the maximum Li insertion capacity that amorphous Si could afford. On the other hand, the area-specific capacity increases proportionally with the Si thickness from 0.373±0.040 mA h cm$^{-2}$ at 0.50 µm Si to 1.12±0.08 mA h cm$^{-2}$ at 1.5 µm Si thickness, but drops off from the linear curve to give 1.93±0.28 mA h cm$^{-2}$ at 4.0 µm nominal Si thickness. Clearly, at this thickness, only a fraction of the extra silicon in the thick Si coating is actively involved in Li storage. The thickness of 4.0 µm is greater than the mean distance between CNFs 110. The electrochemical results are consistent with the structure shown in SEM image in FIG. 11C, which shows that space between CNFs 110 is essentially filled.

In various embodiments of the invention, the structure of CNF Array 100 includes an Si Layer of approximately 200 to 300 nm radial thickness on CNFs 110 having a length of approximately 30-40, 40-75, 75-125 microns (or more or combinations thereof) and diameters on the order of ~50 nm. In some embodiments, these CNF Array 100 are grown on conductive foils having a thickness within the ranges of ~10 microns, ~10-20 microns, ~10-50 microns, or more. In various embodiments, Si (equivalent to 1.5 μm nominal thickness on a flat surface) is deposited onto 10 μm long CNFs 100 to form CNF Arrays 100. This is accomplished while maintain the open vertical core-shell nanowire structure with individual CNFs 110 well separated from each other such that Li ions can penetrate the CNF Arrays 100 between the CNFs 110. This unique hybrid architecture allowed the Si Layers 115 to freely expand/contract in the radial direction during Li$^+$ insertion and extraction. High-performance Li storage with a mass-specific capacity of 3000 to 3650 mA h g$^4$ was obtained even at the C/1 rate. The capacity matched the maximum value that would be expected from a similar mass of amorphous Si, indicating that the Si Layer 115 was fully active. This 3D nanostructured architecture enables effective electrical connection with bulk quantities of Si material while maintaining a short Li$^+$ insertion-extraction path. As a result, high capacity near the theoretical limit is possible for over 120 charge-discharge cycle. There was little change in capacity as the rate was increased 20 times from C/10 to C/0.5 (or 2C). The high capacity at significantly improved charging and power rates and the extraordinary cycle stability make this novel structure a choice anode material for high-performance Li-ion batteries. The same core-shell concept may be applied to cathode materials by replacing the Si shell with $TiO_2$, $LiCoO_2$, $LiNiO_2$, $LiMn_2O_4$, $LiFePO_4$, $Li_2O$, $Li_2O_2$, or the like.

Figure 13:
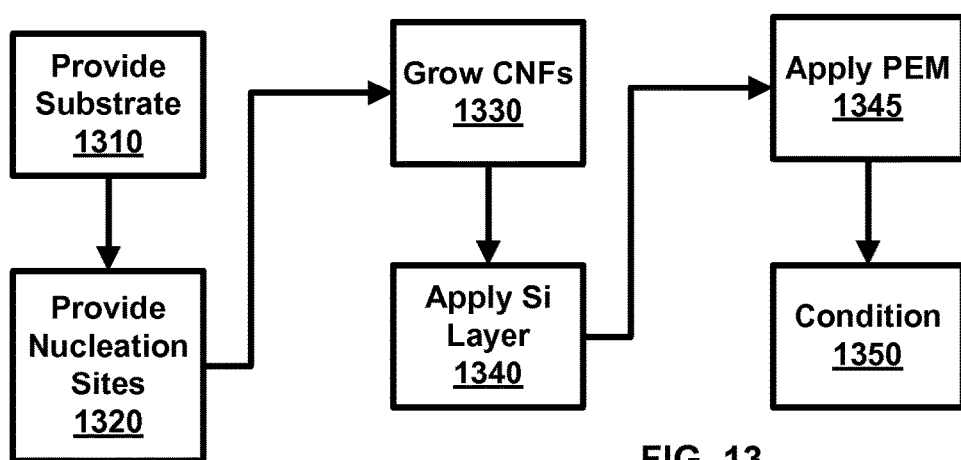
FIG. 13 illustrates methods of producing CNF arrays, according to various embodiments of the invention.

FIG. 13 illustrates methods of producing the CNF Arrays 100 disclosed herein. In a Provide Substrate Step 1310 a Substrate 105 suitable for growth of CNFs 110 is provided. Substrate 105 may include a variety of materials, for example Cu. Substrate 105 is optionally a conductive foil having a thickness described elsewhere herein. In an optional Provide Nucleation Sites Step 1320 nucleation cites for the growth of CNFs 110 are provided on Substrate 105. A variety of nucleation materials, such as Ni particles, are known in the art. The nucleation cites are optionally provided at a density so as to produce mean distances between CNFs 110, such as those taught elsewhere herein. Provide Nucleation Sites Step 1320 is optional in embodiments in which nucleation is not required for growth of CNFs 110, or similar structures.

In a Grow CNFs Step 1330 CNFs 110 are grown on Substrate 105. The CNFs 110 are optionally grown to produce the stacked-cone structure taught elsewhere herein, or a similarly variable structure. The CNFs 110 can be grown to any of the lengths taught elsewhere herein. Growth is optionally accomplished using PECVD processes such as those taught or cited in "A high-performance lithium-ion battery anode based on the core-shell heterostructure of silicon-coated vertically aligned carbon nanofibers" Klankowski et al. *J. Mater. Chem. A*, 2013, 1, 1055.

In an Apply Si Layer Step 1340 an intercalation material such as Si Layer 115 is applied to the grown CNFs 110. The applied material may have any of the nominal thicknesses taught elsewhere herein so as to produce a Si Layer 115 thickness of tens or hundreds of nanometers.

In an optional Apply PEM Step 1345 a power enhancement material (PEM) is added to the CNF Array 100. The PEM typically includes a binder and surface effect dominant sites, as discussed in further detail elsewhere herein. In an optional Condition Step 1350 the CNF Array 100 produced using Steps 1310-1340 is conditioned using one or more lithium intercalation cycles.

Figure 14A:
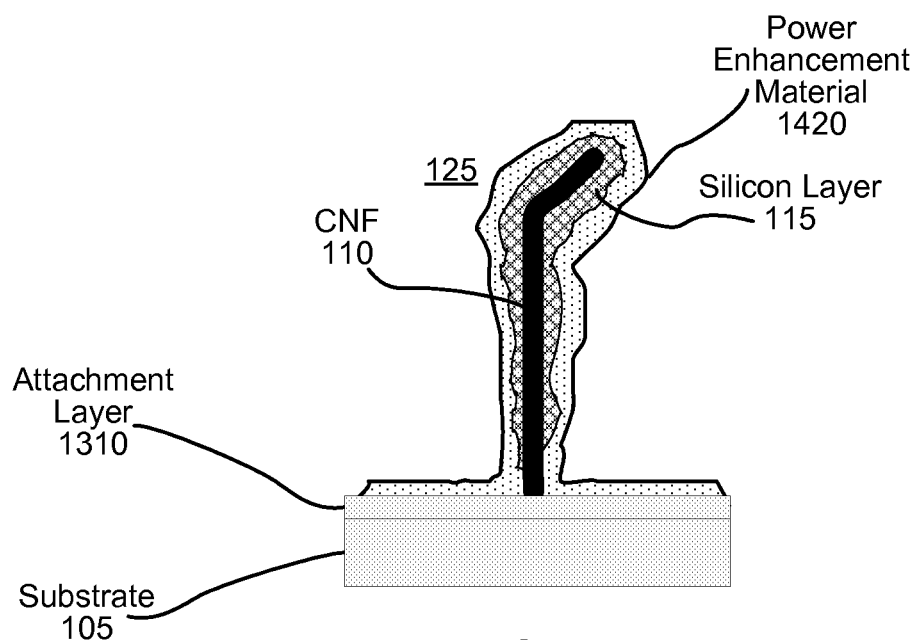
FIG. 14A illustrates a CNF including a power enhancement material, according to various embodiments of the invention.
Figure 14B:
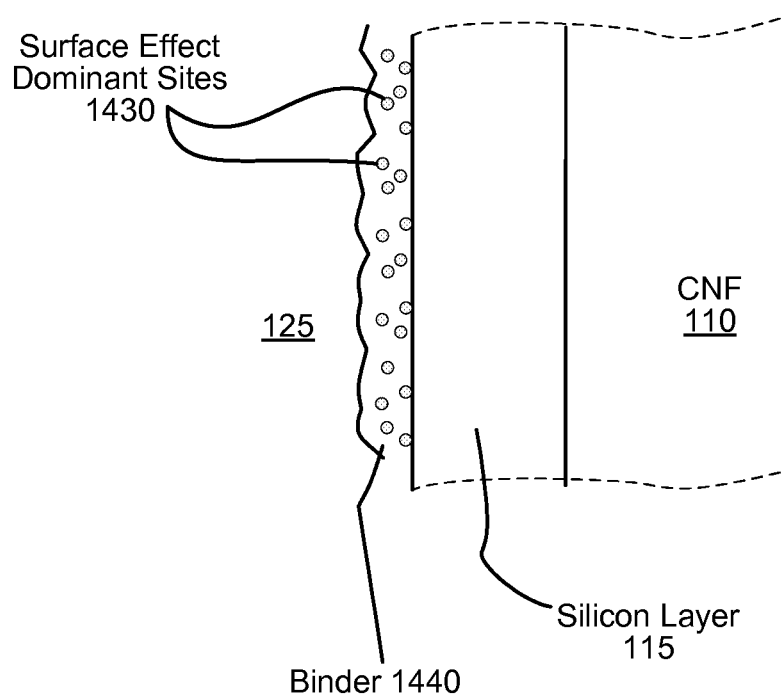
FIG. 14B illustrates detail of the power enhancement material illustrated in FIG. 14A, according to various embodiments of the invention.

FIG. 14A illustrates a CNF 110 including a Power Enhancement Material 1320, according to various embodiments of the invention. The Power Enhancement Material 1320 is applied as a layer over the intercalation material, e.g., over Silicon Layer 115. FIG. 14B illustrates detail of the Power Enhancement Material 1320 illustrated in FIG. 14B, according to various embodiments of the invention. Power Enhancement Material 1320 includes Surface Effect Dominant Sites 1430 and an optional Binder 1440. Silicon Layer 115 is but one example of intercalation material. Where Silicon Layer 115 is used as an example herein, it should be understood that other types of intercalation material can be substituted or combined with silicon. Such alternative or additional intercalation materials include Ag, Al, Bi, C, Se, Sb, Sn and Zn. The CNF 110 illustrated in FIG. 14 is typically one of a large number of CNF 110 within a CNF Array 100.

In some embodiments, Surface Effect Dominant Sites 1430 include surfaces of a nanoparticle configured to adsorb charge carriers in a faradaic interaction, e.g., to undergo redox reactions with charge carriers. They are referred to as "surface effect dominant" because typically, for these nanoparticles, the faradaic interaction between the charge carriers and the nanoparticle surfaces dominate bulk faradaic interactions. Thus, the charge carriers are much more likely to react at the surface relative to the bulk of the nanoparticles. For example, a lithium ion would more likely adsorb onto the surface of the nanoparticle rather than being absorbed into the bulk of the nanoparticle. These nanoparticle are sometimes referred to as surface redox particles. The faradaic interaction results in a pseudo capacitor that can store a significant amount of loosely bound charge and thus provide a significant power density. In pseudo capacitance an electron is exchanged (e.g., donated). In this case between the charge carrier to the nanoparticle. While some potentials would result in some intercalation of charge carrier into the nanoparticle, this does not constitute the bulk of the interaction at Surface Effect Dominant Sites 1430 and can degrade some types of nanoparticles. A faradaic interaction is an interaction in which a charge is transferred (e.g., donated) as a result of an electrochemical interaction.

The nanoparticles that include Surface Effect Dominant Sites 1430 can be comprised of transition metal oxides, such as $TiO_2$, $Va_2O_5$, MnO, $MnO_2$, NiO, tantalum oxide, ruthenium oxide, rubidium oxide, tin oxide, cobalt oxide, nickel oxide, copper oxide, iron oxide, and/or the like. They may also be comprised of metal nitrides, carbon, activated carbon, graphene, graphite, titanate ($Li_4Ti_5O_2$), crystalline silicon, tin, germanium, metal hydrides, iron phosphates, polyaniline, mesophase carbon, and/or the like. It is appreciated that mixtures of the above and/or other materials having desired faradaic properties may be included in the Surface Effect Dominant Sites 1430. In various embodiments, these nanoparticles can be less than 1, 2, 3, 5, 8, 13, 21 or 34 nanometers in diameter. The lower limit of the nanoparticle size is a function of the size of the molecules of constituent materials. A nanoparticle includes at least a few molecules. A smaller size provides for a greater surface to bulk ratio of possible adsorption sites. However, a particle comprising only a couple of molecules has reduced stability. The nanoparticles are optionally multi-layered. For example, they can comprise a $TiO_2$ layer (or any of the other nanoparticle materials discussed herein) on a transition metal, Co, Ni, Mn, Ta, Ru, Rb, Ti, Sn, $V_2O_2$, FeO, Cu or Fe core or a graphene/graphite layer on a core of some other material. In some embodiments, different core materials affect the reaction potentials of the surface material. The amount of Surface Effect Dominant Sites 1430 is optionally selected depending on desired power and energy densities. For example, a greater power density may be achieved by have a larger number of Surface Effect Dominant Sites 1430 per quantity of intercalation material, or a greater amount of energy density may be achieved by having a larger amount of intercalation material per number of Surface Effect Dominant Sites 1430. It is an advantage of some embodiments of the invention that both historically high energy and power density can be achieved simultaneously.

By adsorbing charge carriers on the surface of the nanoparticle the charge carriers can provide a power density such as previously only achieved with capacitors. This is because the release of the charge is not dependent on diffusion of charge carriers though an intercalation material. Further, by placing the Surface Effect Dominant Sites 1430 in close proximity to the intercalation material, charge carriers can move from the intercalation material to the Surface Effect Dominant Sites 1430 (or directly to the electrolyte). This results in energy densities that are equal to or greater than conventional batteries. Both the energy densities of batteries and the power densities of capacitors are achieved in the same device. Note that during discharge charge carriers within the intercalation material can migrate to the Surface Effect Dominate Sites 1430 and thus recharge these sites.

In some embodiments, Surface Effect Dominant Sites 1430 are disposed on larger particles. For example, the particle size may be greater than 1, 10, 25, 100 or 250 microns, (but generally less than 1 millimeter). Activated carbon, graphite and graphene are materials that can be included in particles of these sizes. For example, activated carbon can be included in Power Enhancement Material 1320 while having a pore size of Surface Effect Dominant Sites 1430 similar to the nanoparticle diameters taught above. For the purposes of this disclosure, a nanoparticle is a particle with an average diameter of less than 1 µm.

Optional Binder 1440 is configured to keep the Surface Effect Dominant Sites 1430 in proximity to the intercalation material. In some embodiments, the distribution of Surface Effect Dominant Sites 1430 is uniform throughout Binder 1440. For example, nanoparticles including the Surface Effect Dominant Sites 1430 may be mixed with Binder 1440 before Binder 1440 is applied to the intercalation material to produce a relatively uniform distribution. Alternatively, the nanoparticles may be applied to the surface of the intercalation material prior to application of Binder 1440. This can result in a greater concentration of Surface Effect Dominant Sites 1430 (within Binder 1440) proximate to the intercalation material as compared to areas of Binder 1440 that are distal to the intercalation material. Binder 1440 is optional in embodiments in which Surface Effect Dominant Sites 1430 or the associated nanoparticles are directly attached to the intercalation material, e.g., attached to Silicon Layer 115.

Binder 1440 is permeable (e.g., porous) to charge carriers of the electrolyte. Examples of suitable materials for Binder 1440 include polyvinyl-idene fluoride (PVDF), styrene butadiene rubber, poly (acrylic acid) (PAA), carbo-xymethyl-cellulose (CMC), and/or the like. Other binders may be used that meet the permeability requirements. Binder 1440 optionally includes materials that increase its conductivity. For example, Binder 1440 may include conductive polymer, graphite, graphene, metal nanoparticles, carbon nano-tubes, carbon nano fibers, metal nano-wires, Super-P (conductive carbon black), and/or the like. The materials are preferably at concentrations high enough to make Binder 1440 conductive, e.g., a percolation threshold.

Figure 15:
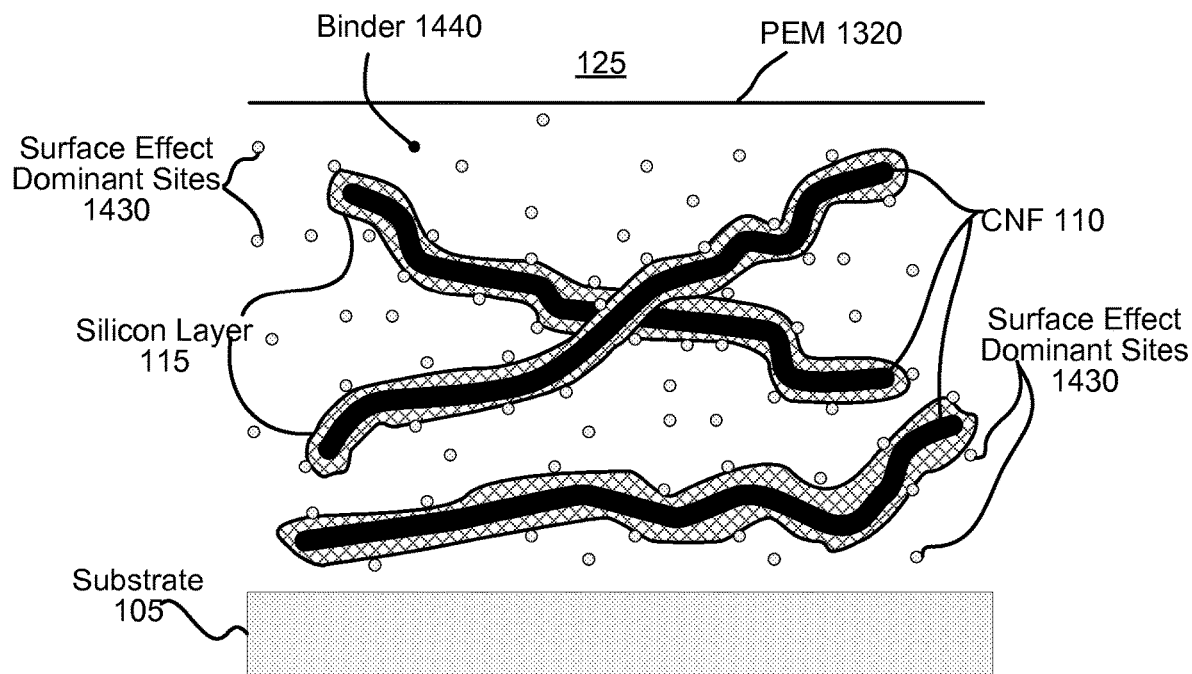
FIG. 15 illustrates an electrode surface including a power enhancement material and non-aligned CNFs coated by intercalation material, according to various embodiments of the invention.

The addition of Surface Effect Dominant Sites 1430 in close proximity to the intercalation material (e.g., Silicon Layer 115) does not necessarily require the use of vertically aligned CNF 110, or any support filaments. For example, FIG. 15 illustrates an electrode surface including Power Enhancement Material 1320 and non-aligned CNFs 110 coated by intercalation material, according to various embodiments of the invention. In these embodiments, the CNFs 110 are not directly attached to Substrate 110, but are held in close proximity to Substrate 110 by Binder 1440. While CNF 110 are used herein as an example of support filaments, it should be understood that other types of support filaments discussed herein can be used to supplement or replace the carbon nanofibers of CNF 110 in any of the examples.

The embodiments illustrated by FIG. 15 can be produced, for example, by first growing unattached CNFs 110. These are then coated with Silicon Layer 115 (or some other intercalation material) such that the intercalation material is generally in contact with the CNFs 110 as a coating layer. The coated CNFs 110 are then mixed with Surface Effect Dominant Sites 1430 and Binder 1440. Finally, the resulting mixture is deposited on Substrate 105.

Figure 16:
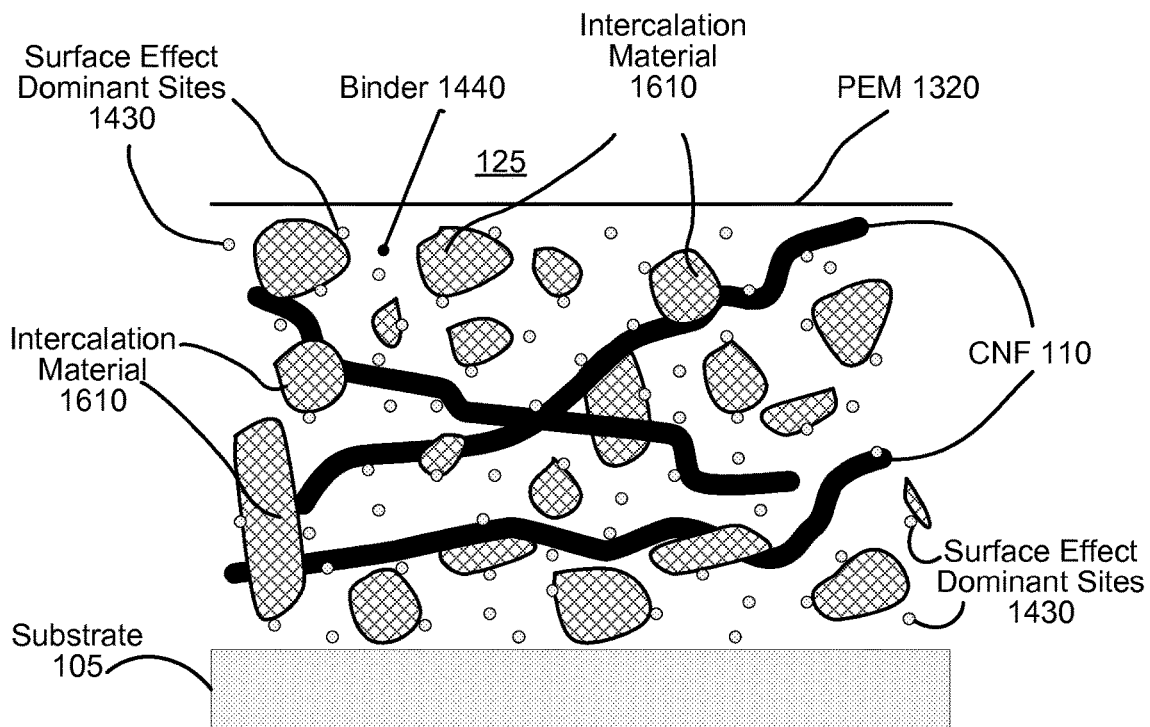
FIG. 16 illustrates an electrode surface including power enhancement material, non-aligned CNFs and free intercalation material, according to various embodiments of the invention.

FIG. 16 illustrates an electrode surface including Power Enhancement Material 1320, non-aligned CNFs 110 and free Intercalation Material 1610, according to various embodiments of the invention. In these embodiments, the Intercalation Material 1610 is not necessarily disposed around the CNF 110 as a coating. The Intercalation Material 1610 is free in the sense that it is not restricted to the surface of CNFs 110, however it is still held in proximity to Substrate 105 by Binder 1440.

The embodiments illustrated in FIG. 16 can be produced, for example, by mixing Binder 1440, Surface Effect Dominant Sites 1430, Intercalation Material 1610 and CNF 110 together (in any order). The mixture is then applied to Substrate 105. In these embodiments, CNFs 110 may or may not be attached to Substrate 105 by means other than Binder 1440. Intercalation Material 1610 may and/or may not be in contact with CNF 110 or Substrate 105. Likewise, Surface Effect Dominant Sites 1430 are optionally in contact with Substrate 105, CNF 110, and/or Intercalation Material 1610. Intercalation Material 1610 optionally includes particles, suspensions, clusters, and/or droplets of intercalation material with sizes of at least 0.1, 0.6, 1, 1.5, 2, 3, 5, 7, 9, 10, 13, 15, 18, 21 or 29 µm or any range there between. Other sizes are possible in alternative embodiments.

Figure 17:
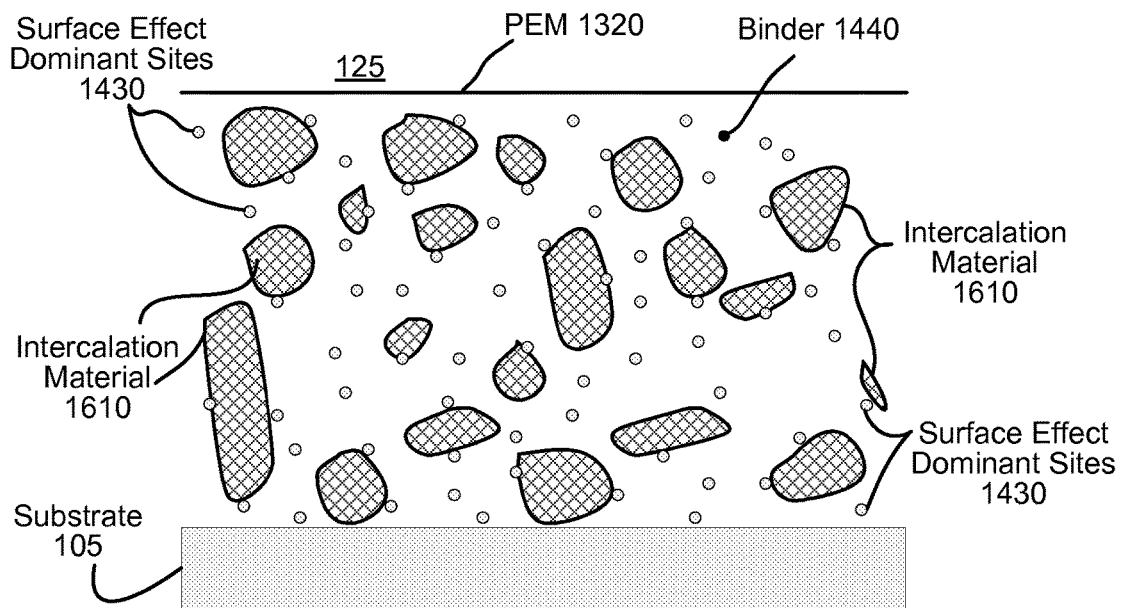
FIG. 17 illustrates an electrode surface including intercalation material and power enhancement material, without CNFs, according to various embodiments of the invention.

FIG. 17 illustrates an electrode surface including Binder 1440, Surface Effect Dominant Sites 1430 and Intercalation Material 1610, without support filaments, according to various embodiments of the invention. In these embodiments Surface Effect Dominant Sites 1430 and Intercalation Material 1610 are held in proximity to Substrate 11005 by Binder 1440.

Figure 18:
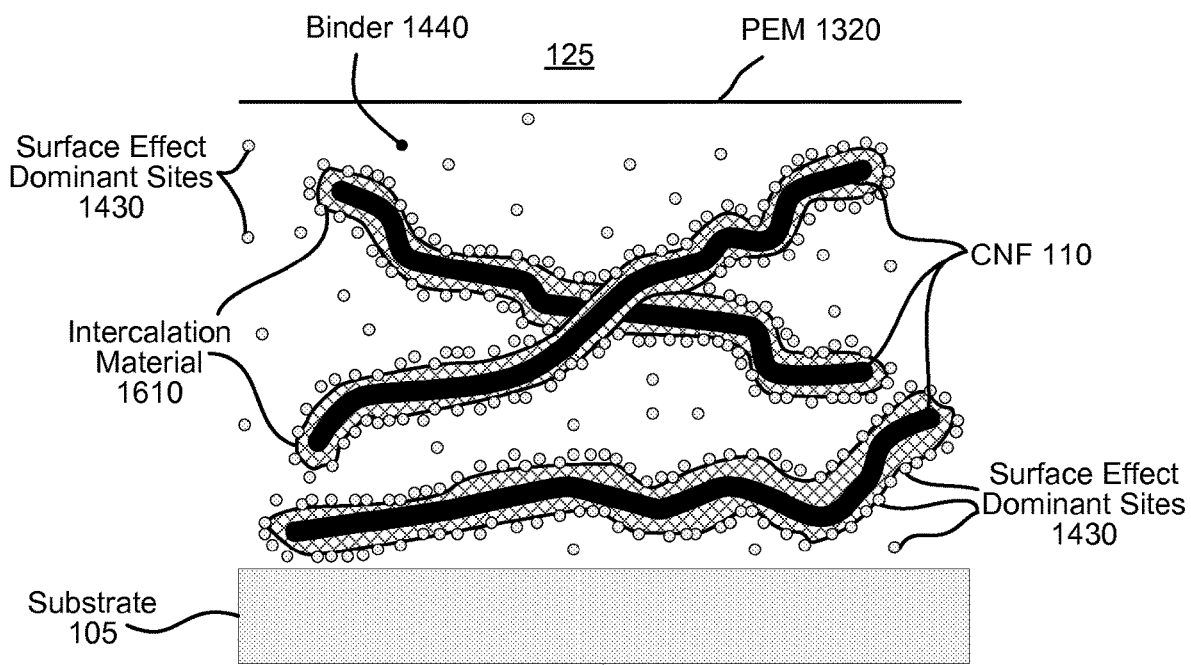
FIG. 18 illustrates an electrode surface including surface effect dominant sites disposed in close proximity to CNFs, according to various embodiments of the invention.

FIG. 18 illustrates an electrode surface similar to that illustrated in FIG. 15. However, in the embodiments illustrated by FIG. 18 Surface Effect Dominant Sites 1430 are concentrated in close proximity to Intercalation Material 1610. For example, in some embodiments at least 2%, 10%, 25%, 50%, 75% or 85% of Surface Effect Dominant Sites 1430 are on particles in contact with Intercalation Material 1610. Increased concentration of Surface Effect Dominant Sites 1430 proximate to Intercalation Material 1610 can be achieved using methods described elsewhere herein. This results in a greater concentration of Surface Effect Dominant Sites 1430 at the surface of Intercalation Material 1610 relative to other volumes within Binder 1440.

Figure 14C:
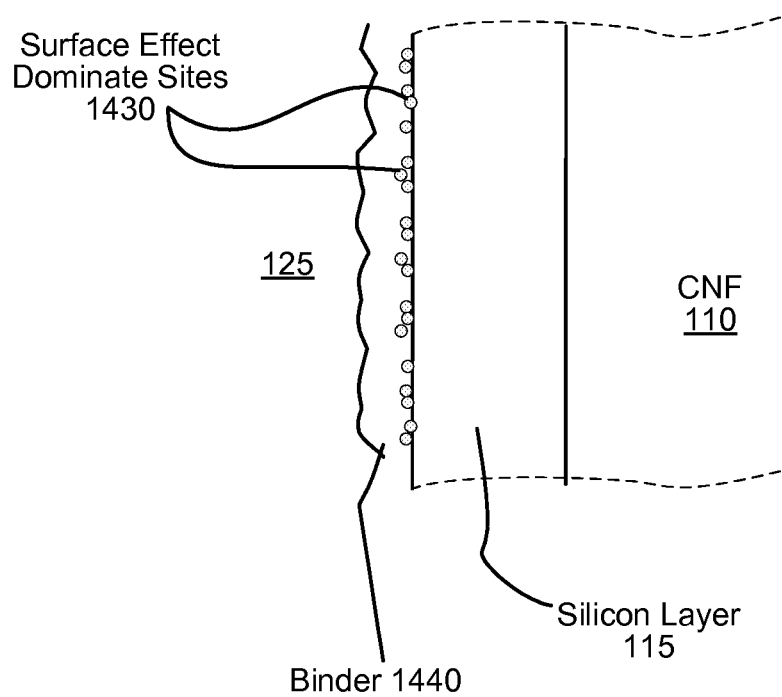
FIG. 14C illustrates alternative detail of the power enhancement material illustrated in FIG. 14A, according to various embodiments of the invention.
Figure 19:
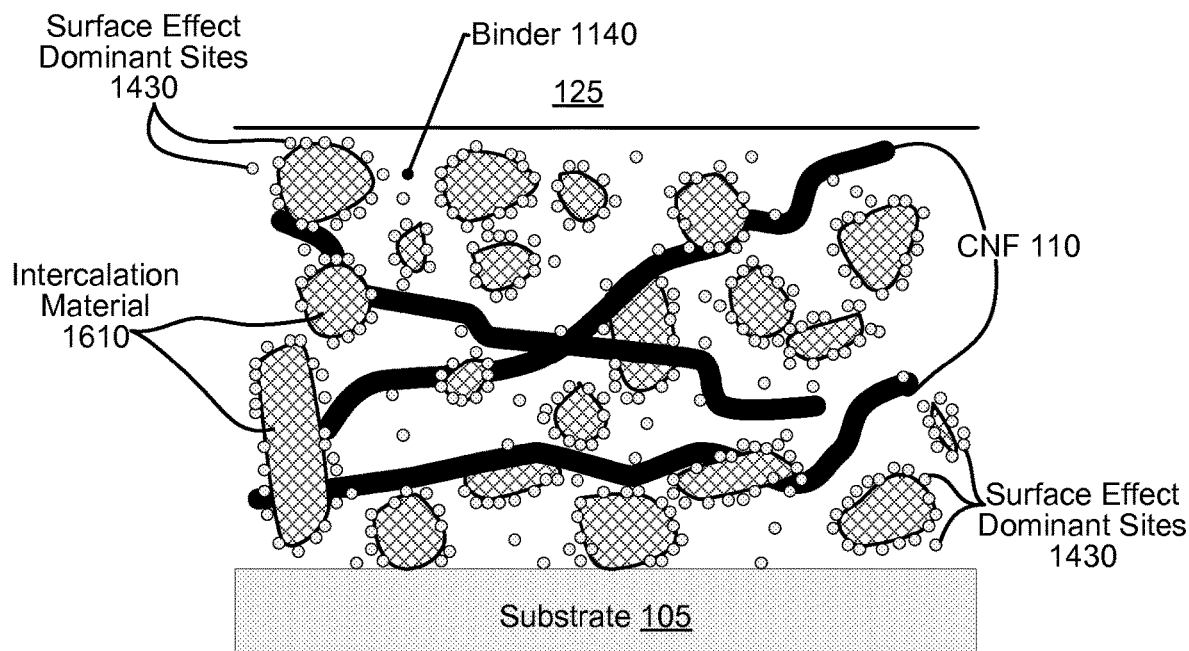
FIGS. 19 and 20 illustrate electrode surfaces including surface effect dominant sites disposed in close proximity to free intercalation material, according to various embodiments of the invention.
Figure 20:
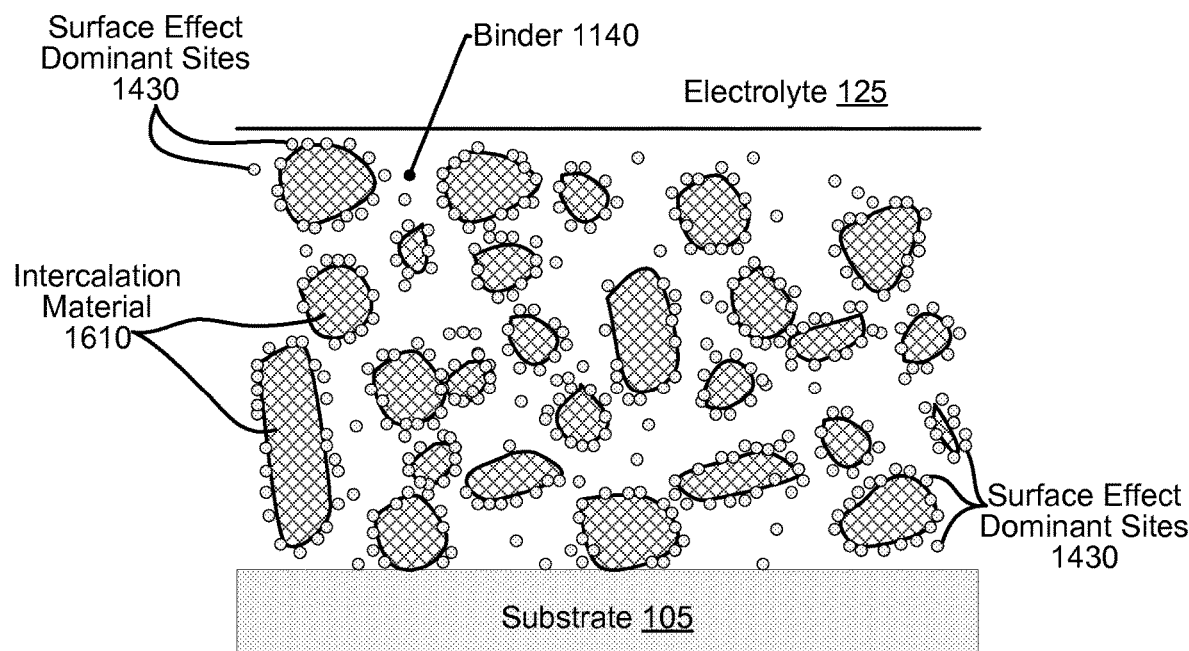

FIGS. 14C, 19 and 20 illustrate an electrode surface similar to that illustrated in FIGS. 14B, 16 and 17 respectively. However, in the embodiments illustrated by these figures, Surface Effect Dominant Sites 1430 are disposed in close proximity to free intercalation material, according to various embodiments of the invention. As in the embodiments illustrated by FIG. 18, in some embodiments at least 2%, 10%, 25%, 50%, 75% or 85% of Surface Effect Dominant Sites 1430 are in contact with Intercalation Material 1610. In some embodiments a higher concentration of nanoparticles including Surface Effect Dominant Sites 1430 are disposed within 5 nanometers of Intercalation Material 1610 surfaces than between 10 and 15 nanometers of these surfaces. Increased concentration of Surface Effect Dominant Sites 1430 proximate to Intercalation Material 1610 can be achieved by selecting appropriate Zeta potentials of the nanoparticles and Intercalation Material 1610 in solution so that the nanoparticles form an electrostatic double layer at the surface of Intercalation Material 1610. The Zeta potential is the electric potential in the interfacial double layer at the location of the surface versus a point in the bulk liquid away from the surface. The Zeta potential is optionally greater than 25 mV (absolute). In other embodiments, the nanoparticles are applied to the surfaces of Intercalation Material 1610 prior to the application of Binder 1440.

Intercalation Material 1610, as illustrated in FIGS. 16-20, can include any single one or combination of the materials discussed herein with respect to Silicon Layer 115 (including or excluding silicon). Likewise, CNFs 110, as illustrated in FIGS. 16-20, can include any single one or combination of the various types fibers discussed here (including or excluding carbon nanofibers). For example, these CNFs 110 may include branched fibers, multi-walled fibers, wires, aerogel, graphite, carbon, graphene, boron-nitride nanotubes, etc. The number of Surface Effect Dominant Sites 1430 and CNF 110 shown in these figures and other figures herein is for illustrative purposes only. For example, in practice the number of Surface Effect Dominant Sites 1430 can be much greater. Likewise, the amount and size of Intercalation Material 1610 and Silicon Layer 115 shown is for illustrative purposes. Alternative embodiments may include greater or lesser amounts and greater or lesser sizes. Likewise, the depth of PEM 1420 and the length of CNF 110 can vary from that shown in the figures.

In various embodiments, the amount of nanoparticles including Surface Effect Dominant Sites 1430 may be selected to so as to result in at least 0.1, 0.5, 0.7, 0.9, 1.1, 1.3, 1.5, 2, 3, 5, 10, 25, 50 or 100 (or any range there between) times a monolayer of the nanoparticles on the surface of Intercalation Material 1610 or Silicon Layer 115 (as measured in a discharged state). As used herein, a 0.1 monolayer indicates 10% and a 10× monolayer is 10 monolayers. In various embodiments, the amount of nanoparticles including Surface Effect Dominant Sites 1430 may be selected to result in at least 1, 5, 10, 20, 50, 100, 250 or 500 nanometer layer (or any combination there between) of nanoparticles on the surface of Intercalation Material 1610 (as measured in a discharged state). Other coverage densities as measured in monolayers or depth are possible. As the coverage of the nanoparticles (that include Surface Effect Dominant Sites 1430) approaches 1.0 monolayer the nanoparticles can form a layer between the Intercalation Material 1610 and charge carriers of the electrolyte that migrate through Binder 1440. For example in some embodiments the electrolyte includes lithium as a charge carrier. The lithium can migrate through Binder 1440 and undergo a faradaic reaction with Surface Effect Dominant Sites 1430 in which an electron is donated to the lithium from one of Surface Effect Dominant Sites 1430. This electron has been transferred (e.g., donated) from Substrate 105 to the nanoparticle via Intercalation Material 1610. Because the nanoparticles form a barrier, at this stage in a charging process, only a limited amount of charge carrier reaches Intercalation Material 1610. Charging is dominated by reactions at the Surface Effect Dominant Sites 1430. In some embodiments, charging can be rapid because intercalation of the charge carrier into Intercalation Material 1610 is not necessary before the faradaic reaction with the charge carrier occurs. The presence of Surface Effect Dominant Sites 1430 greatly increases the surface area where the initial faradaic reaction can occur prior to intercalation. Surface Effect Dominant Sites 1430 catalyze the intercalation of charge carrier into Intercalation Material 1610. The charge carrier can be intercalated in the form as received at Surface Effect Dominant Sites 1430 or intercalated in an alternate form such as a metal oxide. If intercalated as a metal oxide, the oxygen of the oxide may be recycled back to the Surface Effect Dominant Site 1430 following the intercalation.

In some embodiments, because the nanoparticles form an imperfect barrier some charge carriers still reach Intercalation Material 1610 at this stage of charging (e.g., an initial stage of charging a power storage device including the electrodes discussed herein). Because the Intercalation Material 1610 of some embodiments, such as silicon, expands when charge carrier intercalation occurs the surface area Intercalation Material 1610 also increases. This reduces the surface coverage of nanoparticles on the surface of Intercalation Material 1610 and reduces the effectiveness of the nanoparticles in forming a barrier to charge carriers. Thus, as charging progresses, greater numbers of charge carriers per unit time can reach Intercalation Material 1610. This is optionally continued until charging is dominated by reactions within the Intercalation Material 1610. The reduction in surface coverage may also increase the average fraction of Surface Effect Dominant Sites 1430 on each nanoparticle that are exposed to the electrolyte. As used herein the phrase "surface coverage" is used to represent a density of a species on a surface and may be measured as a number of monolayers (or fraction thereof), as a thickness, or as a concentration, etc.

In some embodiments, the power storage at Surface Effect Dominant Sites 1430 occurs at potentials at which faradaic surface reactions occur but intercalation of charge carriers into the nanoparticles that include the Surface Effect Dominant Sites 1430 does not occur. This prevents degradation of the nanoparticles by repeated intercalation and de-intercalation of charge carrier and allows for a longer cycle lifetime. At the same electrode it is desirable to store power within Intercalation Material 1610 via faradaic reactions that occur at a higher potentials, optionally including potentials that would cause intercalation of charge carriers into the nanoparticles having Surface Effect Dominant Sites 1430. This can occur in some embodiments of the invention because there is a potential drop between Substrate 105 and the Electrolyte 125.

In one specific example, in which lithium is the charge carrier, the Surface Effect Dominant Sites 1430 are on $TiO_2$ nanoparticles and Intercalation Material 1610 is predominantly silicon. The particular voltages in other embodiments will be understood to be dependent on the chemical species included in Surface Effect Dominant Sites 1430 and Intercalation Material 1610, and the reactions occurring during charging, etc. In various embodiments the potential difference between Surface Effect Dominant Sites 1430 and Substrate 105 is at least 0.001, 0.2, 0.3, 0.4, 0.5, 0.6, 0.8, 1.0, 1.3, 1.7, 2.0, 2.2, or 2.4V, or any range there between. As used herein the term "potential" is used to refer to an absolute value (e.g., |x|) of an electrostatic potential.

Figure 21:
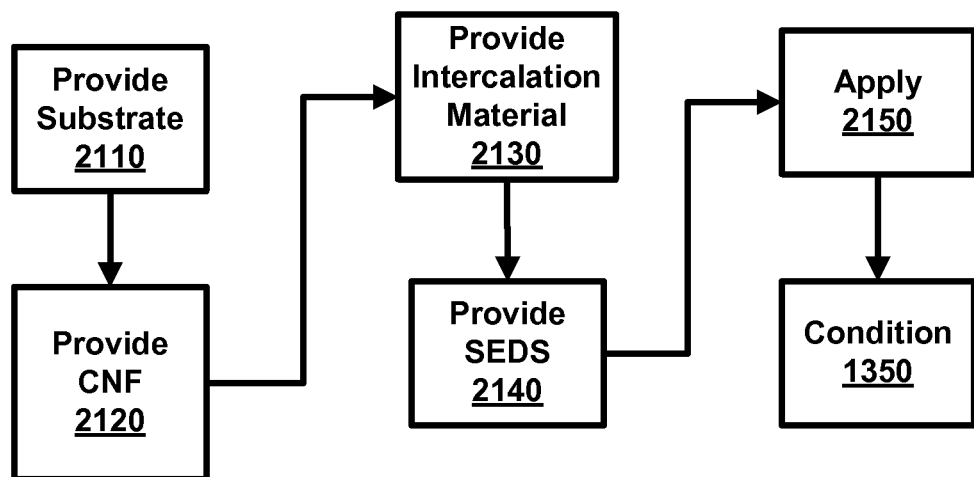
FIG. 21 illustrates methods of assembling an electrode surface, according to various embodiments of the invention.

FIG. 21 illustrates methods of assembling an electrode surface, according to various embodiments of the invention. The assembled electrode surface may be used, for example, as an anode in a battery, capacitor or hybrid device. The methods illustrated in FIG. 21 are optionally used to produce the various electrodes discussed elsewhere herein.

In a Provide Substrate Step 2110 a conductive substrate is provided. Provide Substrate Step 2110 is similar to Provide Substrate Step 1310. In Provide Substrate Step 2110, Substrate 105 optionally suitable for growth of CNFs 110 or other support filaments is provided. As discussed herein, Substrate 105 may include a variety of materials, for example Cu, Au, Sn, etc. Substrate 105 optionally includes nucleation sites as described elsewhere herein.

In an optional Provide CNF Step 2120, CNF 110 (or any of the other support filaments described herein) are provided. Provide CNF Step 2120 is optional in embodiments in which electrodes that lack support filaments, such as those illustrated by FIGS. 17 and 20, are produced. In some embodiments the CNF 110 are provided by growing CNF 110 on Substrate 105. In some embodiments, CNF 110 are provided by adding CNF 110 to a mixture, that is later applied to Substrate 105. In some embodiments CNF 110 are produced separate from Substrate 105 and later attached to Substrate 105.

In a Provide Intercalation Material Step 2130, Intercalation Material 1610 is provided. In some embodiments, Intercalation Material 1610 is first applied to CNF 110. In various embodiments, Intercalation Material 1610 is applied as a colloidal suspension, using vapor deposition, in a solvent, as a paste, or the like.

In a Provide Surface Effect Dominant Sites (SEDS) Step 2140, Surface Effect Dominant Sites 1430 are provided. As discussed elsewhere herein, the Surface Effect Dominant Sites 1430 may be disposed on nanoparticles or larger structures such as graphite, graphene or activated carbon. Surface Effect Dominant Sites 1430 can be provided as a suspension in Binder 1140, or in a solvent, using sputter deposition, using electro deposition, using evaporation, as a spray or the like. In some embodiments a Zeta potential of Intercalation Material 1610 is selected such that Surface Effect Dominant Sites 1430 are concentrated at surfaces of Intercalation Material 1610.

In an Apply Step 2150 Intercalation Material 1610, Surface Effect Dominant Sites 1430 and optionally CNFs 110 are applied to Substrate 105. These materials can be applied in a wide variety of orders and combinations. For example, Intercalation Material 1610 can be applied to CNFs 110 (perhaps already attached to Substrate 105) and then Surface Effect Dominant Sites 1430 can be then applied on top of the Intercalation Material 1610. Alternatively, free CNF 110, Intercalation Material 1610 may be first mixed, then Surface Effect Dominant Sites 1430 and Binder 1140 either alone or in combination are added. Based on the teachings herein, one of ordinary skill in the art will understand that in different embodiments, these components can be mixed or added in any order or combination. Further, the components can be mixed prior to or after being applied to Substrate 105. The Steps 2110-2150 can be performed in any order. Apply Step 2150 is optionally followed by Condition Step 1350.

In some embodiments the method illustrated in FIG. 21 includes mixing Intercalation Material 1610 and Surface Effect Dominant Sites 1430 in a suspension in a solvent with a sufficient amount of dispersion. The dispersion is optionally applied to CNFs 110. The solvent of the dispersion is then evaporated from the mixture resulting in a powder or coating on the CNFs 110. Binder 1440 can be added to the suspension before or after application to the CNFs 110. In some embodiments, the application of Surface Effect Dominant Sites 1430 occurs at the final stage of Intercalation Material 1610 deposition by changing the materials being sputtered onto Substrate 105. In these embodiments, for example, $TiO_2$ can be added to the sputtering mix after almost all the Intercalation Material 1610 is deposited. This produces a sputtered layer of $TiO_2$ as Surface Effect Dominant Sites 1430 on top of Intercalation Material 1610.

Figure 22:
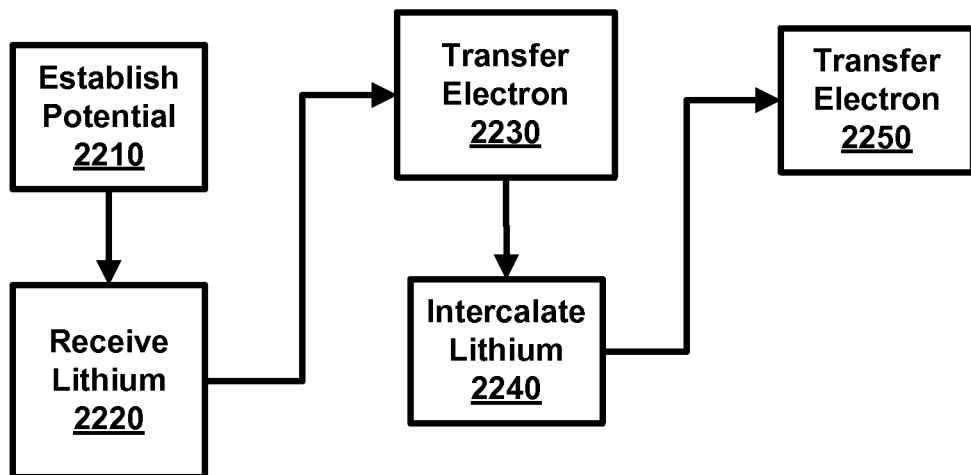
FIG. 22 illustrates methods of operating a charge storage device, according to various embodiments of the invention.

FIG. 22 illustrates methods of operating a charge storage device, according to various embodiments of the invention. This method may be used, for example, when charging the charge storage device. In some embodiments the method includes attaching a charging device to both an anode and cathode of the charge storage device via wires. This charging storage device places potentials at the anode and cathode resulting in a potential gradient there between. The potential gradient drives electrons into the anode. The steps illustrated in FIG. 22 optionally occur contemporaneously, e.g., they can occur at the same or at overlapping times with respect to each other.

In an Establish Potential Step 2210 a potential is established at the charge storage device. This potential may be between an anode and a cathode of the charge device. Such a potential will result in a potential gradient between Substrate 105 and Electrolyte 125 within the charge storage device. The potential gradient can produce a potential difference between locations of Surface Effect Dominant Sites 1430 and Intercalation Material 1610. In various embodiments this potential difference is at least 0.001, 0.1, 0.3, 0.4, 0.5, 0.8, 1.0, 1.3, 1.7, 2.0, or 2.4 V, or any range there between.

In a Receive Lithium Step 2220 a charge carrier, of which Lithium is but one possible example, is received at one of Surface Effect Dominant Sites 1430. This charge carrier is optionally received through Binder 1440.

In a Transfer Electron Step 2230 an electron is transferred (e.g., donated) from Surface Effect Dominant Site 1430 to the charge carrier received in Receive Lithium Step 2220. This transfer may comprise sharing of the electron between the Surface Effect Dominant Site 1430 and the charge carrier. The electron is transferred in a faradaic reaction and is typically conducted from Substrate 105. The transfer occurs while the charge carrier is at the surface of the Surface Effect Dominant Site 1430 and occurs at the potential of that location. A reaction potential of the electron transfer is, for example, dependent on the reaction potential of the charge carrier and the reaction potential of the Surface Effect Dominant Site 1430. The reaction potential can be dependent on both the Surface Effect Dominant Site 1430 and the nearby Intercalation Material 1610. As used herein, the term "reaction potential" is used to refer to the potential at which a reaction occurs at an appreciable rate. The reaction potential of a reaction can be illustrated by, for example, peaks in a cyclic voltammogram. In another example, the potentials required for the reactions $Li^+ + e^- \rightarrow Li$ or $2Li^+ + MO + 2e^- \rightarrow Li_2O + M$ (where M is any of the transition metals discussed herein) to occur in an electrochemical cell are the reaction potentials of these reactions. The reaction potential can be highly dependent on the environment in which the reaction occurs. For example, the second reaction above may have a lower reaction potential in the presence of a $TiO_2$ nanoparticle having a diameter in the range of 2-10 nm. Likewise, the reaction potential can be influenced by the energy required for intercalation or by the close proximity of Surface Effect Dominant Sites 1430 and Intercalation Material 1610.

In an Intercalate Lithium Step 2240 a charge carrier, of which Lithium is but one possible example, is intercalated within Intercalation Material 1610. This step may include migration of the charge carrier into the bulk interior of Intercalation Material 1610. The charge carrier can be received at Intercalation Material 1610 as the same chemical species as received at the Surface Effect Dominant Sites 1430 in Receive Lithium Step 2220, or alternatively in as a chemical species produced at the Surface Effect Dominant Sites 1430. For example, the charge carrier can be received at the Intercalation Material 1610 as an oxide (e.g., $Li_2O$, etc.) of the chemical species received at Surface Effect Dominant Sites 1430.

In a Transfer Electron Step 2250 an electron is transferred from Intercalation Material 1610 to the charge carrier of Intercalate Lithium Step 2240. The electron is transferred in a faradaic reaction and is typically conducted from Substrate 105. The transfer occurs while the charge carrier is within Intercalation Material 1610 and occurs at the potential of that location. A reaction potential of the electron transfer may be dependent on the reaction potential of the charge carrier and the reaction potential of the Intercalation Material 1610. The potential of this conduction band can be influenced by both the Intercalation Material 1610 and nearby Surface Effect Dominant Sites 1430. Surface Dominant Sites 1430 can catalyze transfer of lithium from Electrolyte 125 to Intercalation Material 1610. As discussed elsewhere herein, this transfer can occur via an intermediate oxide such as $Li_2O$. The work function of this electron transfer can be different than the work function of the electron transfer in Transfer Electron Step 2230. For example, in various embodiments the work function is at least 0.001, 0.1, 0.3, 0.4, 0.5, 0.8, 1.0, 1.3, 1.7, 2.0 or 2.4V, or any combination there between. In some embodiments it is thermodynamically more favorable for lithium to be intercalated into Intercalation Material 1610 than into the bulk of nanoparticles that include the Surface Effect Dominant Sites 1430. However, the presence of the Surface Effect Dominant Sites 1430 can catalyze intercalation of a charge carrier into Intercalation Material 1610.

If the charge carrier is converted to an oxide in Transfer Electron Step 2230 then, in some embodiments, Transfer Electron Step 2250 include transfer of an oxygen back from Intercalation Material 1610 back to Surface Effect Dominant Sites 1430. This oxygen received at Intercalation Material 1610 as the oxide of the charge carrier, and is released from the charge carrier during intercalation. After being transferred back to Surface Effect Dominant Sites 1430, this oxygen can then be used in further occurrences of Transfer Electron Step 2230, i.e., the oxygen is recycled.

While the description of FIG. 22 above assumes that the charge carrier received in Receive Lithium Step 2220 and the charge carrier Intercalate Lithium Step 2240 are two different individual charge carriers (that could be of the same type), in various embodiments steps 2220, 2230 and 2240 can be performed in by the same individual charge carriers. For example, in some embodiments, Receive Lithium Step 2220 includes receiving a charge carrier at one of Surface Effect Dominant Sites 1430. Transfer Electron Step 2230 then includes a reaction in which the charge carrier reacts with the Surface Effect Dominant Site 1430 to produce an intermediate compound. In some embodiment this reaction includes $2Li^+ + MO + 2e^- \rightarrow Li_2O + M$ (Where M is any of the transition metals discussed herein and $Li_2O$ is the resulting intermediate compound). In Intercalate Lithium Step 2240 the intermediate compound (e.g., $Li_2O$) is intercalated into Intercalation Material 1610, or one (or both) of the Li in the intermediate compound are transferred from the O of $Li_2O$ to an atom of the Intercalation material (e.g., $Li_xSi$). This transfer may result in regeneration of the MO that was split in Transfer Electron Step 2230. Note that in this example the same individual Li atom was involved in each of the Steps 2220-2230 and 2240. Transfer Electron Step 2250 is not required in these embodiments of the methods illustrated by FIG. 22. It is possible that in some embodiments both reaction sequences that include an intermediate such as $Li_2O$ and reaction sequences that do not include an intermediate occur during a single charging cycle.

Several embodiments are specifically illustrated and/or described herein. However, it will be appreciated that modifications and variations are covered by the above teachings and within the scope of the appended claims without departing from the spirit and intended scope thereof. For example, while the examples discussed herein have been focused on CNFs having a stacked-cone structure the teachings may be adapted to other materials having similar or alternative structures. Likewise, while a Cu substrate and Li charge carriers are discussed herein other substrates and charge carriers will be apparent to one of ordinary skill in the art. Silicon Layer 115 is optionally formed of intercalation materials in addition to or as an alternative to silicon. For example, tin, germanium, carbon, graphite, graphene, silicon, other materials discussed herein or combinations thereof could be used as intercalation material. Additionally, aerogels, nano-wires, $TiO_2$ (titanium oxide), metal wires, carbon wires, or boron nitride nano-fibers can be used in place of the carbon nano-fibers discussed herein. The relative concentrations of Binder 1440, Surface Effect Dominant Sites 1430, Intercalation Material 1610 and CNF 110 and other elements in the figures can vary significantly from that illustrated.

The electrodes taught herein may be included in a wide variety of energy storage devices including capacitors, batteries and hybrids thereof. These energy storage devices can be used in, for example, lighting systems, portable electronics, load balancing devices, communication devices, backup power supplies, vehicles and computing devices. The concepts taught herein can be, in many cases, applied to cathodes as well as anodes.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An electrode comprising:
   a conductive substrate; and
   an intercalation material layer comprising
      an intercalation material;

a plurality of nanoparticles selected to reversibly adsorb one or more charge carriers, the plurality of nanoparticles distributed therein; and a plurality of support structures comprising a plurality of detached carbon nanofibers.

2. The electrode of claim 1, wherein the plurality of nanoparticles are suspended in the intercalation material layer, attached to a surface of the intercalation material, or a combination thereof.

3. The electrode of claim 1, wherein the conductive substrate further comprises one or more of Cu, Au, and Sn.

4. The electrode of claim 1, wherein the plurality of detached carbon nanofibers are disposed proximate to the conductive substrate.

5. The electrode of claim 1, wherein the one or more charge carriers comprises lithium ions.

6. The electrode of claim 1, wherein the plurality of nanoparticles is selected to donate electrons to the one or more charge carriers on a surface of each of the plurality of nanoparticles via faradic interactions.

7. The electrode of claim 1, wherein the plurality of nanoparticles comprises at least one of $TiO_2$, $Va_2O_5$, MnO, $MnO_2$, NiO, tantalum oxide, ruthenium oxide, rubidium oxide, tin oxide, cobalt oxide, nickel oxide, copper oxide, iron oxide, carbon, activated carbon, graphene, graphite, titanate ($Li_4T_{15}O_{12}$), crystalline silicon, tin, germanium, metal hydrides, iron phosphates, polyaniline, or mesophase carbon.

8. The electrode of claim 1, wherein the plurality of nanoparticles comprises $TiO_2$.

9. The electrode of claim 1, wherein the intercalation material layer comprises at least one of Si, Ag, Al, Bi, C, Se, Sb, Sn and Zn.

10. The electrode of claim 1, wherein the plurality of nanoparticles have an average diameter of less than 1 μm.

* * * * *

UNITED STATES PATENT AND TRADEMARK OFFICE
CERTIFICATE OF CORRECTION

PATENT NO. : 10,978,702 B2  
APPLICATION NO. : 16/842833  
DATED : April 13, 2021  
INVENTOR(S) : Ronald A. Rojeski Page 1 of 1

It is certified that error appears in the above-identified patent and that said Letters Patent is hereby corrected as shown below:

In the Claims

Claim 7:
Column 26, Line 8: Delete "$(Li_4T_{15}O_{12})$" and insert -- $(Li_4Ti_5O_{12})$ -- therefor.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*